United States Patent
Maylor et al.

(10) Patent No.: US 9,654,492 B2
(45) Date of Patent: May 16, 2017

(54) MALWARE DETECTION SYSTEM BASED ON STORED DATA

(71) Applicant: MIMECAST NORTH AMERICA, INC., Watertown, MA (US)

(72) Inventors: Jackie Maylor, Wiltshire (GB); Simon Tyler, Wiltshire (GB); Peter Bauer, Watertown, MA (US); Gilly Benamram, London (GB); Paul Sowden, London (GB); Steven Malone, Berkshire (GB); Wayne Van Ry, London (GB); Francisco Ribeiro, London (GB)

(73) Assignee: MIMECAST NORTH AMERICA, INC., Watertown, MA (US)

(*) Notice: Subject to any disclaimer, the term of this patent is extended or adjusted under 35 U.S.C. 154(b) by 0 days.

(21) Appl. No.: 15/010,023

(22) Filed: Jan. 29, 2016

(65) Prior Publication Data
US 2017/0078321 A1 Mar. 16, 2017

Related U.S. Application Data

(63) Continuation-in-part of application No. 14/855,200, filed on Sep. 15, 2015.

(51) Int. Cl.
*H04L 29/06* (2006.01)
*G06F 21/62* (2013.01)

(52) U.S. Cl.
CPC ...... *H04L 63/1433* (2013.01); *G06F 21/6245* (2013.01); *H04L 63/145* (2013.01); *H04L 63/1416* (2013.01); *H04L 63/20* (2013.01)

(58) Field of Classification Search
CPC ............. H04L 63/1433; H04L 63/1416; H04L 63/145; H04L 63/20; G06F 21/6245
(Continued)

(56) References Cited

U.S. PATENT DOCUMENTS 6,253,193 B1 6/2001 Ginter et al.
6,931,532 B1 8/2005 Davis
(Continued)

OTHER PUBLICATIONS

AVG Technologies, 'AVG AntiVirus Free Edition User Manual', revision AVG.22 (Aug. 8, 2016), AVG Technologies CZ, entire document, http://files-download.avg.com/doc/AVG_Free/avg_free_uma_en_ltst_22.pdf.*
(Continued)

*Primary Examiner* — Luu Pham
*Assistant Examiner* — Ronald Baum
(74) *Attorney, Agent, or Firm* — Arc IP Law, PC; Joseph J. Mayo

(57) ABSTRACT

A malware detection system based on stored data that analyzes an electronic message for threats by comparing it to previously received messages in a message archive or to a contacts list. Threat protection rules may be generated dynamically based on the message and contacts history. A message that appears suspicious may be blocked, or the system may insert warnings to the receiver not to provide personal information without verifying the message. Threat checks may look for unknown senders, senders with identities that are similar to but not identical to previous senders or to known contacts, or senders that were added only recently as contacts. Links embedded in messages may be checked by comparing them to links previously received or to domain names of known contacts. The system may flag messages as potential threats if they contradict previous messages, or if they appear unusual compared to the patterns of previous messages.

25 Claims, 35 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 7,363,490 | B2* | 4/2008 | Paulsen, Jr. | G06Q 10/107 713/154 |
| 7,653,695 | B2* | 1/2010 | Flury | H04L 12/585 709/206 |
| 7,970,843 | B2 | 6/2011 | Brown et al. | |
| 8,145,718 | B1 | 3/2012 | Kacker et al. | |
| 8,281,372 | B1* | 10/2012 | Vidal | H04L 51/12 709/206 |
| 8,667,069 | B1* | 3/2014 | Connelly | H04L 51/32 709/206 |
| 9,027,115 | B2 | 5/2015 | Larson | |
| 9,154,498 | B2 | 10/2015 | Byrne | |
| 9,467,410 | B2 | 10/2016 | Liebmann et al. | |
| 2002/0095567 | A1 | 7/2002 | Royer | |
| 2002/0199096 | A1 | 12/2002 | Wenocur et al. | |
| 2003/0051054 | A1 | 3/2003 | Redlich et al. | |
| 2003/0065941 | A1* | 4/2003 | Ballard | H04L 63/04 726/1 |
| 2003/0204569 | A1* | 10/2003 | Andrews | H04L 51/12 709/206 |
| 2003/0227487 | A1* | 12/2003 | Hugh | G06F 17/30958 715/777 |
| 2004/0083270 | A1* | 4/2004 | Heckerman | H04L 51/12 709/207 |
| 2005/0076222 | A1 | 4/2005 | Olkin et al. | |
| 2006/0015945 | A1 | 1/2006 | Fields | |
| 2006/0106802 | A1 | 5/2006 | Giblin | |
| 2006/0168006 | A1* | 7/2006 | Shannon | G06Q 10/107 709/206 |
| 2007/0079379 | A1* | 4/2007 | Sprosts | G06Q 10/107 726/24 |
| 2007/0143827 | A1 | 6/2007 | Nicodemus et al. | |
| 2007/0192853 | A1* | 8/2007 | Shraim | G06Q 10/107 726/22 |
| 2008/0115227 | A1 | 5/2008 | Toutonghi | |
| 2008/0127339 | A1* | 5/2008 | Swain | H04L 12/585 726/22 |
| 2008/0301445 | A1 | 12/2008 | Vasic et al. | |
| 2009/0216841 | A1* | 8/2009 | Choi | H04L 12/585 709/206 |
| 2010/0175136 | A1* | 7/2010 | Frumer | G06F 21/31 726/26 |
| 2011/0113109 | A1* | 5/2011 | LeVasseur | H04L 51/12 709/206 |
| 2011/0119258 | A1* | 5/2011 | Forutanpour | G06Q 10/107 707/723 |
| 2011/0145580 | A1 | 6/2011 | Auradkar | |
| 2011/0179362 | A1 | 7/2011 | Craddock et al. | |
| 2011/0296179 | A1 | 12/2011 | Templin | |
| 2013/0074191 | A1 | 3/2013 | Ben-Reuven | |
| 2014/0229617 | A1 | 8/2014 | Cyr | |
| 2014/0282964 | A1* | 9/2014 | Stubblefield | H04L 63/0853 726/7 |
| 2015/0032829 | A1* | 1/2015 | Barshow | H04L 51/16 709/206 |
| 2015/0039886 | A1 | 2/2015 | Kahol | |
| 2015/0121063 | A1 | 4/2015 | Maller | |
| 2015/0350143 | A1* | 12/2015 | Yang | H04L 51/22 345/173 |

OTHER PUBLICATIONS

SpamTitan, 'SpamTitan® Administrators Guide v6.02', 2014, SpamTitan, entire document, http://www.spamtitan.com/uploads/PDF/Technical%20Documentation/SpamTitan_Administrators_Guide_v602160414_gh.pdf.*

* cited by examiner

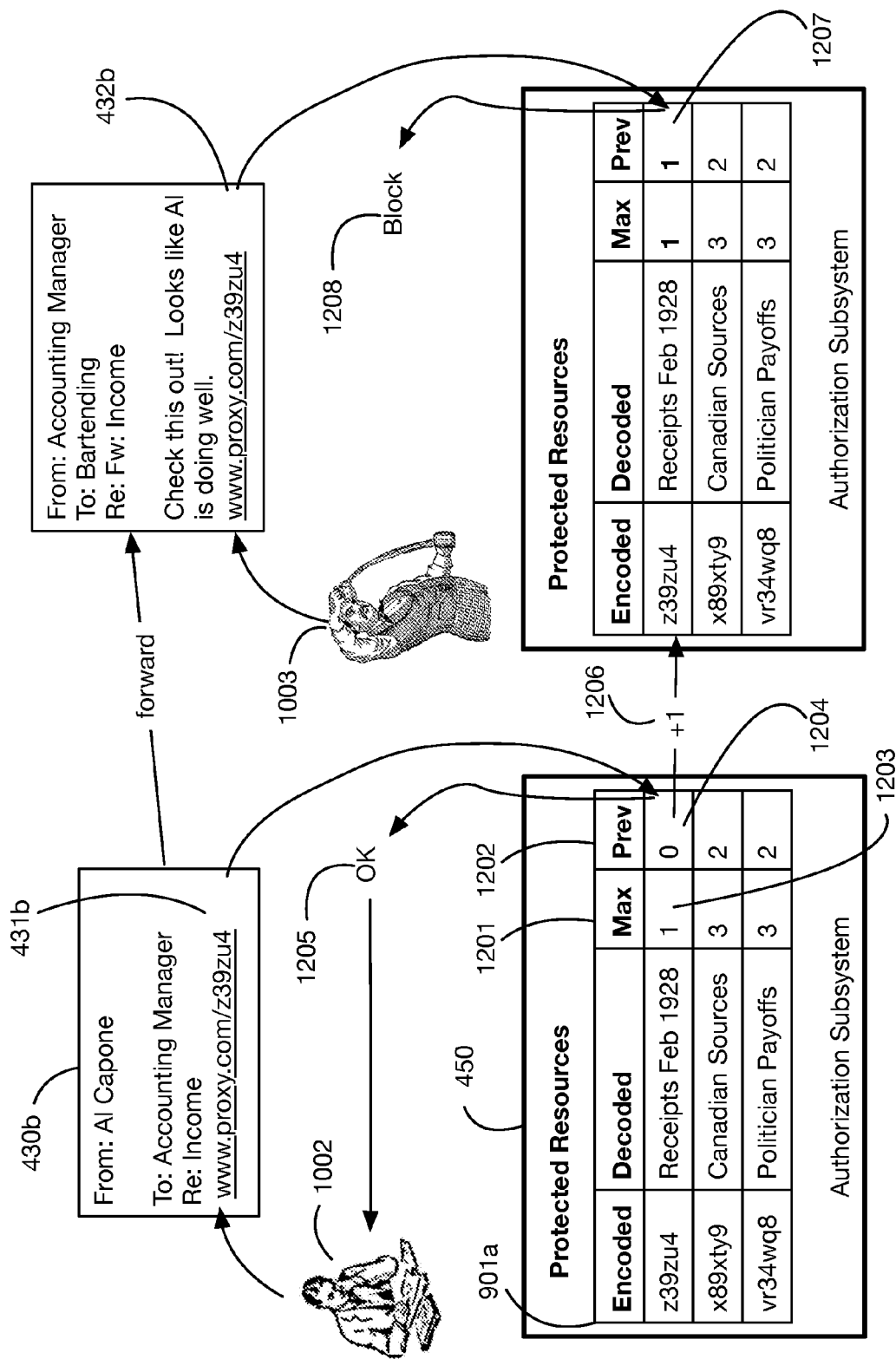

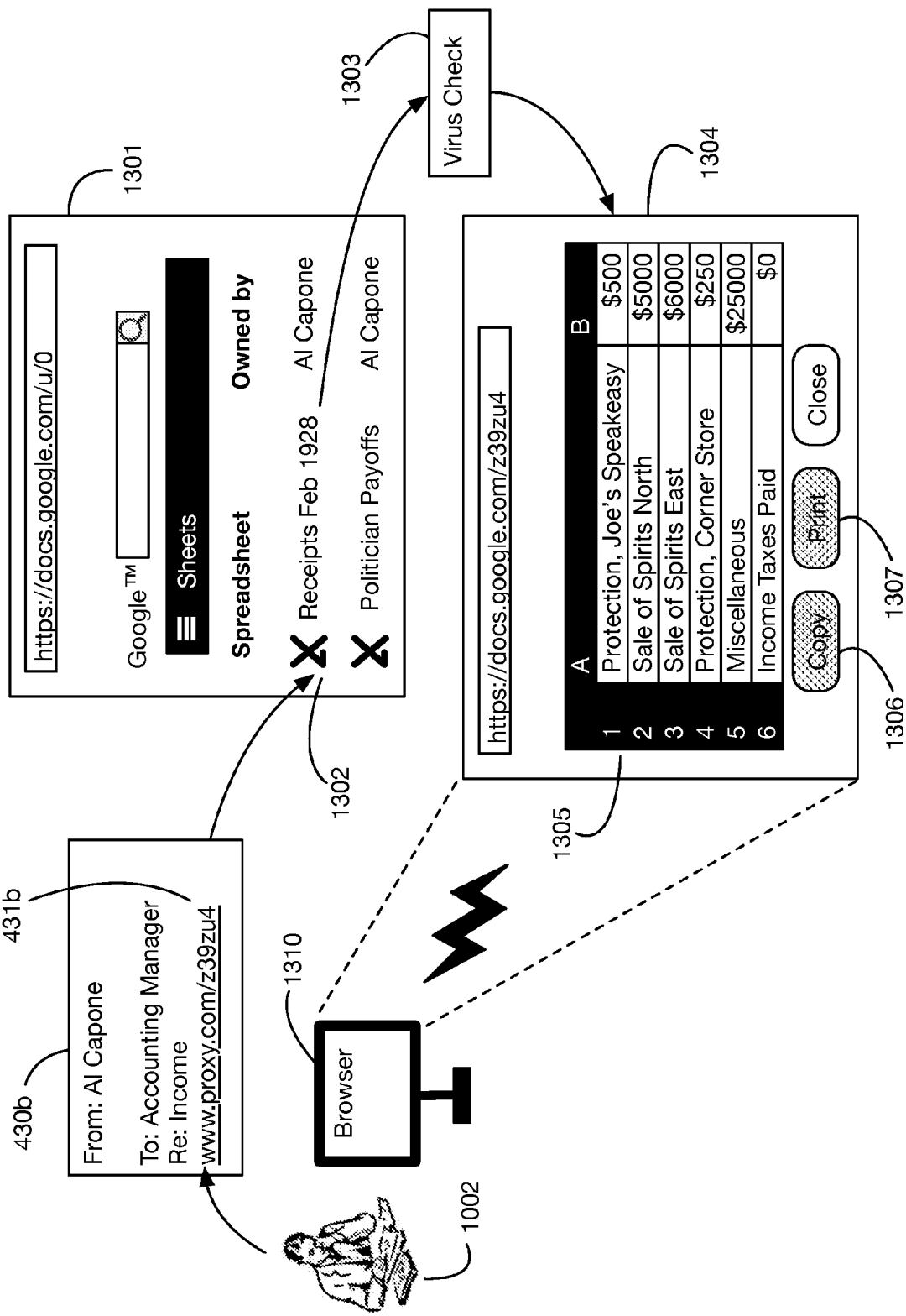

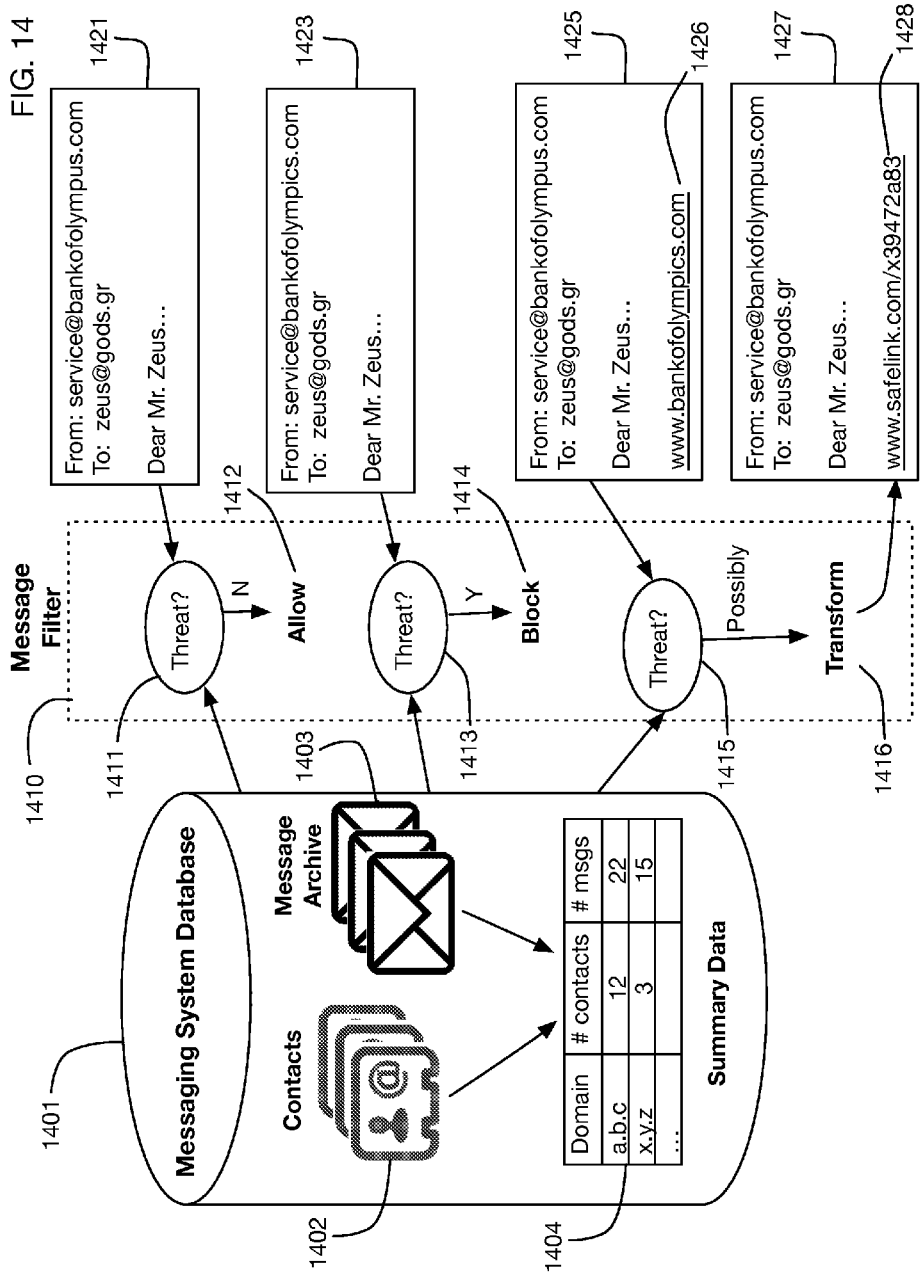

FIG. 17A gods.gr Consolidated Contacts List  — 17A02

| Name | Email Address | Entered into List |
|---|---|---|
| Hercules | hercules@mortals.gr | Jan 1, 500 BCE |
| Ares | ares@gods.gr | Feb 2, 1000 BCE |
| Persephone | persephone@gods.gr | Mar 3, 550 BCE |
| Apollo | apollo@gods.gr | Jun 15, 1500 BCE |
| Dionysus | dionysus@gods.gr | Dec 30, 1500 BCE |
| Zeus | zeus@gods.gr | Sep 21, 2000 BCE |
| Poseidon | poseidon@gods.gr | Sep 21, 2000 BCE |
| Hera | hera@gods.gr | Sep 21, 2000 BCE |
| Alex the Electrician | alexander@electricity.gr | July 3, 420 BCE |
| Bank of Olympus | service@bankofolympus.com | Aug 15, 400 BCE |

17A01

17A12

Received: Aug 17, 400 BCE
From: service@bankofolympus.com
To: zeus@gods.gr
Subject: Welcome to our Bank Dear Mr. Zeus....

17A10  17A14  17A11

Threat? — 17A13 threshold=10 days — 17A16

Sender service@bankofolympus.com added to Contacts only recently (2 days ago).

17A17  17A15

From: service@bankofolympus.com
To: zeus@gods.gr
Subject: WARNING-RECENT CONTACT (Welcome to our Bank)

*Warning: This sender was added very recently as a contact in the gods.gr organization. Please be alert for possible fraud and do not share personal information!*

Dear Mr. Zeus....

17A18  17A19  17A20

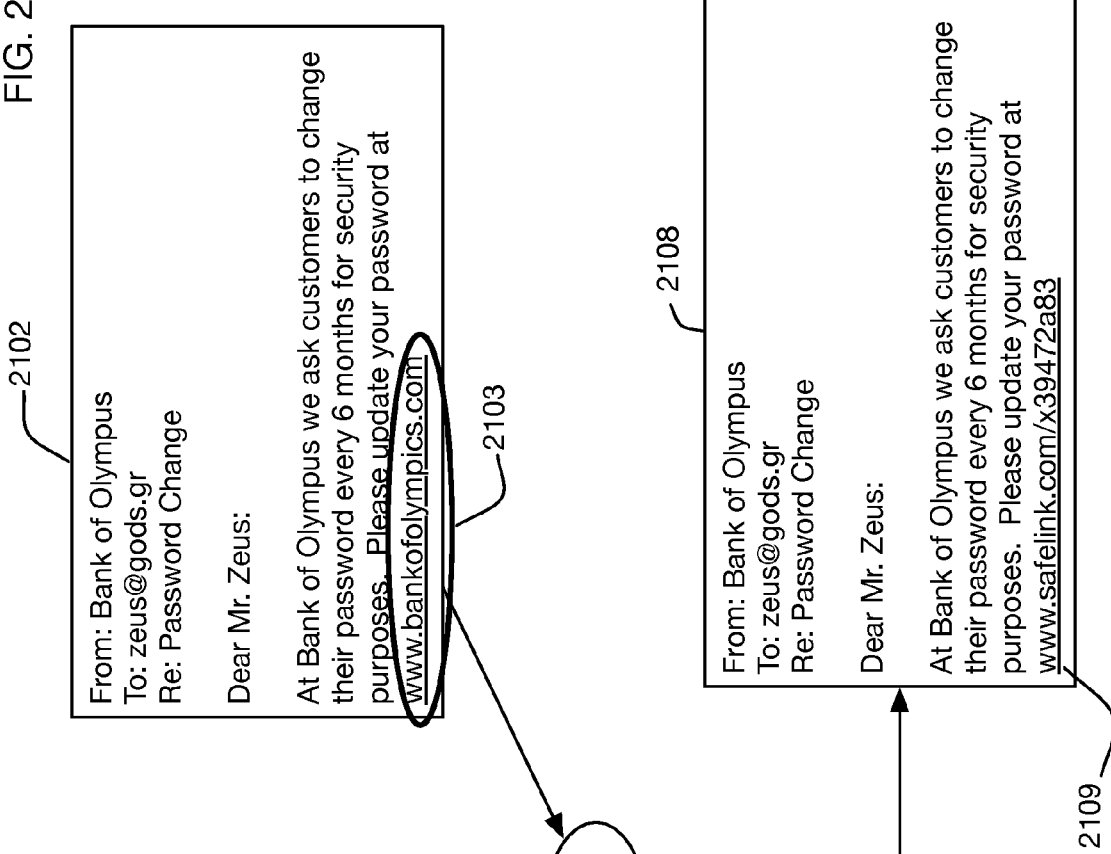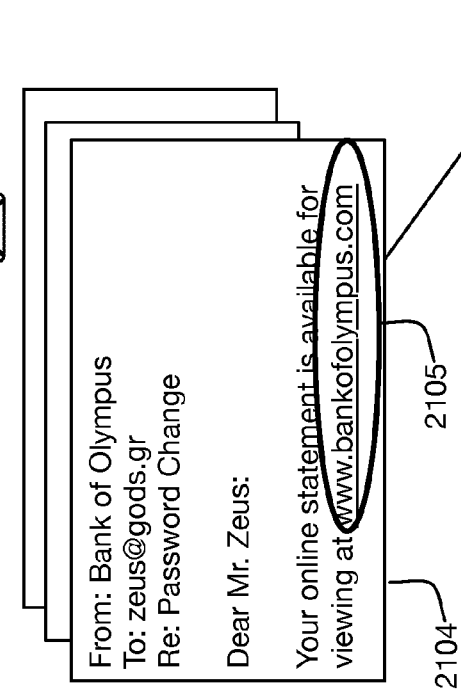
FIG. 21

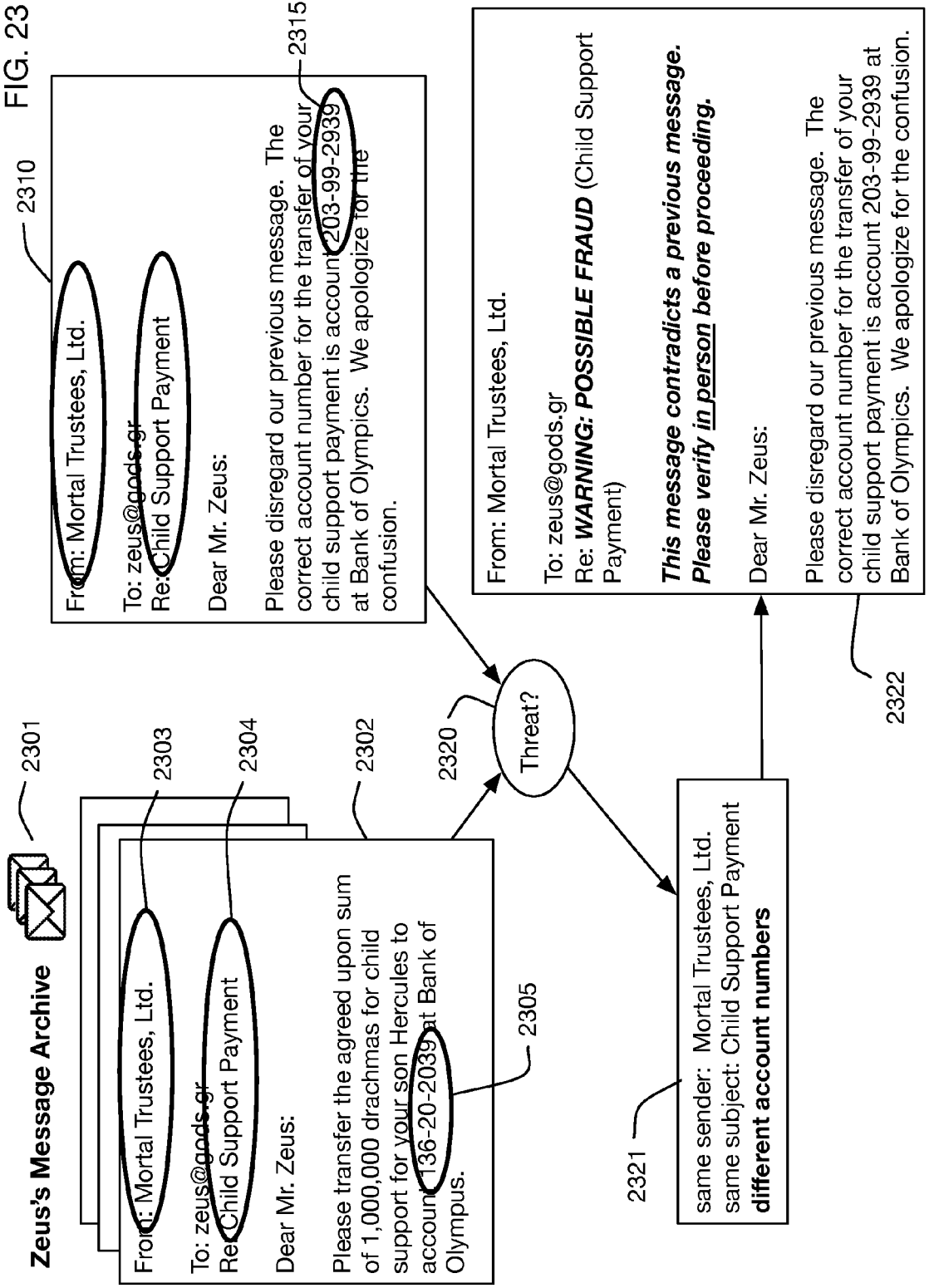

FIG. 24

Zeus's Message Archive  — 2401

| From | Subject |
|---|---|
| service@bankofolympus.com | Statement Available |
| service@bankofolympus.com | Your Personal Banker |
| service@bankofolympus.com | Statement Available |
| service@bankofolympus.com | Statement Available |
| service@bankofolympus.com | Line of Credit |

2402

2403

From: Bank of Olympus <service@bankofolympus.com>
To: zeus@gods.gr
Re: Password Change Dear Mr. Zeus:

At Bank of Olympus we ask customers to change their password every 6 months for security purposes. Please update your password at www.bankofolympics.com

2406

2404 — Threat?

2405

Unusual request from Bank of Olympus:

5 previous messages from this sender: none with "Please update your password"; none with embedded link.

2410

From: Bank of Olympus <service@bankofolympus.com>
To: zeus@gods.gr
Re: Password Change Dear Mr. Zeus:

At Bank of Olympus we ask customers to change their password every 6 months for security purposes. Please update your password at www.safelink.com/x39472a83

2411

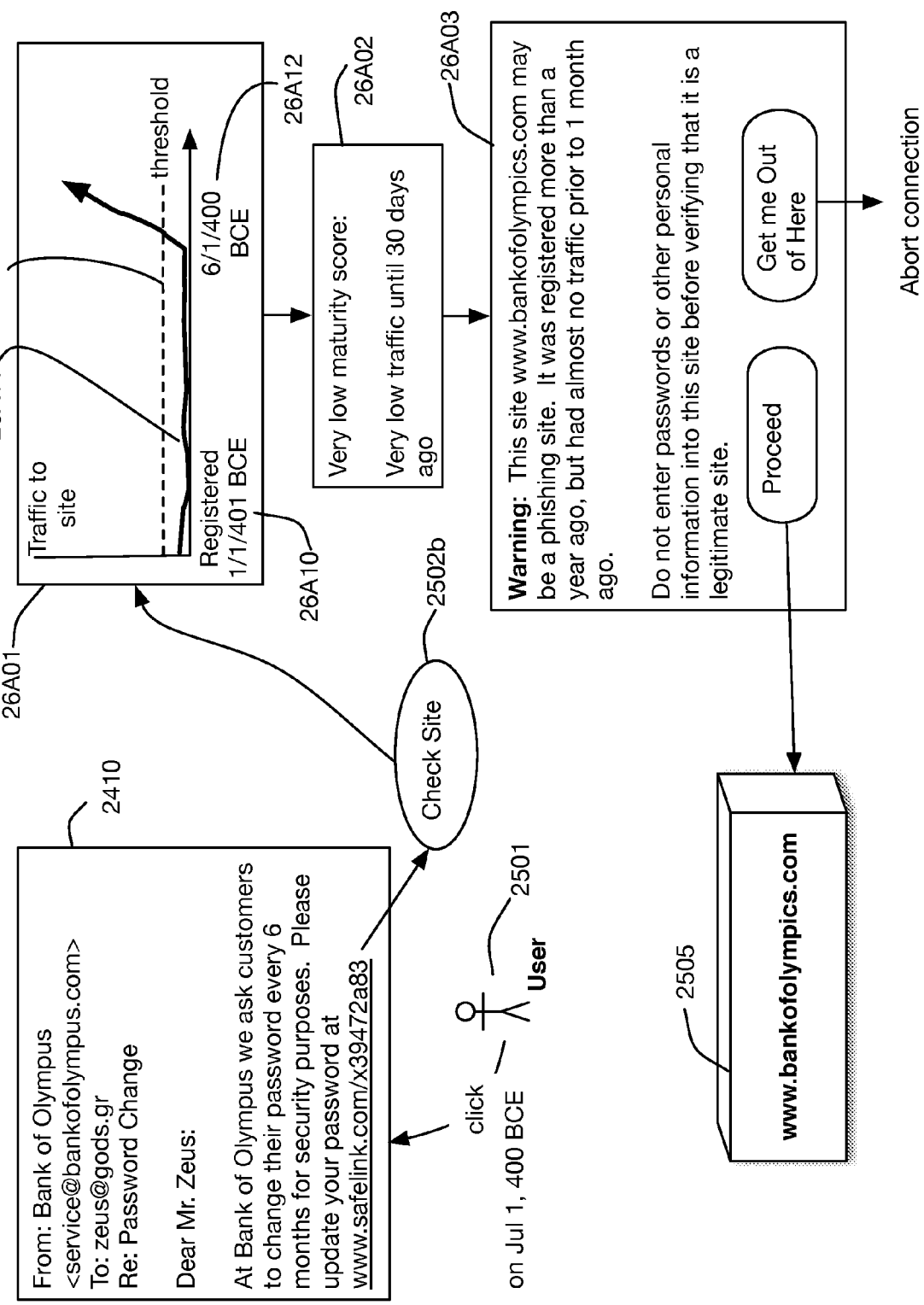

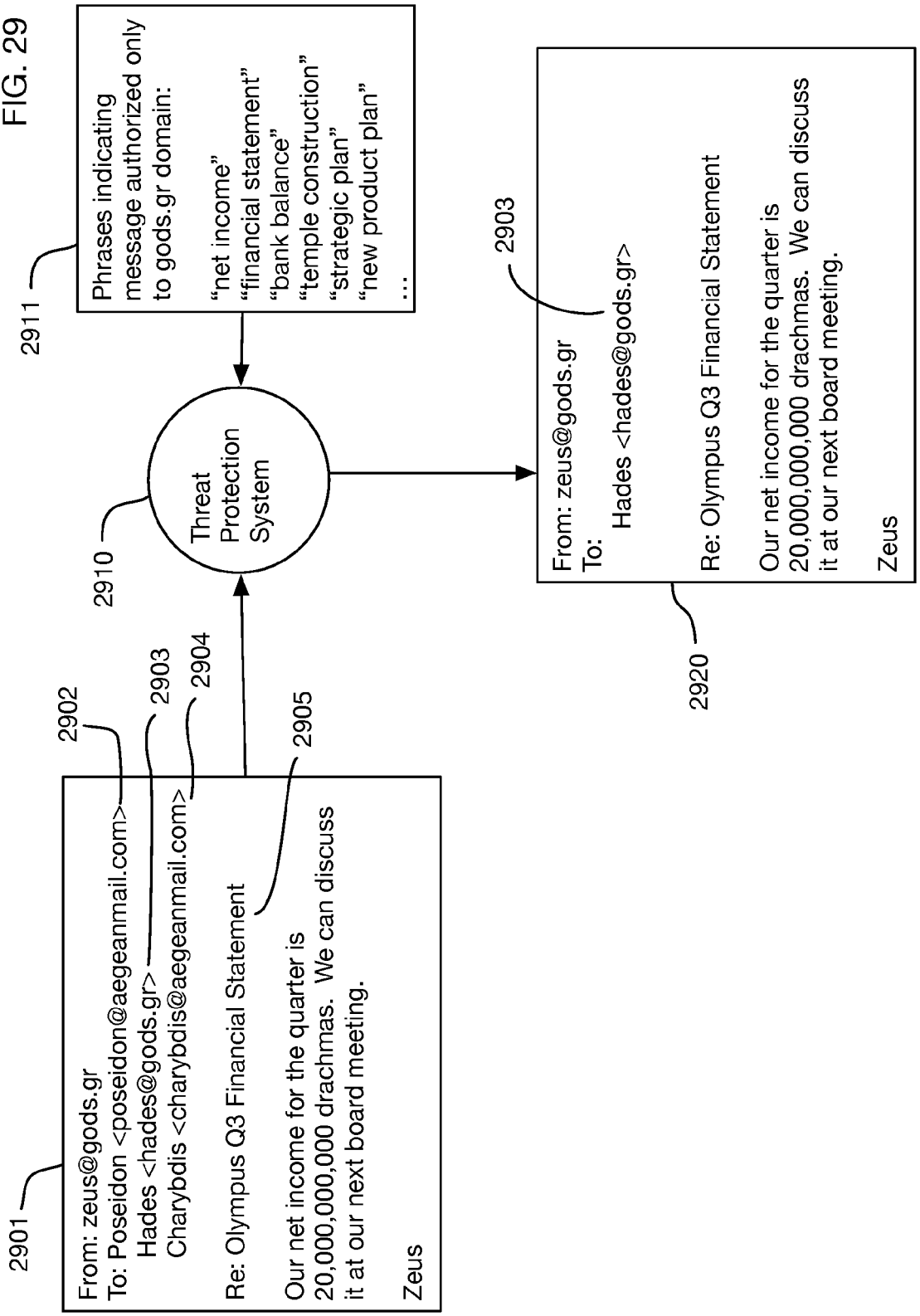

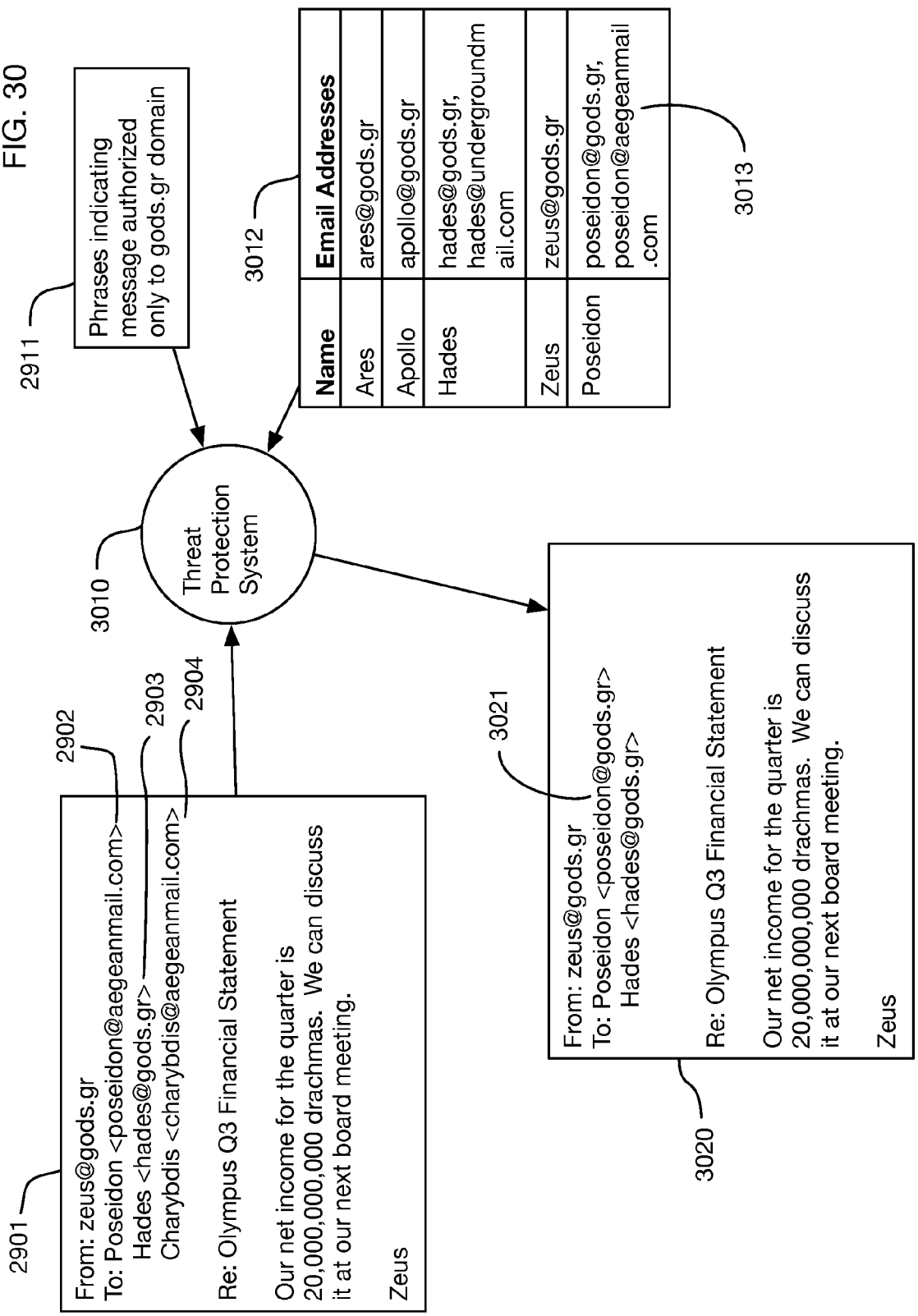

MALWARE DETECTION SYSTEM BASED ON STORED DATA

This application is a continuation in part of U.S. Utility patent application Ser. No. 14/855,200, filed 15 Sep. 2015, the specification of which is hereby incorporated herein by reference.

BACKGROUND OF THE INVENTION

Field of the Invention

One or more embodiments of the invention are related to the field of data processing and electronic messaging systems. More particularly, but not by way of limitation, one or more embodiments of the invention enable a malware detection system based on stored data that for example uses contact lists and message archives of a messaging system database to determine whether a message presents a potential threat, such as for example a phishing attack.

Description of the Related Art

Existing systems that enable communication of electronic messages include email, instant message, text message, calendar, and audio and video messaging systems. Electronic messages may contain security threats such as attachments with viruses, or phishing attacks with links to web sites that attempt to steal sensitive information or malware. Message recipients are often unable or unwilling to protect themselves sufficiently from these threats. Therefore, electronic message security systems have emerged in the art to provide a degree of protection against some threats embedded in messages. For example, systems that automatically scan message attachments for viruses are known in the art.

Threats in web page links, such as phishing attacks, present a more complex challenge. Blocking all links may be impractical. Checking a link prior to sending a message to a recipient provides incomplete protection, since it is possible for a site to become malicious or to be recognized as malicious after the initial check. For improved security there is a need for a system that checks links, and other resources or resource references embedded in electronic messages, at the time the message recipient accesses them. However, this solution presents an additional challenge since message recipients can easily copy and share protected resource references that incorporate security checks. The security checking resources and benefits are therefore made available to anyone. Moreover, security checking resources are consumed on each access to a protected reference; widespread distribution of copies of these protected references can therefore overwhelm security checking system resources such as processor capacity, memory, or network bandwidth. Social media sites and social messaging systems compound this problem because links or other references may be shared instantly with many thousands of users. Ideally the protection offered by a security system should be available only to authorized users of the system. There are no known systems that combine electronic message threat protection with user authorization, in order to limit threat protection to those users that the system intends to protect.

Existing threat protection systems generally analyze electronic messages using rules or threat signatures configured by administrators or obtained from security firms. For example, administrators may configure whitelists of websites known to be legitimate, and blacklists of websites known to be malicious. This approach is time-consuming and resource intensive. Moreover, rules and signatures are frequently out-of-date, providing inadequate threat protection. There are no known systems that create threat rules and signatures dynamically based on the messages previously received or the contacts added to a messaging system database.

For at least the limitations described above there is a need for a malware detection system based on stored data that protects against threats in electronic messages, and that for example uses stored data such as the contacts and message archives of a messaging system database to check a message for potential threats or malware.

BRIEF SUMMARY OF THE INVENTION

One or more embodiments described in the specification are related to a malware detection system based on stored data that for example protects against threats from electronic messages. One or more embodiments use stored data such as the contacts and message archives of a messaging system database to check a message for potential threats or malware and also optionally incorporates user authorization processes to control access to resources and to the threat protection services, which is described first below. Embodiments of the system convert resources or references to resources such as attachments or links into protected references that provide indirect access to the resources via the system. This level of indirection ensures that users' attempts to access the resources invoke the system's authorization checks and security checks on the resources. One benefit of the system is that copies, including unauthorized copies, of protected resource references are subject to the same authorization and security checks as the protected resource references in the received messages.

One or more embodiments of the system include at least three subsystems: a message transformation subsystem, an authorization subsystem, and a secure resource access subsystem. The message transformation subsystem may for example transform an electronic message into a protected message prior to forwarding it from the sender to the recipient or recipients. This transformation may use a reference rewriting module that replaces resources or references to resources in the original message with protected references that may add authorization and security checks. The authorization subsystem may use various techniques to determine if a user is an authorized user of the security services of the system, and whether the user is permitted to use the protected reference to access the resource. The secure resource access subsystem may use various techniques to provide authorized users with access to protected resources via a security mechanism that mitigates one or more potential threats from the resource. The protected resource reference may be configured to trigger the appropriate authorization checks and security measures automatically when it is accessed, or when a copy of it is accessed. If a user is not an authorized user, access to the resource may be blocked. If the user is an authorized user, access to the resource may be allowed but only via the security mechanism of the secure resource access subsystem.

One or more embodiments may provide authorization and security checks for resource references that include links to web pages. The protected reference for a web page link generated by the message transformation subsystem may for example be a link to a page on a proxy server, where the path is encoded. The proxy server may for example host or communicate with the authorization subsystem and the secure resource access subsystem. When a user uses the protected reference that includes the encoded link, the proxy server may check whether the user is authorized, and if so it may decode the link to obtain the original link and then check the security of the originally referenced web page.

One or more embodiments may provide secure access to a web page by checking the web page for potential threats prior to allowing user access to the web page. One or more embodiments may use various techniques to perform this threat checking. If the check determines that the web page is a known or suspected malicious web page, one or more embodiments may for example block access, warn the user about the potential threat, or both. If the check determines that the web page is likely safe, access may be provided via the decoded link to the web page.

One or more embodiments may check a web page for potential threats using a blacklist, a whitelist, or both. A blacklist may contain identities of web pages that are known or suspected to be malicious. A whitelist may contain identities of web pages that are believed to be secure or safe. One or more embodiments may define security or safety of a web page or other resource in any desired manner. For example, in some contexts a web page may be considered secure if it does not pose a potential threat to a user, such as theft of personal information; in other contexts a web page may be considered secure if it protects users' confidential information. One or more embodiments may use any type of identity for web pages or other resources in order to associate threat information or threat assessments with a web page or other resource. For example, without limitation, a web page identity may be a domain name, a partial domain name, an IP address, a certificate, or a digital signature. One or more embodiments may use identities that may be confirmed via an authentication mechanism, such as for example, without limitation, DomainKeys Identified Mail (DKIM), Sender Policy Framework (SPF), or validation via a certificate authority. One or more embodiments may include configuration tools for users or administrators to enter and edit blacklists or whitelists. One or more embodiments may obtain blacklists or whitelists or portions thereof from external sources. Generally, if a web page has an identity that is on the blacklist, an embodiment may block access; conversely if a web page has an identity that is on the whitelist, an embodiment may allow access. For web pages that appear on neither the blacklist or the whitelist, one or more embodiments may have a policy for the appropriate action, which may for example be to allow access, to block access, or to warn the user.

One or more embodiments may use other techniques in addition to or instead of blacklists and whitelists to determine if a web page poses a potential threat. For example, phishing web sites often have URLs that appear to be almost the same as the URL of a known site that the phishing site is imitating. As an example, a phishing attack may direct a user to a website with domain name www.humurouspettricks.com, when the real legitimate website is www.humorouspettricks.com; a recipient may be unlikely to notice the single-letter difference between the two domain names. One or more embodiments may for example block web pages with identities (such as URLs) that are similar to known legitimate web pages.

One or more embodiments may perform user authentication using a database of registered users and their credentials. User credentials may be obtained as part of the access of a protected reference, either implicitly or by explicitly asking the user, and compared to the credentials of registered users. Embodiments may use any form of user credentials, including for example, without limitation, an IP address or IP address range, a password, a PIN, a one-time PIN or one-time password sent to the user, a biometric credential, a security token, a security certification, a response to a challenge question, and credentials from a single sign-on service. One or more embodiments may cache valid credentials of a user, for example in a cookie on the user's local computer, and retrieve these cached credentials for subsequent access attempts by the user.

In one or more embodiments, authorized users of the system may not necessarily be authorized to access all resources. One or more embodiments may include an access control list for one or more resources in the authorization database of the authorization subsystem. The access control list for a resource may specify for example which users or groups of users may access the resource, or what permissions each user has for the resource. In some situations, access to a resource may be limited for example to the sender and recipient or recipients of the message containing the resource or resource reference. In these situations, if a recipient forwards a message with a protected reference to another authorized user of the system, that user would not be able to access the resource if he or she was not a recipient of the original message, unless the recipient also forwards a password or other access mechanism.

One or more embodiments may create log entries describing attempts by unauthorized users to access protected resources. These log entries may assist system users and administrators in identifying potential leaks of information and potential violations of security policies. In one or more embodiments log entries, messages, or alerts warning of access attempts by unauthorized users may be sent automatically to one or more recipients, such as for example system administrators or the original sender of a message.

In one or more embodiments if an unauthorized user of a resource attempts access, the system may give this user the option of requesting access to the resource from the appropriate authority such as the sender, the recipient, or a system administrator.

One or more embodiments may use authorization techniques that do not require obtaining credentials from a user. For example, one or more embodiments may set a maximum number of times a resource can be accessed. The authorization subsystem may track access counts, and block further access once an access count for a resource reaches the maximum. Similarly, one or more embodiments may set a maximum length of time that a resource can be accessed, using for example an expiration date for a protected reference.

One or more embodiments may track an access history for each protected resource reference; the access history may for example be an accessed-by list of distinct users who have accessed the protected resource reference. One or more embodiments may limit the maximum number of users on the accessed-by list for a resource reference. When a new user attempts to access a protected resource reference, access may be allowed only if the size of the accessed-by list for the resource is below the maximum users count for that resource. When a user who is already on the accessed-by list for a resource attempts a subsequent access, access may be allowed. This scheme is illustrative; one or more embodiments may use any desired access control mechanism to limit or control access to protected resource references.

In one or more embodiments a resource may be an attached file. The secure resource access subsystem may be configured to open the file in a sandbox environment to mitigate potential threats from the file. A protected reference to the file may for example contain an address of a proxy server that manages the sandbox environment, and an encoded reference to the sandboxed file. After a user passes an authorization check, the proxy server may decode the reference and open the sandboxed file in the sandbox environment. In one or more embodiments a sandbox environment may be for example a cloud-based file system with managed cloud applications coupled to the file system; files may be opened using the managed cloud applications to provide access in a secure environment.

One or more embodiments may obtain or derive threat protection rules or signatures from stored data, such as a messaging system database. A messaging system database may comprise for example contact lists; archives of messages previously sent, received, or drafted; and summary data derived from these sources. The system may include a message filter that analyzes a message for threats by comparing it to messages in the message archives, to contacts in the contact lists, or to the summary data. The filter may analyze any or all of the parts of the message, including for example the sender or senders, the receiver or receivers, the message contents, the subject, embedded links to websites or other resources, and a message thread associated with the message. If the message filter detects a potential threat, it may block the message or selected message parts, or it may transform the message. Transformations may for example insert warnings to the user of potential threats, embed additional checks to be performed when the user attempts to access the message, or encode links or other content. In addition to analyzing internal data such as message archives, contacts lists, or summary data, one or more embodiments may also analyze one or more external databases to determine whether a message contains a potential threat. External databases used may include for example, without limitation, databases of blacklisted senders or websites, databases of spammers, and DNS and whois servers.

In particular, one or more embodiments may check a message for threats by analyzing whether a message archive contains a previous communication with the message sender. If not, the message may be flagged as a potential threat since it is the first communication with the sender. Similarly, a message may be flagged as a potential threat if the message sender does not appear in the contact list of a messaging system database. One or more embodiments may also treat a sender as a potential threat if the sender is in the contact list but has been added to the contact list only recently. One or more embodiments may assign a threat level to a message sender which may take on multiple values rather than just a binary classification of "trusted, no threat" or "potential threat." For example, one or more embodiments may rate the threat level of a message sender on a continuous scale, ranging from a minimum value of "no threat" to a maximum value of "definite threat." In one or more embodiments the threat level may for example correspond to or relate to a probability that the sender is a potential threat. In one or more embodiments the level may reflect a level of authentication for the user, with a fully authenticated user assigned a low threat level. Various threshold values may be applied for actions or warnings based on an assigned threat level. For example, a warning may be provided for a message for which the probability of threat for the sender is above 50%.

In phishing attacks, senders may attempt to impersonate actual contacts of the receiver, for example using an email address or identity that is almost the same as that of an actual contact. Therefore, one or more embodiments may check a message for potential threats by checking whether the message sender is similar to, but not identical a person or organization in the contacts list. This check may for example use a distance metric between the sender identity and the contact identity, and flag a message as a potential threat if this metric is below a threshold value, but greater than zero. One or more embodiments may use any type of identity to compare a message sender with a contact, such as for example an email address, the display name of an email address, or the domain name of an email address. One or more embodiments may compare biometric identifiers of a message sender with biometric identifiers of contacts; biometric identifiers may include for example, without limitation, a fingerprint, a palm print, a voice print, a facial image, and an eye scan. In addition to or instead of comparing senders to contacts to look for similar identities, one or more embodiments may compare senders to previous senders or receivers of messages in the message archive.

A malicious sender may also impersonate the identity of an entity in a contact list that may be viewed as legitimate by the receiver, even if the entity is not capable of sending messages. One or more embodiments may recognize these senders as threats since they are not associated with known entities capable of sending messages. As an example, contact lists often provide for named distribution lists; distribution lists are typically receivers of messages rather than sources of messages. One or more embodiments may therefore flag messages from a sender with a name matching a distribution list as a suspicious message. One or more embodiments may similarly flag messages from addresses that are set up by an organization as receive-only addresses.

Phishing attacks or other attacks may send messages that include links to malicious websites. Attackers may create websites that imitate known, legitimate websites, in an attempt to trick users into entering information. Therefore, one or more embodiments may check a message for potential threats by comparing the identities of embedded links to the identities of websites referenced in previous messages in a message archive; links that are similar to, but not identical to, previously received links may represent attacks. One or more embodiments may use a distance metric to measure the similarity of links. One or more embodiments may also compare the domain names of links to the domain names of email addresses in messages of a message archive, to look for links with domain names that are similar to but not identical to these email domain names. Similarity comparisons may compare display representations of names in addition to or instead of underlying textual representations, to protect against homograph attacks that for example use internationalized characters to form forged names that resemble names of legitimate websites or users. In one or more embodiments a link similarity comparison may focus primarily or exclusively on the domain name portion of a link, rather than the full link path. For example, if a previously received message contains a link to:

http://www.bankofolympus.com/login/welcome, then a new link to:

http://www.bankofolympus.com/branches/search may be considered safe, since the domain names (www.bankofolympus.com) are identical even though the full link paths are very different. In contrast, a new link to http://www.bankofolympics.com/login/welcome may be flagged as suspicious since the domain name (www.bankofolympics.com) is slightly different from the previous domain name (www.bankofolympus.com).

Another indicator of a potential attack is a message that contradicts earlier messages. For example, an attacker may intercept a message asking a user to transfer money to an account number; the attacker may then forge a message to the user telling the user to disregard the previous message and instead transfer money to a different, fraudulent account number. One or more embodiments may detect potential threats by comparing a message to messages in a message archive to look for inconsistencies or contradictions. A change in an account number is an example of such a contradiction. Other examples of contradictions may include for example changes in physical addresses (such as an address to which a user is supposed to send money or products), or changes in phone numbers. One or more embodiments may check whether a message appears to be unusual given the pattern of previous messages; for example, a message may be flagged as a potential threat if it asks the user to perform an action (such as clicking a link), when no previous message from the same sender asks the user to perform this action. One or more embodiments may flag a message as contradictory or suspicious if it refers to a conversation, a message thread, a topic, a subject, or a previous message that does not appear in the message archive. For example, a message with a subject of "Re: Payment" may be received, when there is no message in the archive with a subject of "Payment"; this inconsistency may be flagged as a contradiction.

The message filter may transform messages in any manner to block all or part of a message, to provide warnings, to insert additional threat checks, or to encode or hide information. One or more embodiments may transform a message by inserting warning text or graphics into one or more message parts. One or more embodiments may transform a message by converting a link to an encoded link, where clicking on the encoded link may perform additional checks, and may display a warning to a user before connecting to the original link target. A warning may, for example, warn a user not to provide personal or sensitive information to the website, or warn a user that the site is not the same as a similarly named well known site.

An encoded link may invoke additional security or threat checks when the link is clicked. One or more embodiments may for example check the registration records of a domain when the encoded link for that domain is clicked. A domain name that has been recently registered, or that was registered for a short period of time (such as only a year), may be considered a potential threat. A domain name with low traffic to or from the domain until recently may also be considered a potential threat, since it may for example represent a phishing site that was registered but "dormant," which was recently activated for purposes of an attack.

One or more embodiments may transform a message to protect personal, sensitive, or confidential information so that only authorized users can see the information. A message transformation may for example encode this personal, sensitive, or confidential information. Examples of information that may be encoded may include, without limitation, account numbers, passwords, credentials, social security numbers, financial data, personnel records, or medical information. Information may be encoded for example into a link that the receiver must click to access the encoded information; the system may require authentication information from the receiver before decoding and displaying the original information. One or more embodiments may use natural language processing techniques to recognize this potentially sensitive information. Alternatively, or in addition, one or more embodiments may provide methods for message senders to tag potentially sensitive information so that the system will encode this information prior to sending the message.

In one or more embodiments a transformation may be applied to a message with personal, sensitive, or confidential information to limit the recipients to a set of authorized recipients. For example, the system may delete recipients that are not authorized to receive the information, based for example on the domain name of their email address or on an access control list for specific information or specific types of information. One or more embodiments may substitute an authorized email address for an unauthorized email address for the same user, if this user has an authorized email address. For example, a user may have multiple email addresses, and a sender may accidentally or maliciously attempt to send a message to one of a user's email addresses that for example may be inappropriate for the information content of the message. The system may recognize this situation based on analysis of the message contents, and warn the user and/or substitute the correct, appropriate email address for the inappropriate email address for that user.

BRIEF DESCRIPTION OF THE DRAWINGS

The above and other aspects, features and advantages of the invention will be more apparent from the following more particular description thereof, presented in conjunction with the following drawings wherein:

FIG. 12 illustrates an embodiment of an Authorization Subsystem that limits resource access by setting a maximum number of times a resource may be accessed.

FIG. 13 illustrates an embodiment of the invention that provides secure access to a resource by opening it in a managed cloud application rather than on a user's local computer.

FIG. 14 shows an architectural overview of an embodiment of the invention that uses a messaging system database with Contacts and a Message Archive to determine whether a message presents or contains a potential threat.

FIG. 17A illustrates a variation of FIG. 17, wherein a message from a sender who was only recently added to the Contacts list is considered a potential threat.

FIG. 21 illustrates an embodiment that detects a potential threat in an embedded link to a website if the link is similar to, but not identical to, a link in a previously received message.

FIG. 23 illustrates an embodiment that detects a potential threat if a message contradicts a previous message; in this case the new message provides an account number that differs from a previously sent account number.

FIG. 24 illustrates an embodiment that detects a potential threat if a message is unusual compared to a pattern of previously received messages from the sender.

FIG. 26A illustrates an embodiment that checks history of traffic levels to a website to assess whether the site presents a potential threat.

FIG. 29 illustrates an embodiment that transforms a message containing confidential or sensitive information by deleting receivers whose email addresses are not in a domain authorized to receive the information.

FIG. 30 extends the example of FIG. 29 with an embodiment that substitutes an email address in an authorized domain for an email address of the same user in an unauthorized domain, when the user has an email address in an authorized domain.

DETAILED DESCRIPTION OF THE INVENTION

A malware detection system based on stored data that enables electronic message threat protection will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
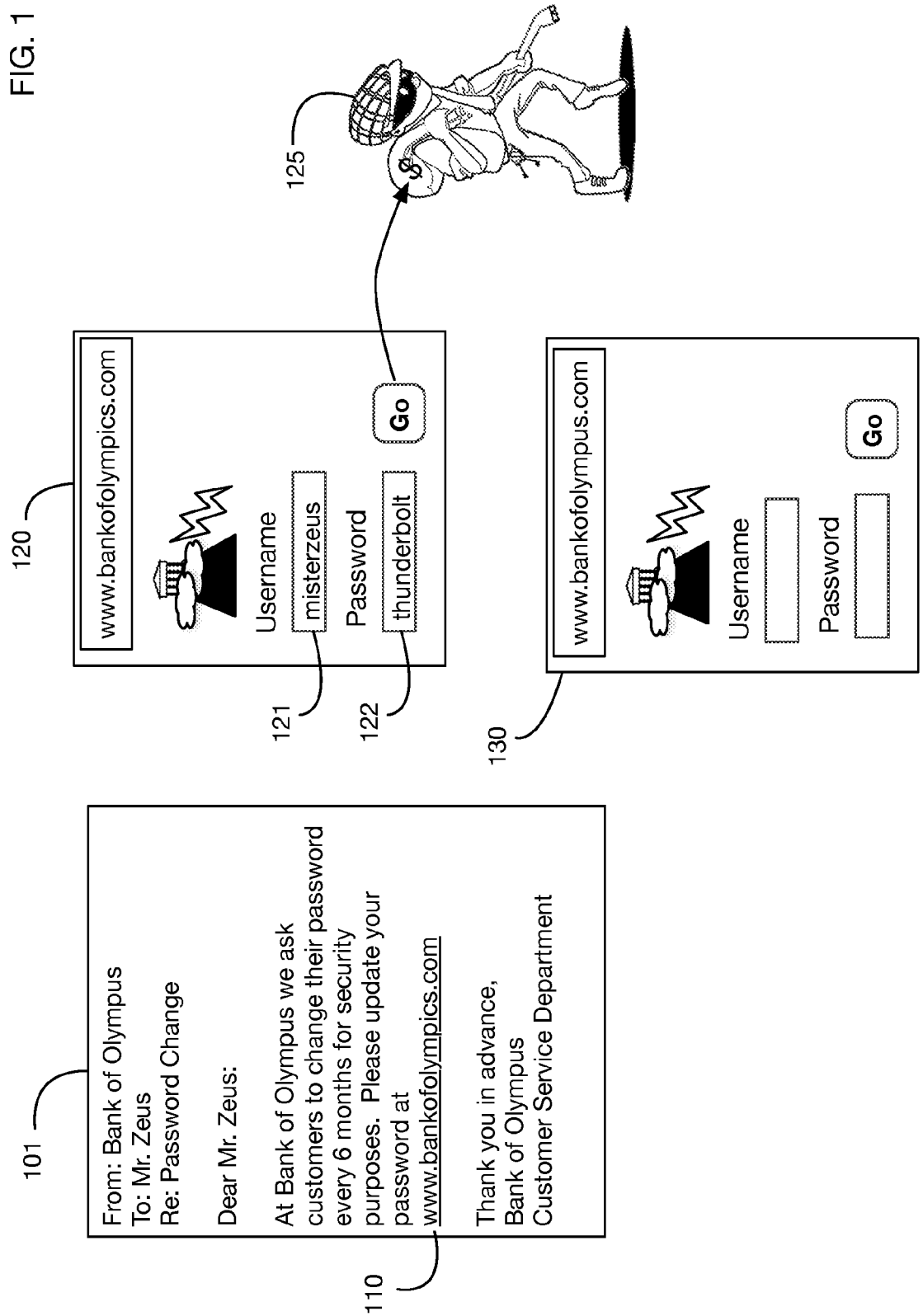
FIG. 1 illustrates an example of a problem addressed by one or more embodiments of the invention: an email contains a link that appears to refer to a legitimate web page, but is in fact a phishing attack designed to steal a user's credentials.

FIG. 1 illustrates an example of a problem that one or more embodiments of the invention address. This problem is that electronic messages may contain resources or references to resources that contain threats. Resources may present many different kinds of threats, such as for example viruses, worms, Trojan horses, or malware. FIG. 1 illustrates a particular example of a phishing attack threat embedded in a link reference to a web page. Electronic message 101, an email message, contains a link 110, and it asks the receiver to click on the link. As is typical of spear-phishing attacks, the message 101 is addressed to a specific receiver and it includes enough plausible information to make the receiver believe that the message is legitimate. The link 110 actually points to a malicious web site 120, which is designed to look very similar to the legitimate web site 130 that the recipient believes he is viewing. The URLs of the malicious site 120 and the legitimate site 130 are only subtly different, reinforcing the illusion. If the recipient enters his name 121 and password 122 into the malicious web page, they are sent to a thief 125 who can then use these credentials as desired.

This example illustrates a particular type of threat addressed by one or more embodiments of the invention. One or more embodiments may address any type of threat embedded in any type of electronic message. Threats may be incorporated for example, without limitation, into email messages, instant messages, text messages, personal messages, chat messages, Twitter™ messages, Instagrams™, voicemails, video messages; and postings onto social media sites, blogs, forums, newsgroups, wikis, or databases. Threats may include for example, without limitation, viruses, worms, spam, phishing attacks, spear-phishing attacks, social engineering attacks, denial of service attacks, advertisements, malware, adware, and ransomware. Threats may be embedded into any types of resources included in or referred to in an electronic message, including for example, without limitation, attachments, files, links, media, forms, workflow automation mechanisms, or embedded or linked code in JavaScript or any other language.

Figure 2:
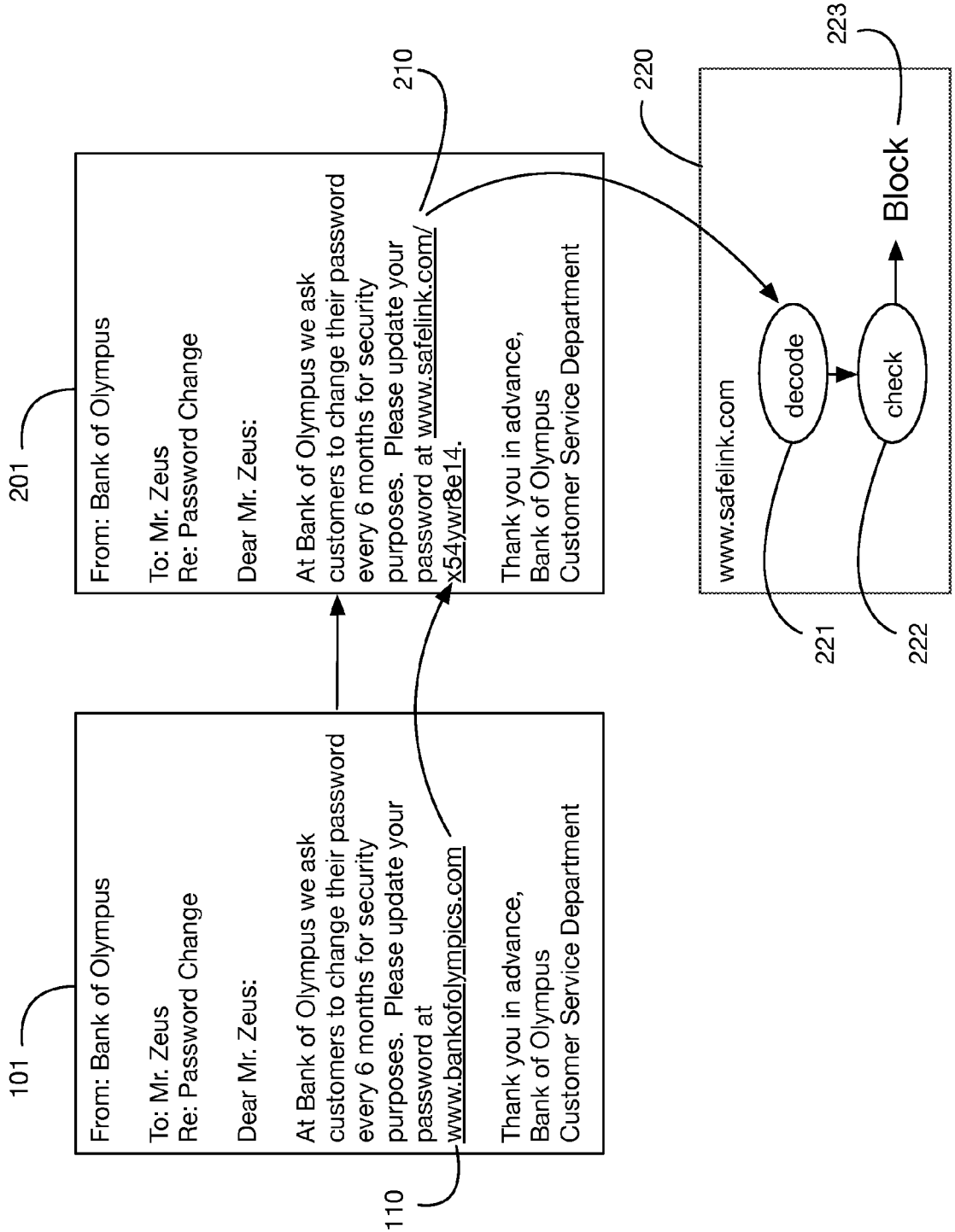
FIG. 2 illustrates a potential solution to the problem shown in FIG. 1 that is used in one or more embodiments of the invention, where a link is rewritten into an encoded form with threat checking added when a user clicks the encoded link.

FIG. 2 illustrates an example of a solution to the problem shown in FIG. 1 that is provided by one or more embodiments. Instead of sending email message 101 with malicious link 110 directly to the recipient, an email security layer transforms the message 101 into message 201, which transforms the link 110 to a protected, encoded link 210. The encoded link 210 does not connect directly to the web page 120. Instead it provides a level of indirection that incorporates a security check before opening the target web page. For example, the encoded link 210 points to a proxy server 220 (with URL "www.safelink.com"), and the encoded link 210 has a path ("x54ywr8e14") that is used internally by the proxy server to identify the original web page referred to by link 110. The proxy server 220 executes a decode step 221 to recover the original link, and it performs a check 222 on the web page before opening it and sending its contents to the user. In this example the check 222 shows that the web page is malicious, so the proxy server blocks access 223 rather than allowing the user to see the malicious web page. One or more embodiments may use any desired methods to encode and decode links or other resource references. Any form of encoding may be used as long is enough information is available in the encoded link or encoded resource reference to recover the original link or reference. For example, one or more embodiments may use an invertible function to convert a link to an encoded form, and apply the inverse function to recover the original link. One or more embodiments may store an original link in a memory or database accessible to the proxy server, and generate a reference to the saved link address as the encoded link. One or more embodiments may for example keep a copy of the original message with the original resource references, and generate an encoded resource reference as a reference to the original message along with for example an offset identifying the location of the original reference in the original message.

Figure 3:
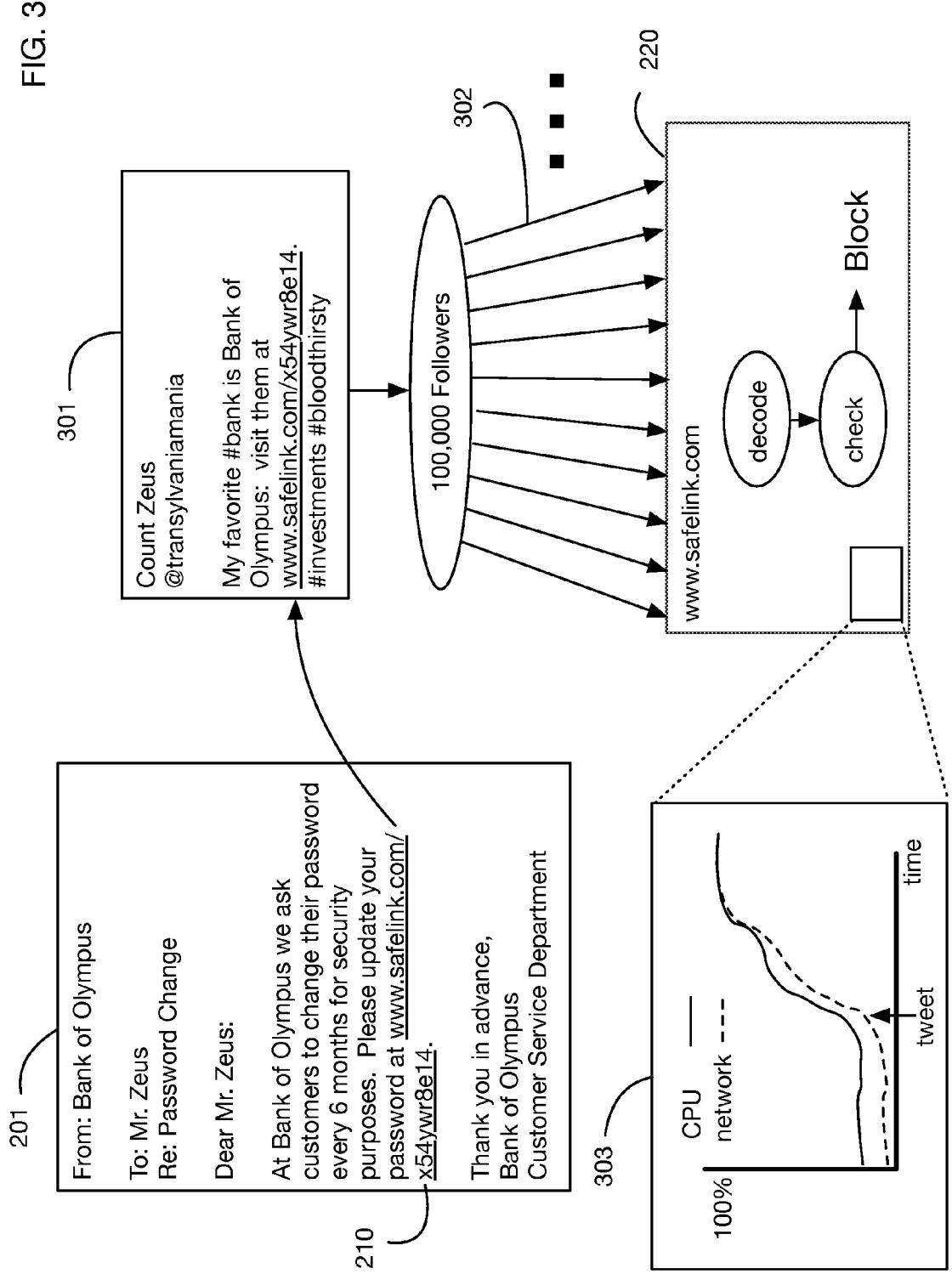
FIG. 3 illustrates a potential problem of the solution shown in FIG. 2, where an encoded link may be shared with a large number of people, many of whom may not have purchased threat protection, potentially overloading the threat protection system resources.

While the solution illustrated in FIG. 2 addresses the original threat of FIG. 1, it may create an additional problem, as illustrated for example in FIG. 3. Users can often copy resource references from electronic messages and redistribute or post them elsewhere. For example, users may copy and paste links, or forward messages to other users. If a resource reference is rewritten in a protected form, as illustrated in FIG. 2, the protected reference will be copied and distributed instead of the original reference. The protection provided by the system will then be available to any user of the copied protected references. This uncontrolled copying may create several problems, including an economic problem that the services provided by the system are available for free to users who did not pay for the services. In addition, FIG. 3 illustrates that widespread copying may create extreme system utilization problems. In FIG. 3, transformed message 201 has a protected link 210. The recipient of the message copies this link and widely distributes it, here in a tweet message 301. In this illustrative example, the user posting tweet 301 has a very large number of followers, each of whom receives a copy of the protected link 210. If many of these users attempt to access the protected link simultaneously, a very large number of requests 302 will be sent to proxy server 220. These requests may cause the resource utilization 303 of the proxy server to spike, potentially to the point that the server becomes unresponsive and unusable.

Uncontrolled copying of protected references may create additional problems. For example, in one or more embodiments protected references such as protected links may include information about the sender or recipient of the electronic message. This information may then be leaked along with the protected reference. Moreover, these leaks may be unintentional since the message recipient may not realize that this sensitive information is embedded in the protected reference. As an example, one or more embodiments of the system may provide an interface that shows personalized messages to a recipient when the recipient clicks on a protected link; these messages may for instance include sensitive information about the recipient or about the recipient's organization that should not be shared with others.

Figure 4:
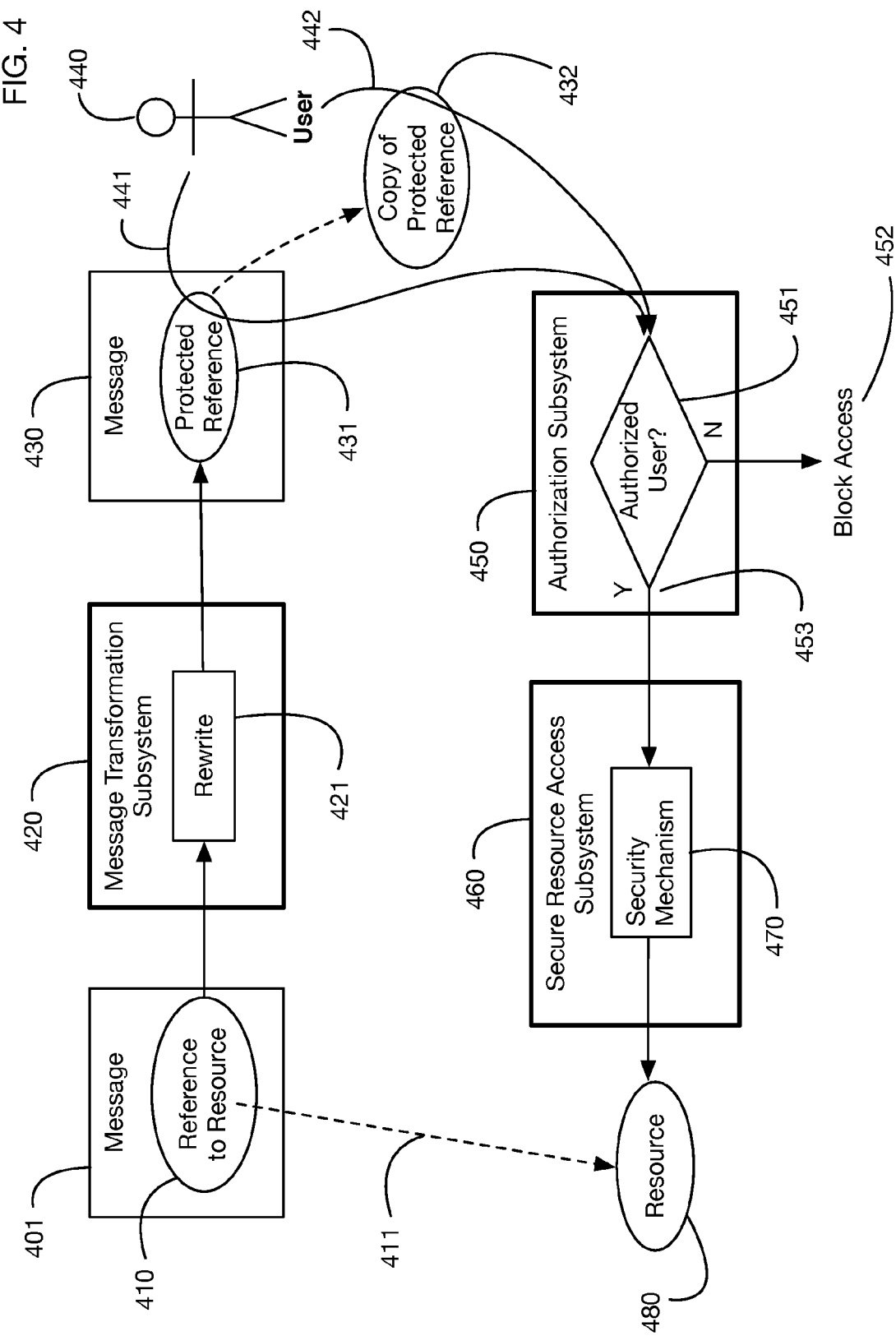
FIG. 4 illustrates an architectural block diagram of an embodiment that addresses issues like those shown in FIG. 3 by providing threat protection only to authorized users.

FIG. 4 illustrates an architectural block diagram of one or more embodiments of the invention that address the types of problems illustrated in FIG. 3. These embodiments add a user authorization check to the system to ensure that only authorized users receive the benefit of the threat protection transformations and checks. The system receives as input an electronic message 401 that contains a reference 410 to a resource. The reference 410 conceptually provides a link or a pointer 411 to a resource 480. In one or more embodiments the resource itself may be included directly in a message, rather than indirectly via a reference; in this case the reference 410 and the resource 480 may be considered identical. This link or pointer may have any form, such as for example, without limitation, a name, a directory name, an attachment, an address, a memory location, a key, an index, a virtual address, a URL, a URI, or a URN. The message may also have one or more senders and one or more recipients, as well as any other content or message parts. As discussed above, one or more embodiments may receive electronic messages of any type, which may include resource references of any type. The single reference 410 in message 401 is for illustration only; one or more embodiments may accept and process messages with any number of resource references. An electronic message with multiple resource references may have resources or references of multiple types; for example, a message may include one or more embedded links and one or more attached files. The system illustrated in FIG. 4 transforms the original message 401 to a transformed message 430 via Message Transformation Subsystem 420. Message Transformation Subsystem 420 includes a resource reference rewriting module 421 that transforms an original reference 410 to a protected reference 431. The transformed message 430 is then delivered to one or more message recipients.

One or more embodiments may execute Message Transformation Subsystem 420 on any computer or set of computers. For example, without limitation, a Message Transformation Subsystem or modules thereof may be embedded in an email client, in an email server, in an email gateway, or in any computer or computers attached to or reachable from any of these. Any system or systems in a communication path between a sender and a recipient may execute all or part of the functions of a Message Transformation Subsystem.

Protected reference 431 in message 430 may be copied in some situations to form a copy of the protected reference 432. While FIG. 4 shows only a single copy, in one or more embodiments any number of copies of a protected reference may be generated. Copies may be generated in many ways; for example, without limitation, a user may copy and paste a reference or a portion of a message, forward a message, forward a reference as a text message or as part of a text message, post a reference on a social media site, enter a reference into a database accessible by other users, post a reference in a wiki or a blog, send a Twitter® message including the reference, encode a reference in a QR code and distribute the QR code, reply to a message, print a message, or take a screenshot of a message. Multiple copies of a message may be sent to a distribution list or mailing list, generating multiple copies of a reference. A user 440 may attempt to access the resource via protected reference 431 or via a copy 432. User 440 may or may not be the recipient of the message 430. Access 441 of the protected reference 431, or access 442 of the copy of the reference 432 each cause the system to execute various authorization and security procedures before providing user 440 with access to the resource 480. In the embodiment illustrated in FIG. 4, the system includes Authorization Subsystem 450 that performs check 451 to determine if user 440 is an authorized user. This check prevents the type of problem illustrated in FIG. 3, where multiple unauthorized users can use copies of protected references to access the resource. If authorization check 451 indicates that the user is not an authorized user, the system blocks access 452. If the user is an authorized user, access is allowed 453, and control passes to the Secure Resource Access Subsystem 460. This subsystem of the embodiment of the system provides access to the resource 480 via a Security Mechanism 470. The specific security and threat protection services provided by the Security Mechanism 470 depend on the type of resource and on the types of threats anticipated and thwarted. For example, without limitation, Security Mechanism 470 may perform malware detection, identity confirmation to prevent phishing attacks, modification of a resource to eliminate potential threats, behavior monitoring to look for suspicious behavior, limiting of permissions, or execution of code in a sandbox environment. One or more embodiments may employ any type of Security Mechanism that allows access to a resource while mitigating one or more threats. One or more embodiments may employ multiple security mechanisms to address multiple types of threats, or to provide additional security.

In one or more embodiments, the Authorization Subsystem 450 and the Secure Resource Access Subsystem 460 may execute on the same computer or same group of computers. In one or more embodiments these subsystems may be separate and they may communicate over one or more network connections. Modules of these subsystems may execute for example on a client computer, such as the computer of a message recipient. They may execute for example as part of an email server that serves email messages to clients. They may execute for example on a server on which the resource is located. They may execute for example on a proxy server that is accessed by an email client, and which then communicates with a server that contains the resource. Any configuration of the functions of these subsystems on any computer or computers accessible to a user or to a resource, or on any path between a user and a resource, is in keeping with the spirit of the invention.

Figure 5:
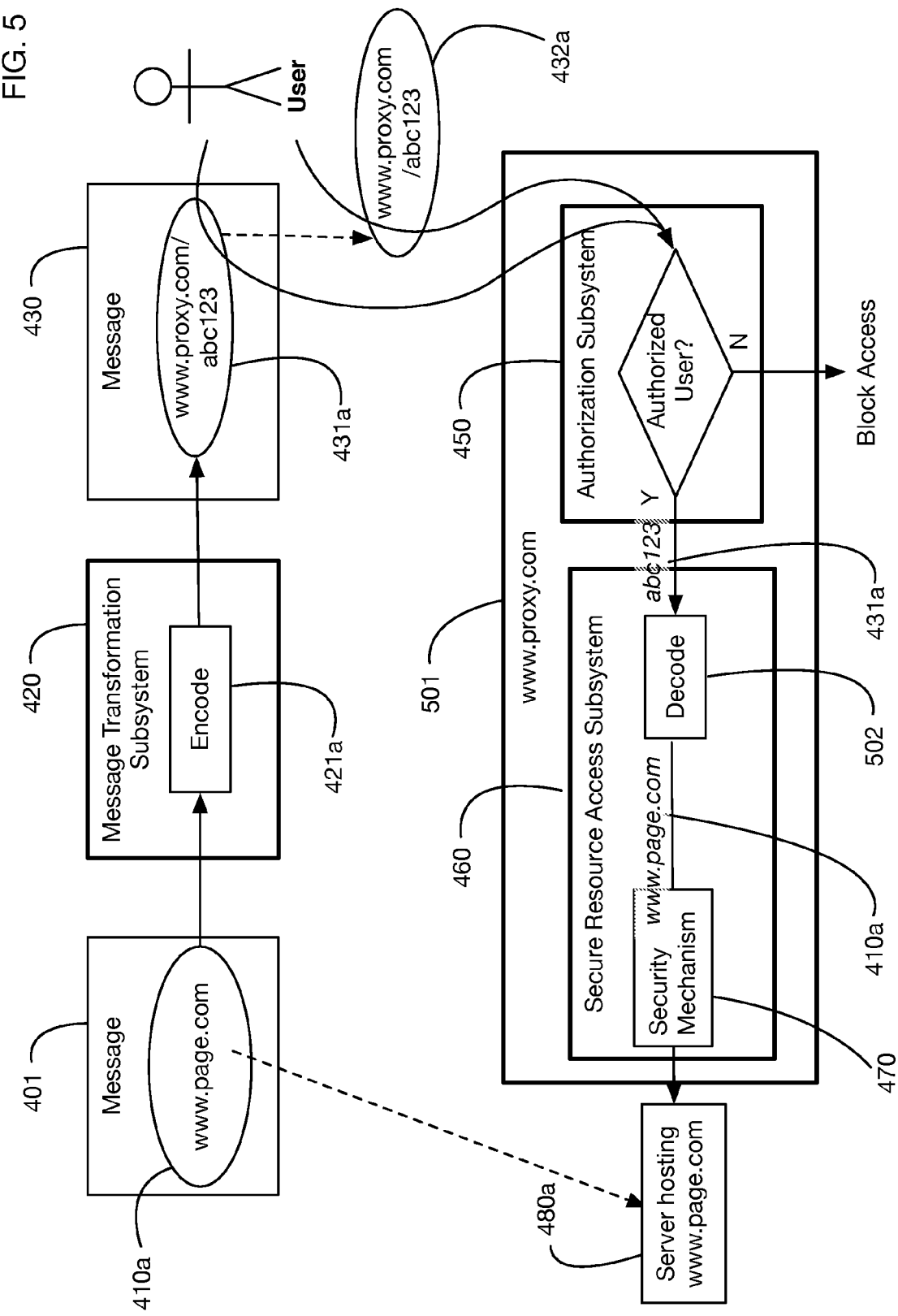
FIG. 5 illustrates an architectural block diagram of an embodiment that provides threat protection against links to malicious web pages embedded in electronic messages.

FIG. 5 illustrates an embodiment of the system that provides protection to authorized users for resource references that include links to web pages. This embodiment follows the general architecture illustrated in FIG. 4, with specific components to handle links. In this embodiment, message 401 contains a link 410*a* to a web page. One or more embodiments may accept messages with any types of links to any types of resource. Links may be for example, without limitation, any uniform resource locator (URL), uniform resource identifier (URI), or uniform resource name (URN) that reference any type of resource, including but not limited to web pages. URIs for example may use any URI scheme, including for example, without limitation, file, http, https, ftp, rtsp, telnet, imap, dns, smtp, mailto, news, or sms. Any method of referring to resources may be used by one or more embodiments. One or more embodiments may accept and rewrite messages with resources included directly in a message, rather than indirectly via a link or reference.

Message Transformation Subsystem 420 includes an Encode module 421*a* that rewrites the link 410*a* into an encoded form 431*a*. In the illustrative embodiment shown in FIG. 5, this encoded link 431*a* provides an indirect and encoded link to the resource through proxy server 501. Access by a user to the encoded link 431*a*, or to a copy thereof 432*a*, accesses the proxy server 501; the proxy server uses the path name ("abc123") after the proxy server's hostname ("www.proxy.com") to determine which resource is referred to. This scheme is illustrative; one or more embodiments may encode links or other resources or resource references in any desired manner. As discussed for FIG. 4, the proxy server first applies a check for authorized users via the Authorization Subsystem 450. If the user is authorized, the encoded link 431*a* is decoded by Decode module 502, yielding the original link 410*a* to the web page. Any method may be used to encode and decode links. For example, one or more embodiments may use a bijective cryptographic function using a key shared between the Message Transformation Subsystem and the Secure Resource Access System. As another example, in one or more embodiments the Message Transformation Subsystem may generate random encoded links and share a table associating encoded and decoded links with the Secure Resource Access Subsystem.

After user authorization, the Secure Resource Access Subsystem 460 provides access to the web page 480*a* via Secure Mechanism 470 in order to detect potential threats posed by the web page. FIG. 5 illustrates the Authorization Subsystem 450 and the Secure Resource Access Subsystem 460 executing on the same proxy server 501. This is an illustrative configuration; one or more embodiments may distribute these subsystems or modules of these subsystems across servers or other computers in any desired manner.

Figure 6:
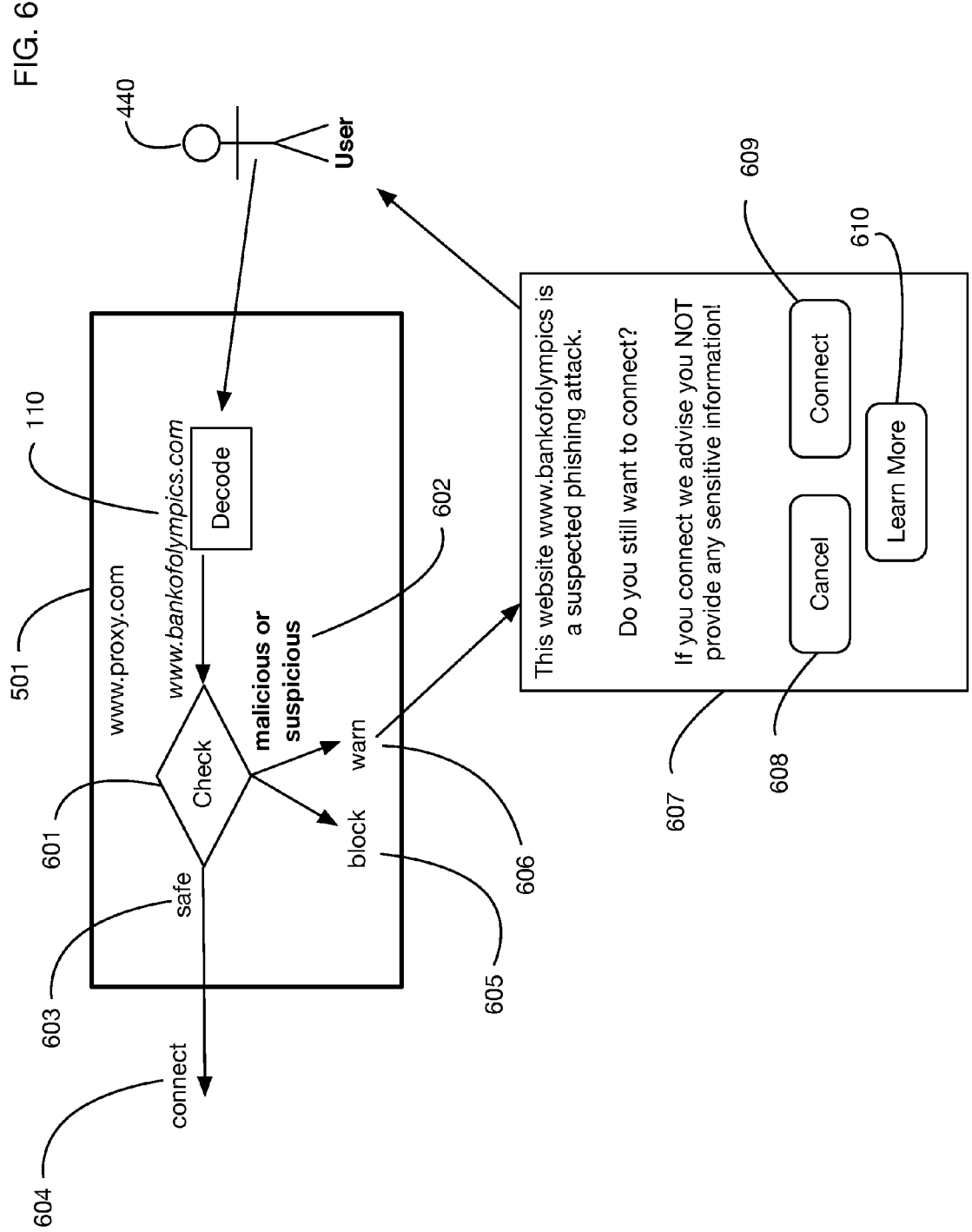
FIG. 6 illustrates possible outcomes of checking a link in an embodiment of the invention, which include connecting, blocking, or warning the user.

One or more embodiments may use various techniques to provide secure access to a link or other resource via a Security Mechanism. FIG. 6 illustrates an embodiment of the system that screens a web page first for possible threats, and then connects if the web page is deemed safe. Proxy server 501 receives a decoded link 110 from the Decode module. It then performs a safety Check 601 on the web page. This check may use any desired method to determine whether the web page presents known or suspected threats of any kind. Below we discuss a check method that uses whitelists and blacklists. Other examples of potential check methods that may be used by one or more embodiments include, without limitation, checking for a valid certificate from a recognized certificate authority, verifying the identity of the sender of a message using for example DomainKeys Identified Mail (DKIM) or Sender Policy Framework (SPF), checking whether the name of a web page or domain is suspiciously similar to that of a known legitimate site, checking the length of time a web page or domain has been registered (under the presumption for example that many phishing sites for instance may be recent or short-lived), checking the IP address associated with a domain for suspicious geographical locations, and using a recommender system to determine a web page's safety reputation.

In the embodiment shown in FIG. 6, Check 601 determines that the link 110 is either safe 603 or malicious or suspicious 602. If the link is deemed safe, the system proceeds to connect 604 to the web page. If the link is deemed malicious or suspicious, one or more embodiments may either block access 605, or warn the user 606. An illustrative warning 607 is presented to the user 440 who requested access to the link. This warning may for example explain to the user why the link is or may be dangerous. It may also provide user education on potential threats and how to avoid them. In this illustrative example the warning presents the user with three options: Cancel 608, which blocks access; Connect 609, which ignores the warning and connects; and Learn More 610, which may present more detailed information about the threat or about threats in general. One or more embodiments may always block 605 rather than warning a user. One or more embodiments may always warn 606 and never block 605. One or more embodiments may block certain links and warn the user about other links. In one or more embodiments a user warning may for example ask the user one or more questions about the link or about the message in which the link was included; the system may then determine whether to allow access to the link based on the user's response to the questions.

Figure 7:
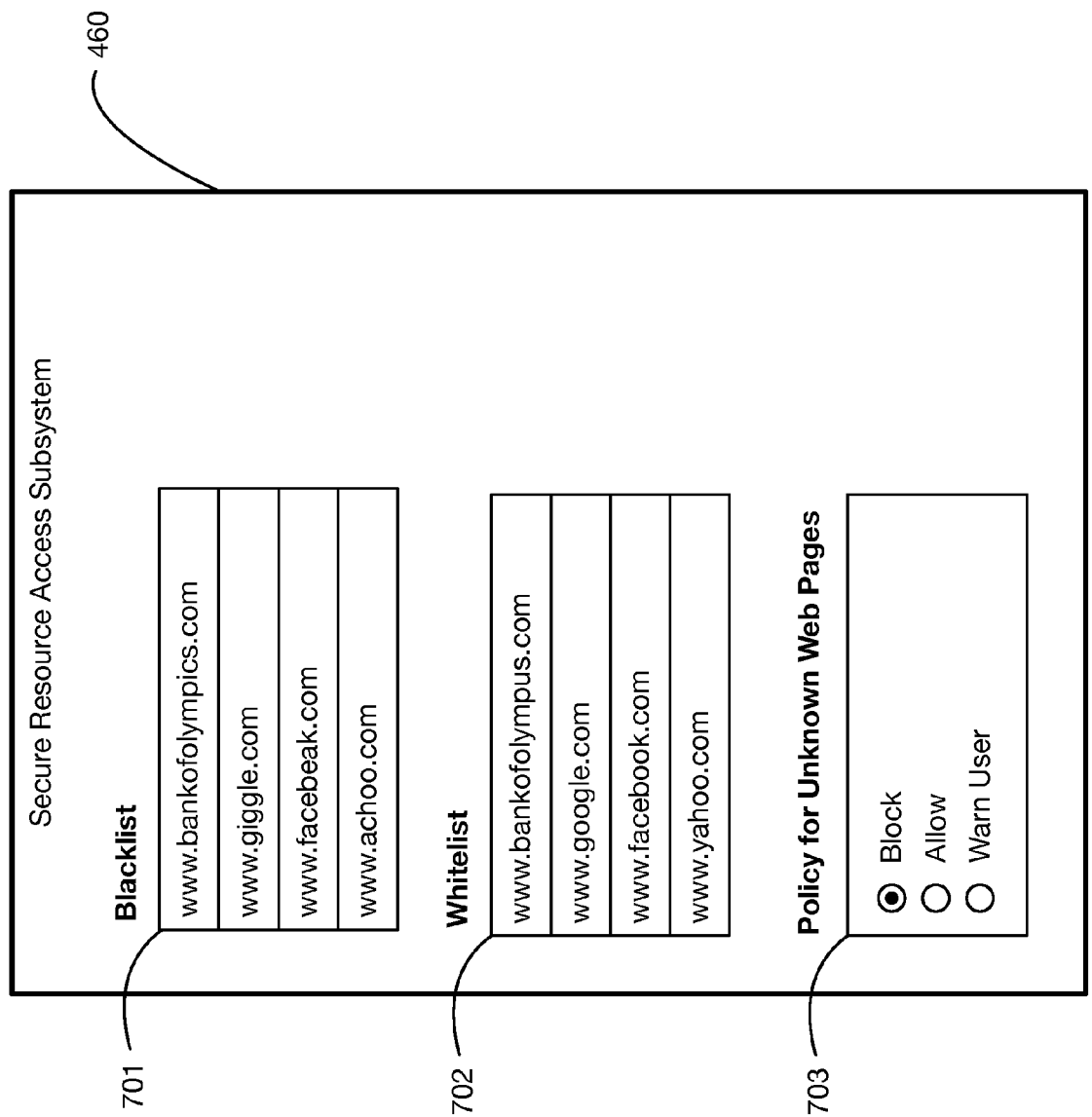
FIG. 7 illustrates an embodiment of a Secure Resource Access Subsystem that has blacklist and whitelist tables, and a policy for web pages in neither list.

FIG. 7 illustrates an embodiment of the system that uses a blacklist and a whitelist to determine whether to allow access to a link. The Secure Resource Access Subsystem 460 contains a Blacklist 701 of domain names that are known or suspected to be malicious, and a Whitelist 702 of domain names that are known or presumed to be safe. An illustrative checking method is to allow access to all links with domains in the Whitelist, and block access to all links with domains in the Blacklist. One or more embodiments may have only one of a Whitelist or a Blacklist. One or more embodiments may use any form of identity for a web page instead of or in addition to a domain name. A web page identity may include for example, without limitation, a domain name for the associated web site, a complete URLs for the web page, an IP address for the web site, or information associated with or derived from a certificate associated with the web site. The embodiment shown in FIG. 7 also has a Policy for Unknown Web Pages 703 that determines the action for a link that appears in neither the Whitelist 702 or the Blacklist 701; options shown are to Block these links, to Allow these links, or to Warn User about these links. One or more embodiments may apply other policies or have other configurable policy options for unknown web pages that appear in neither a Blacklist nor a Whitelist.

One or more embodiments may calculate a suspicion score for a link, and use this suspicion score to determine the action when a user attempts to access the link. For example, links with high suspicion scores may be blocked, those with low suspicion scores may be allowed, and those with intermediate suspicion scores may trigger a user warning. Embodiments may use any desired methodology to calculate a suspicion score. For example, an illustrative suspicion score may be based on how closely the name of a domain from a link matches the domain name of a known legitimate website (while not matching it identically). An example name proximity score is the minimum number of letters that must be added to, deleted from, or modified in one name to obtain another name. An example suspicion score is then for example the inverse of the proximity score (possibly with scaling or offset constants). We take as an illustration the suspicion score: suspicion=10−name proximity. Using the links in FIG. 7 as an illustration, the name proximity score between www.bankofolympics.com and www.bankofolympus.com is 2, since the former can be derived from the latter by replacing "u" with "i" and adding "c". Presuming that www.bankofolympus.com is a known legitimate site, the suspicion score for www.bankofolympics.com is therefore 8. Another illustrative link, www.bankofoliphant.com, has a name proximity score of 6 and a suspicion score of 4; therefore it would be considered less suspicious than www.bankofolympics.com. These calculations and score definitions are illustrative; one or more embodiments may employ any desired methodology to rate or classify links or resources or resource references in order to determine actions when a user attempts to access the link or resource.

In one or more embodiments the suspicion score for an identifier (such as link domain name) may use similarity of a display representation of that identifier to the display representation of another identifier. Comparison of display representations rather than underlying textual representations may protect against homograph attacks using internationalized domain names, for example.

Figure 8:
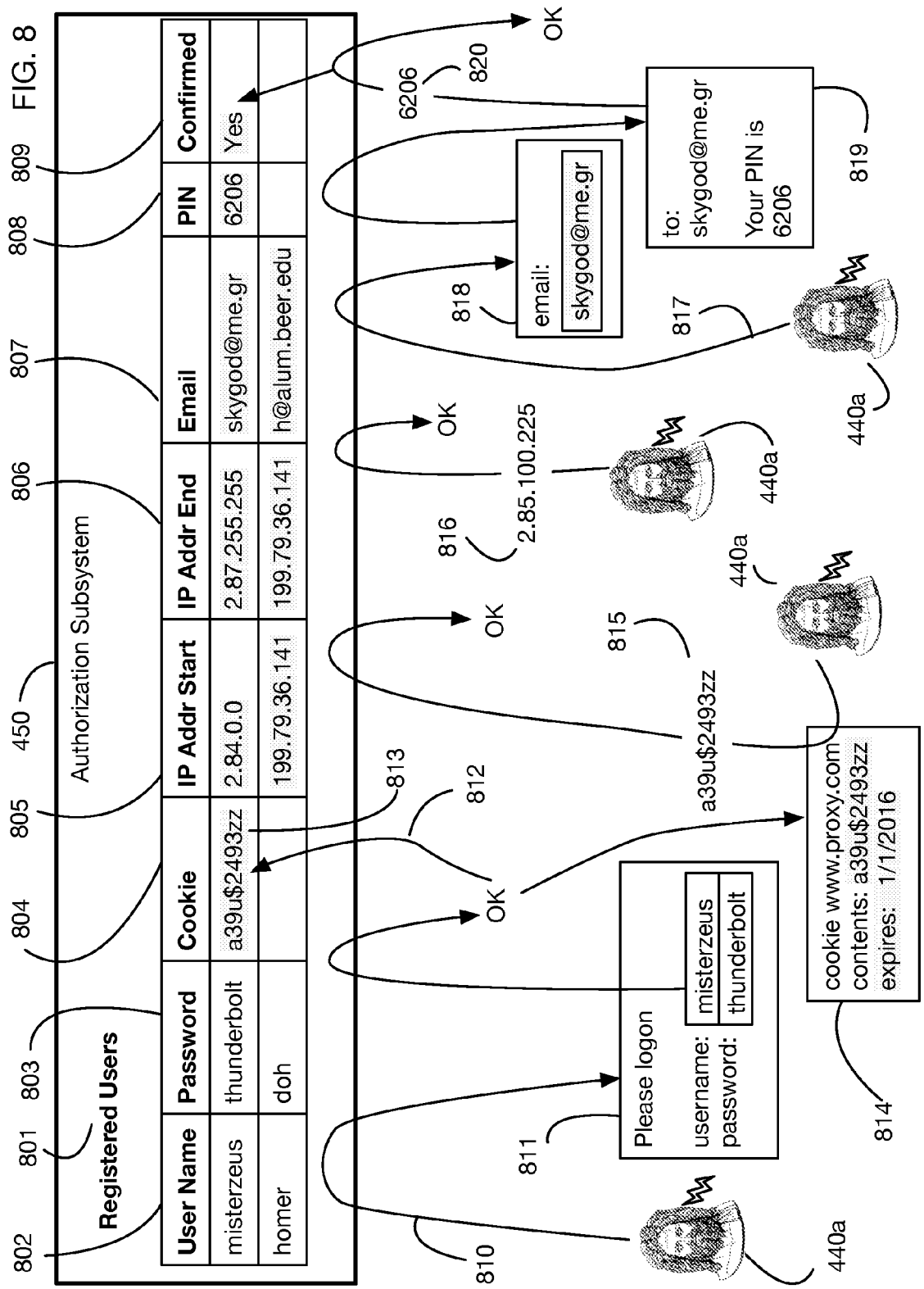
FIG. 8 illustrates an embodiment of an Authorization Subsystem that may obtain one or more types of user credentials to authenticate a user.

Turning now to the Authorization Subsystem, one or more embodiments may determine if a user is an authorized user by requesting credentials from the user and validating these credentials. FIG. 8 illustrates an embodiment in which the Authorization Subsystem 450 includes a table 801 of registered users and their credentials. This table may for example be created by an administrator. One or more embodiments may provide tools for administrators or other users to create or edit user registration entries and credentials, including for example tools to revoke user authorizations. The table 801 may for example be stored in a database or in any other format. One or more embodiments may use any type or types of user credentials. The Registered Users table 801 illustrates some possible credentials that may be used in one or more embodiments. The table has a User Name column 802 and a password column 803. One or more embodiments may use any type of password or PIN and may store these in any unencrypted, encrypted, or hashed form. One or more embodiments may use salted hashing. User 440*a* attempts access 810 to a protected resource, and the Authorization Subsystem responds with a logon prompt 811 requesting the user name and password; the password is checked against the table 801 and access is permitted. In this illustrative embodiment, after a successful logon credentials are cached in a cookie 814 stored on the user's local computer, and the value 813 of this cookie is added 812 to the table 801 in column 804. A subsequent access attempt by user 440*a* retrieves and transmits this cookie value 815 to the Authorization Subsystem; the Authorization Subsystem can check the cookie value against the stored value 813 and authorize the user without re-requesting a password. This implementation of stored and cached credentials using a cookie is illustrative; one or more embodiments may use any desired method to cache credentials after an initial validation. One or more embodiments may cache credentials in any memory accessible to a user or to a user's computer.

FIG. 8 illustrates another possible user authorization technique using the user's IP address. The Registered Users table 801 includes an IP address range for each user, stored in columns 805 and 806. When user 440*a* attempts access, the user's IP address 816 is automatically provided to the system, and the system can check it against the expected IP address range for the user. IP address checks may be particularly useful for example to ensure that employees only access resources from authorized computers with known IP addresses. One or more embodiments may use IP checking as the only or the primary authentication mechanism. One or more embodiments may require additional authentication information in addition to the IP address of the user. One or more embodiments may combine IP address checking with passwords, cookies, or any other scheme for checking user credentials. For example, one or more embodiments may check a user's IP address first, and then use a logon prompt for a password if the initial IP address check fails. One or more embodiments may use any type of user credentials, including for example, without limitation, passwords, PINs, biometric credentials, security certificates, access requests that result in a one-time PIN being sent to a user's registered email or texted to a user's registered mobile device, responses to challenge questions, single sign-on credentials, or security tokens such as USB keys or smart cards. One or more embodiments may use multi-factor authentication combining credentials in any desired manner.

FIG. 8 illustrates another possible user authorization technique that confirms a user's identity by sending a one-time PIN to the user's email address, which may be time limited for example. User 440a attempts access 817 to a protected resource reference, and the system responds with a registration prompt 818 asking the user to provide his or her email address. This causes a one-time PIN to be sent to that email address in message 819, or sent via SMS or in any other manner. The system may first verify that the email address is a valid email for an authorized user of the system. The PIN is stored in column 808 of the Registered User's table 801. In one or more embodiments the stored PIN may be encrypted or hashed. The user provides the PIN 820 to the system, which then indicates that the authentication and user registration is complete in the Confirmed column 809. In one or more embodiments the PIN-based registration may be valid for a limited period of time, and it may for example need to be repeated with a new PIN after an initial registration and authentication has expired.

Figure 9:
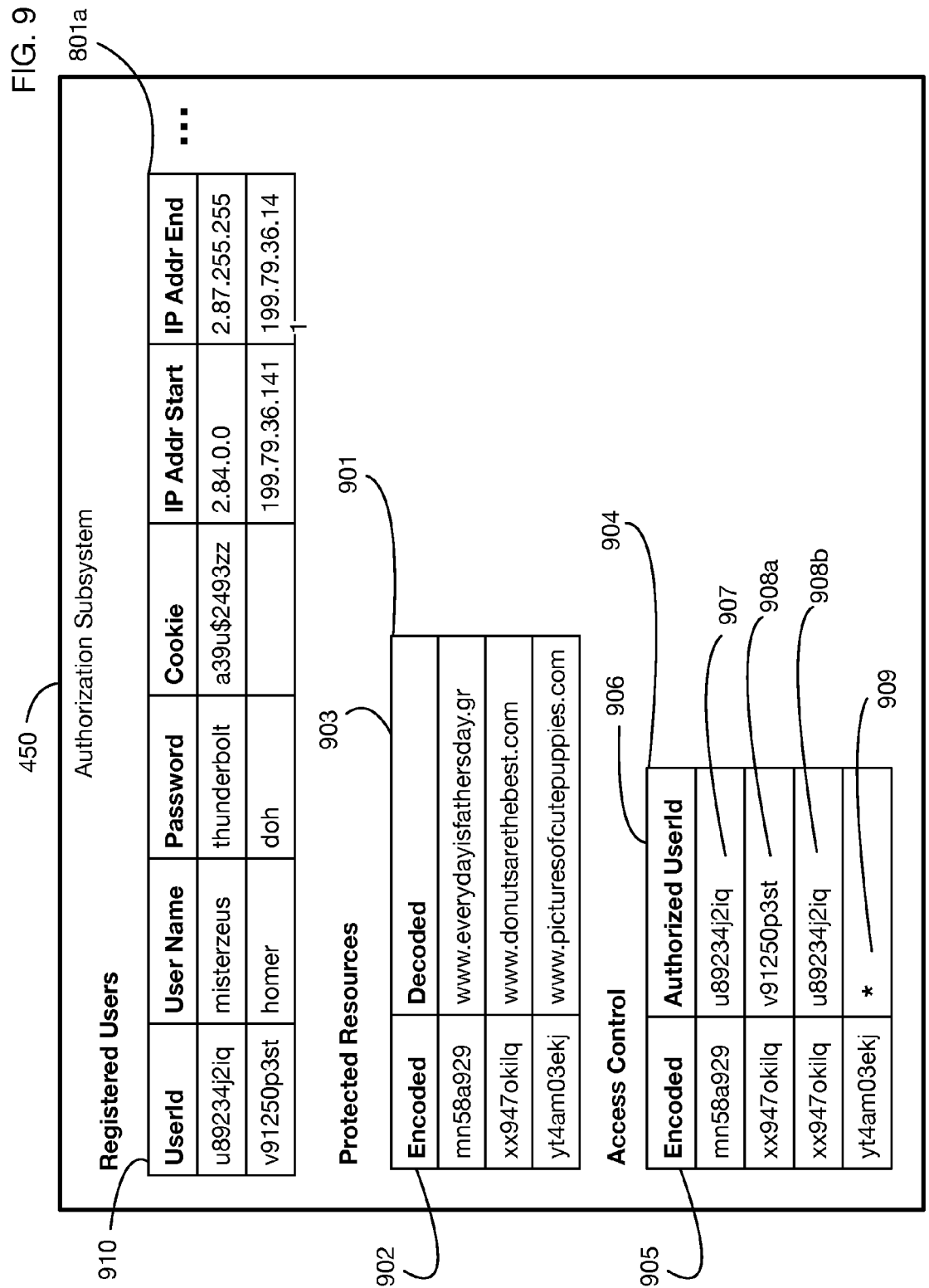
FIG. 9 illustrates an embodiment of an Authorization Subsystem that extends the user credentials illustrated in FIG. 8 to include access control lists for individual resources.

In one or more embodiments of the system, a user may require authorization for a specific resource (in addition to authorization for the system overall) in order to access the resource. FIG. 9 illustrates an embodiment that incorporates resource-specific access control into the Authorization Subsystem 450. In addition to the Registered Users table 801a that contains user credentials, this embodiment includes a Protected Resources table 901 that describes the protected resources, and an Access Control table 904 that indicates which users may access which protected resources. The Registered Users table 801a contains an additional column 910 with a unique ID for the user. The Protected Resources table 901 maps the Encoded links in column 902 into the corresponding Decoded links in column 903. The Access Control table 904 is a one-to-many table mapping the Encoded links in column 905 into the Authorized User Id 906 that may be for example a foreign key to the Registered users table 801a corresponding to column 910. This one-to-many mapping provides fine-grained access control that can grant or deny access of any user to any resource. For example, encoded link mn58a929 appears only in row 907, indicating that it may be accessed only by user u89234j2iq. Encoded link xx947okilq appears in rows 908a and 908b, indicated that users v91250p3st and u89234j2iq can both access the resource. Row 909 shows a "*" for the Authorized User Id associated with encoded link yt4am03ekj; this may indicate for example that all users authorized by the system may access this resource. One or more embodiments may use more complex access control lists that indicate for example specific permissions associated with each user and resource combination. For example, some users may have read-only access to a resource, while other users may have read and write access to a resource. In one or more embodiments an Access Control table may for example define access rules for groups of users in addition to or instead of individual users. In one or more embodiments an Access Control table may contain negative permissions that prevent specified users or groups from accessing specific resources or from performing particular actions. In one or more embodiments, use of the encoded resource reference 902 as the key to the Access Control table may provide an optimization since access authority for a user can be checked prior to decoding a link. In one or more embodiments Access Control tables or other access authorization mechanisms may use the decoded references rather than the encoded references, and decoding may be needed prior to checking authorization.

Figure 10:
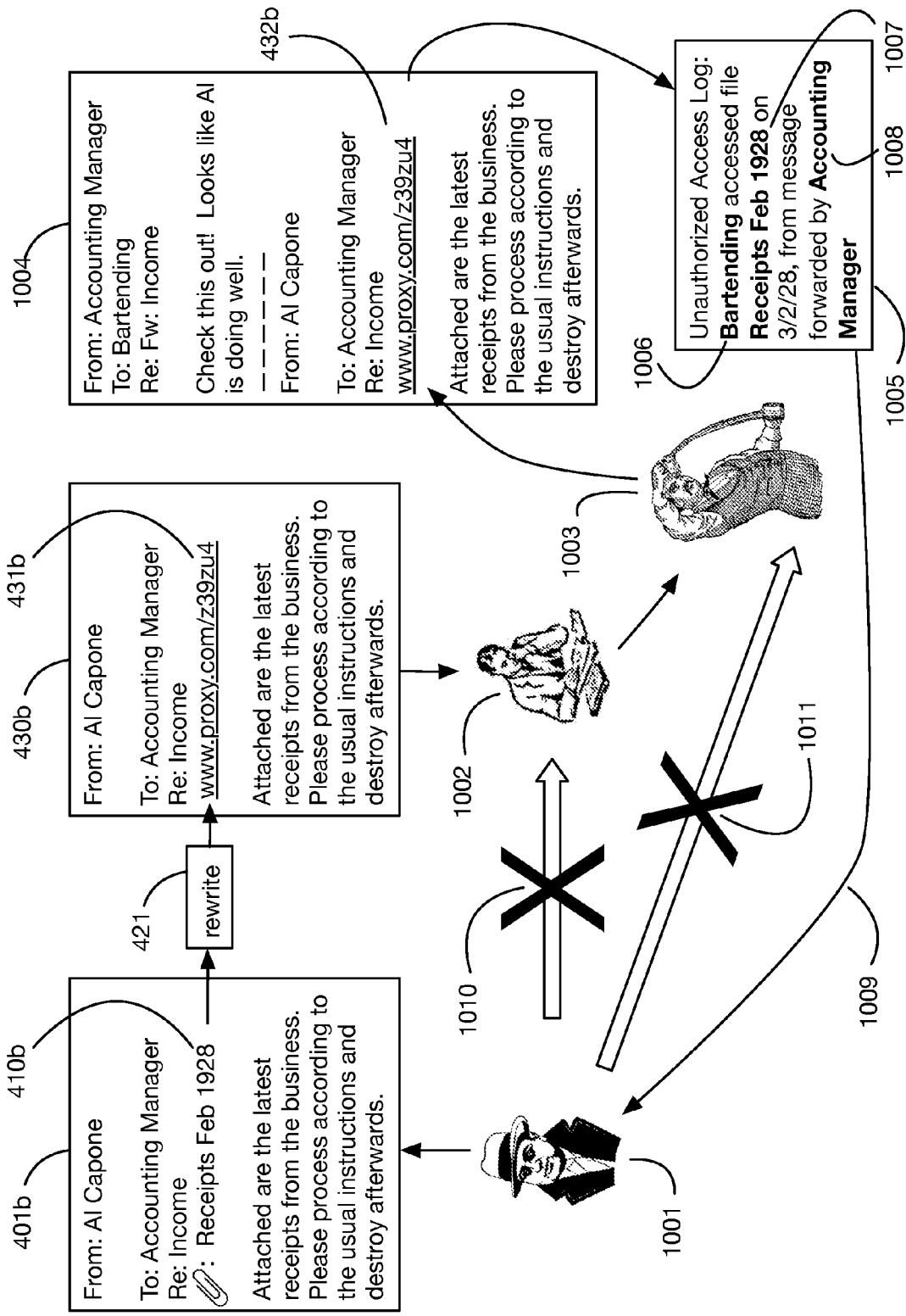
FIG. 10 illustrates an embodiment of the invention that provides access security for an email attachment, by logging unauthorized access attempts.

In one or more embodiments, the resources protected by the system may include message attachments. These attachments may include for example any kind of file or media, or any other item that can be attached to or included with an electronic message. FIG. 10 illustrates an example with message 401b from sender 1001 containing an attached file 410b. The system performs rewrite operation 421 on the attachment 410b and converts it to a protected reference 431b in protected message 430b. The protected message 430b is then delivered to the recipient 1002. Recipient 1002 makes a copy of the protected reference by forwarding the message 430b to another user 1003 as forwarded message 1004 with copy of the protected reference 432b. User 1003 then attempts to access the resource through this copy 432b of the protected reference to the resource. This example presumes that only recipient 1002 and sender 1001 are authorized users for the resource as defined for example in an access control list for the resource. User 1003 is an unauthorized user, and the system therefore blocks access, as described above. FIG. 10 also illustrates an additional feature of one or more embodiments wherein unauthorized access attempts may be logged with detailed information about the access attempt. The system generates Unauthorized Access Log entry 1005, which in this illustrative example describes the user attempting access 1006, the resource the user attempted to access 1007, and the source of the copy 1008. One or more embodiments may include any available information in an unauthorized access log entry, in order for example for senders or administrators to monitor communication paths, identify channels that may leak protected information, and monitor compliance with policies for secure information. In this example the Unauthorized Access Log 1005 is sent on path 1009 to sender 1001, who may then take corrective actions 1010 and 1011. In one or more embodiments access logs and notices of attempted unauthorized access may be sent immediately or periodically for example to senders, recipients, system administrators, security personnel, or any other relevant parties.

Figure 11:
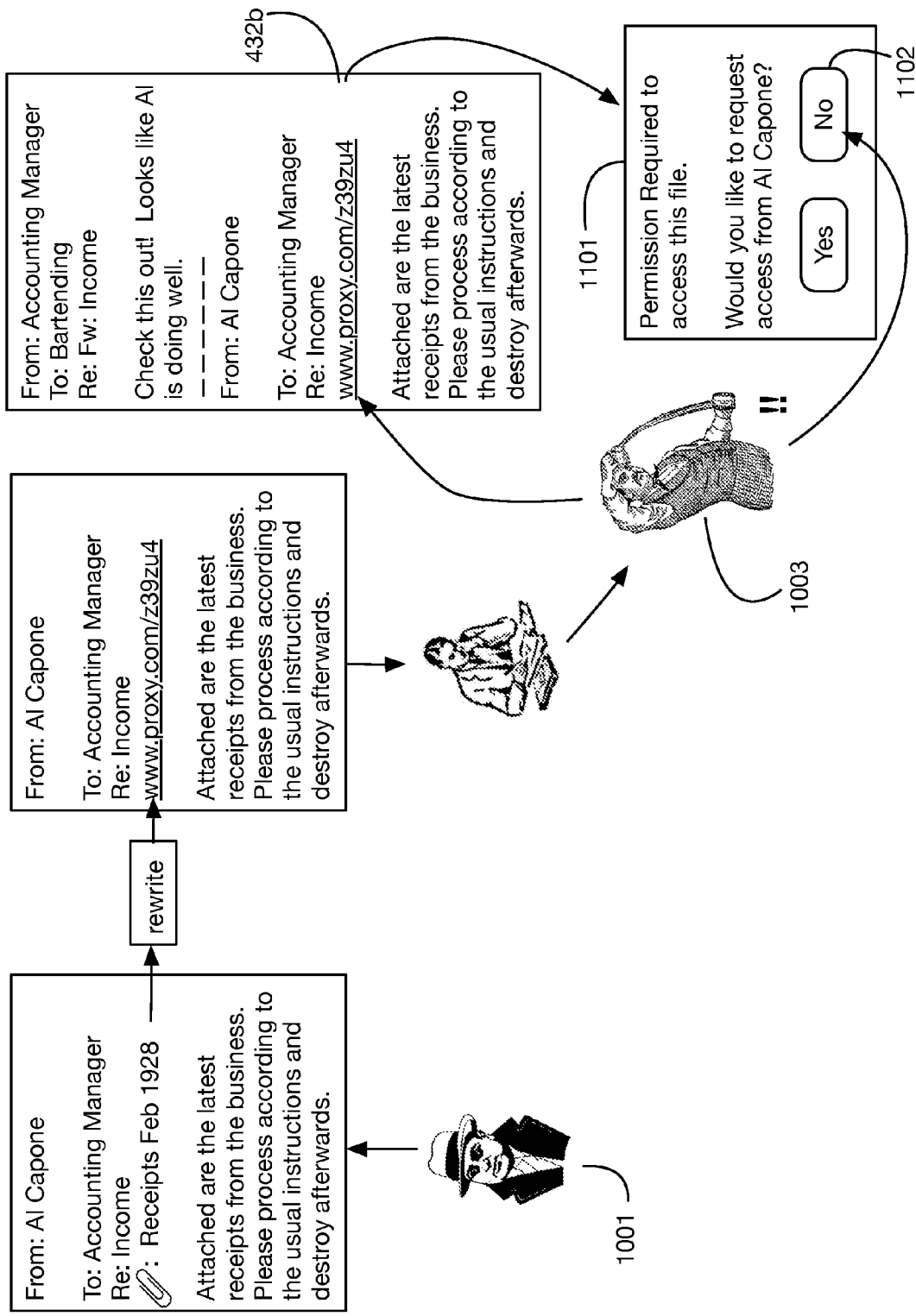
FIG. 11 illustrates a variation of the embodiment of FIG. 10 that asks an unauthorized user attempting to access a resource if he wishes to request permission to access the resource.

FIG. 11 illustrates an embodiment that is a variation of the example shown in FIG. 10. In this example, an attempt by unauthorized user 1003 to view protected resource reference 432b triggers a prompt 1101 to user 1003 informing him that permission is required to access the file, and asking him if he wants to request permission, in this case from the sender 1001. The user 1003 chooses the No option 1102 to indicate that he does not want to request permission. One or more embodiments may apply any desired policy to manage attempts by unauthorized users to access protected resource references. These policies may include for example, without limitation, blocking access, logging the access attempt (as illustrated in FIG. 10), informing the user that the resource is unavailable, asking the user if he or she wants to request permission to access the resource (as illustrated in FIG. 11), providing limited or restricted access, or any combination of these policies.

One or more embodiments may limit access to protected resources by limiting the number of times a protected resource reference may be used. FIG. 12 illustrates an example of an embodiment that includes a maximum count 1201 for resource reference usage in the Protected Resources table 901a of the Authorization Subsystem 450. The table also tracks the number of previous accesses 1202 for each protected resource reference. In this illustrative example, protected message 430b contains an encoded reference 431b to a resource (here a file attachment), and the maximum number of accesses 1203 allowed for this resource is 1. Thus any attempts after the initial access to view this resource will be blocked. When recipient 1002 receives the message 430b and initially accesses the protected reference 431b, the previous access count 1204 is zero. Because this previous access count 1204 is lower than the maximum count 1203, access is permitted 1205. The Authorization Subsystem increments 1206 the previous access count to 1207 to reflect this access. If recipient 1002 then forwards the message to user 1003, generating copy 432b of the protected reference, an attempt by user 1003 to access 432b will be blocked 1208 since the resource has already been accessed for the maximum number of times. Similarly, one or more embodiments may limit the amount of time that a resource may be accessed. For example, the Authorization Subsystem may have a protected resource reference expiration date, after which no accesses of this protected resource are permitted. One or more embodiments may limit the total duration of access, for example if the time of access can be monitored by the system. One or more embodiments may combine maximum resource access counts or times with other authorization control mechanisms included those described above.

Figure 12A:
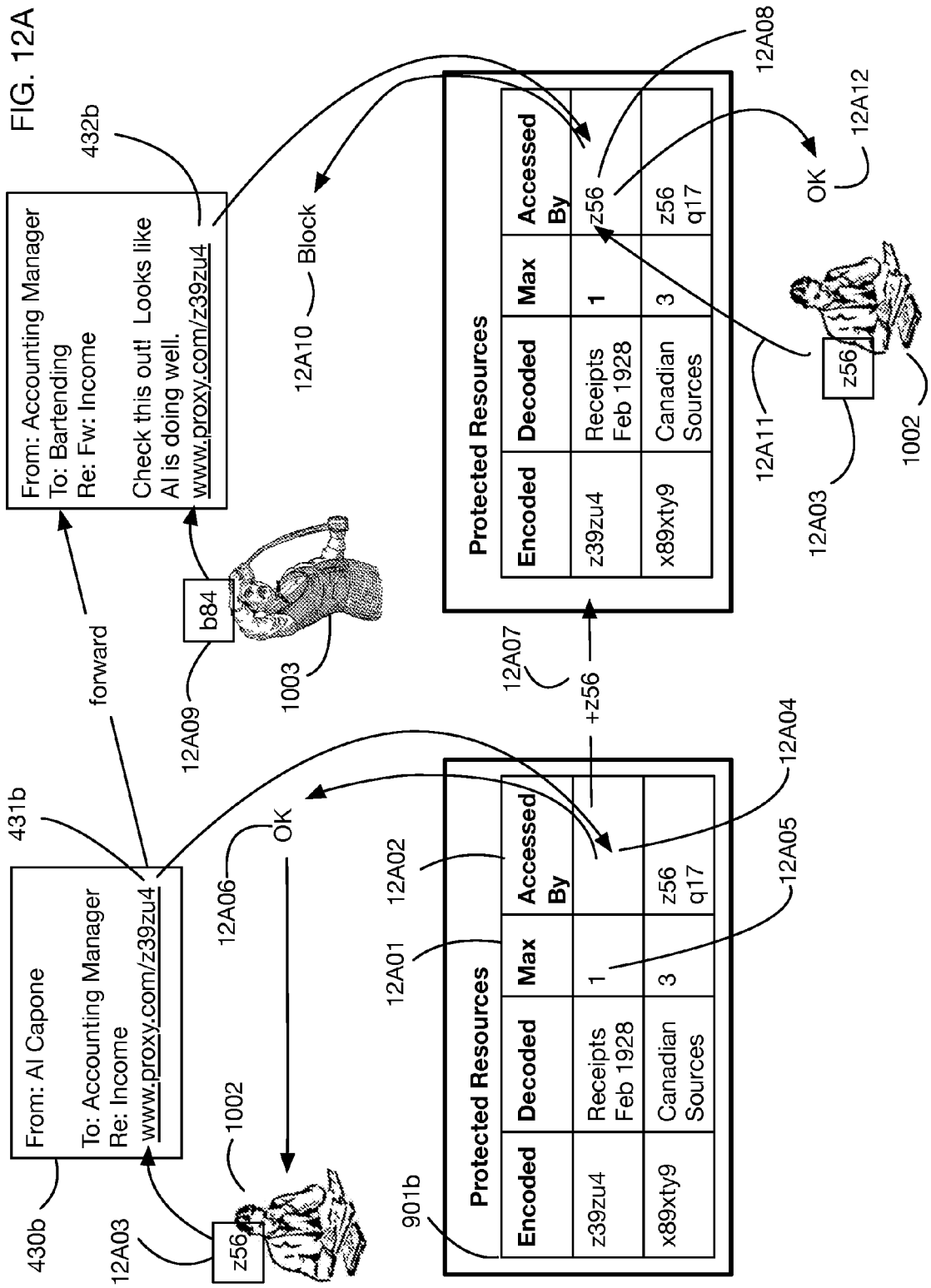
FIG. 12A illustrates a variation of the embodiment of FIG. 12 that limits the maximum number of users that may access a resource.

One or more embodiments may limit the number of users that are allowed to access a resource, instead of or in addition to limiting the total number of accesses or the total time available for access. FIG. 12A illustrates an embodiment that uses this technique to determine if users are authorized to access resources. Protected Resources table 901b has column 12A01 for the maximum users count for a resource; this count is the maximum number of distinct users that may access a resource before further access is blocked. Column 12A02 is an accessed-by list for each resource; this column tracks the identities of users who have previously accessed each resource. In this illustrative example arbitrary 3-character user identifiers are used to show user identities; one or more embodiments may use any user identifier to track which users have accessed which resources. User 1002 with illustrative user identifier 12A03 attempts to access protected link 431b in message 430b. This access attempt triggers a check of the Protected Resources table 901b. The accessed-by list 12A04 for this protected resource reference is empty, and the maximum user count 12A05 is 1; thus an additional access is allowed and the system allows access 12A06. This successful access causes the user's identity 12A03 to be added 12A07 to the accessed-by column, resulting in a new accessed-by list 12A08 for this resource. User 1002 then forwards the message to user 1003 with user identifier 12A09. User 1003 attempts to access the copy 432b of the protected resource reference. This triggers another check of the Protected Resources table. Now the number of users in the accessed-by column 12A08 for the resource is 1, which matches the maximum 12A05. Therefore the access attempt is blocked 12A10. However if the initial user 1002 attempts to access the resource again with access attempt 12A11, the authorization check determines that the user's identity 12A03 is already in the accessed-by list 12A08 for the resource, so the subsequent access is permitted 12A12.

One or more embodiments may provide secure access to resources via a sandbox environment. The sandbox environment may for example allow users to open, view, manipulate, or execute resources in an environment that limits the effect of potential threats, or that limits users' ability to perform selected actions. Sandbox environments may for example include virtual machines, specialized applications, specialized electronic message clients, or managed cloud applications. FIG. 13 illustrates an embodiment that uses a managed cloud application to provide secure access to resources. When user 1002 accesses protected resource reference 431b, which here refers to an email attachment, the system provides access to a copy 1302 of the original attachment that is stored in a cloud-based file system 1301. A copy of the original attachment is never downloaded to the user's computer. The system opens the file using a managed cloud application (here a spreadsheet viewer 1305) that executes on a remote server 1304; the user views the file through his browser 1310. The managed cloud application 1305 and cloud-based file system 1301 provide a sandbox environment that limits the impact of potential threats on the user's computer (and on other systems connected to this computer). For example, a virus check 1303 may be performed automatically when opening the file 1302. Because the cloud-based system is managed, virus checking and other security features may be more complete and more up to date than the security capabilities of the user's local computer. For example, a cloud-based system may have the latest security patches and virus definitions, whereas a user may forget or choose not to install these. In addition, the effect of any threats embedded in the file are limited since the browser environment itself provides a sandbox. Moreover, the cloud application may be configured to limit the user's permissions for the resource. In this example, the Copy button 1306 and Print button 1307 of the managed spreadsheet application 1305 are greyed out, indicating that they are disabled for the user. Disabling these or similar features may for example limit leaks of sensitive information contained in the file. One or more embodiments may use any sandbox environment for access to protected resources, including but not limited to managed cloud environments such for example as Google™ Docs, Microsoft Office™ Online, or Dropbox™. One or more embodiments may configure a sandbox environment to associate any applications with any types of files. One or more embodiments may perform any desired security checking actions, such as for example virus checking, prior to opening a file or accessing a resource in a sandbox environment. One or more embodiments may provide any desired limitations on application features and permissions within a sandbox environment.

One or more embodiments of the invention may use stored data such as a messaging system database to determine whether an electronic message contains or presents a potential threat. Threat detection rules may therefore be dynamically generated or modified based on actual communications and contacts made by a user or by an organization. FIG. 14 shows an architectural overview of an embodiment of a threat detection system that uses data in messaging system database 1401 to determine whether electronic messages contain potential threats. The message system database 1401 may contain any information related to messages, contacts, addresses, communications, connections, social or professional networks, or organizational structures. For example, in the embodiment shown in FIG. 14, database 1401 contains Contacts list 1402, Message Archive 1403, and Summary Data 1404 that for example may be derived from the Contacts list, the Message Archive, or both. Contacts 1402 may contain any information on persons, groups, or organizations; this information may include for example, without limitation, names, addresses, email addresses, identities, certificates, demographic data, social networking names or addresses, aliases, notes, nicknames, phone numbers, physical addresses, roles, titles, affiliations, and personal information such as birthdays or relatives. In one or more embodiments contact list information may be obtained from, augmented with, or validated against directories, registries, or databases that are organization-wide or that span organizations, such as for example Active Directory services. Information from multiple directories may be merged into or copied into a Contacts list, using for example utilities such as ADSync. A Contacts list may be a Global Address List, or it may include all or part of one or more Global Address Lists. A Contacts list may also include information from any public or shared lists of persons, addresses, organizations, or names. Message Archive 1403 may represent any archive of messages sent by, received by, drafted by, viewed by, or otherwise accessed by a user or any set of users. The messages in Message Archive 1403 may be any type of message, such as for example, without limitation, emails, text messages, voice messages, video messages, faxes, tweets, Instagrams, or postings on social network sites. A Message Archive may contain any list or lists of any types of messages over any time period. Messaging System Database 1401 may also contain Summary Data 1404, which may for example consolidate information from the Contacts and the Message Archive. Any type of summary information may be derived and stored. For example, Summary Data 1404 may include counts or sizes of messages sent to or received from each contact in the Contacts list, potentially grouped as well by organization or domain name. It may include the number of contacts associated with each domain name. Summary Data may also include temporal information, such as for example the time that each Contact was last contacted. These examples are illustrative; one or more embodiments may use any type of Summary Data that is derived in any fashion from the Contacts or Message Archive information.

In the embodiment illustrated in FIG. 14, data in the Messaging System Database 1401 is used to analyze electronic messages in order to determine whether the messages contain or may contain a threat. This analysis may check for any kind of threat, including for example, without limitation, phishing attacks, spear-phishing attacks, whaling attacks, malware, viruses, worms, Trojans, spam, adware, spyware, or denial of service attacks. Analysis may use any information in the messages combined with any information in the Messaging System Database to assess whether a message presents a potential threat. One or more embodiments may use any additional information to perform threat analysis, such as for example, without limitation, whitelists, blacklists, or signatures of viruses or other malware; this information may be combined with information from the Messaging System Database in any manner.

One or more embodiments may apply a Message Filter 1410 to electronic messages, in order to check for potential threats and to respond to detected or suspected threats. A filter may check any or all of the message parts that comprise a message, such as for example, without limitation, the sender or senders, the receiver or receivers, the headers, the message text, the subject, the message thread, attachments, embedded links, embedded media, the path along which the message was transmitted, and timestamps associated with creating, sending, forward, receiving, and reading the message. The Message Filter may take any desired action when a threat is detected or suspected, such as for example blocking all or part of a message, or adding warnings that alert users to potential threats. FIG. 14 illustrates several illustrative actions taken by the Message Filter 1410. Message 1421 is analyzed 1411 for threats; because the filter does not detect a threat, the message is allowed 1412 with no modifications. Message 1423 is analyzed 1413 for threats; because a threat is detected, the message is blocked 1414. One or more embodiments may block only parts of a message instead of an entire message. Message 1425 is analyzed 1415 for threats; because the embedded link 1426 appears suspicious, the message filter transforms 1416 the message into a modified message 1427. In the modified message 1427, the link 1426 is replaced with an indirect link 1428 that applies additional checking or warnings when the link 1428 is clicked. These examples illustrate some possible actions of the Message Filter 1410: it may pass a message through unchanged; it may block all or part of a message; or it may transform all or part of a message to a modified message that for example incorporates additional checks or warnings.

Figure 15:
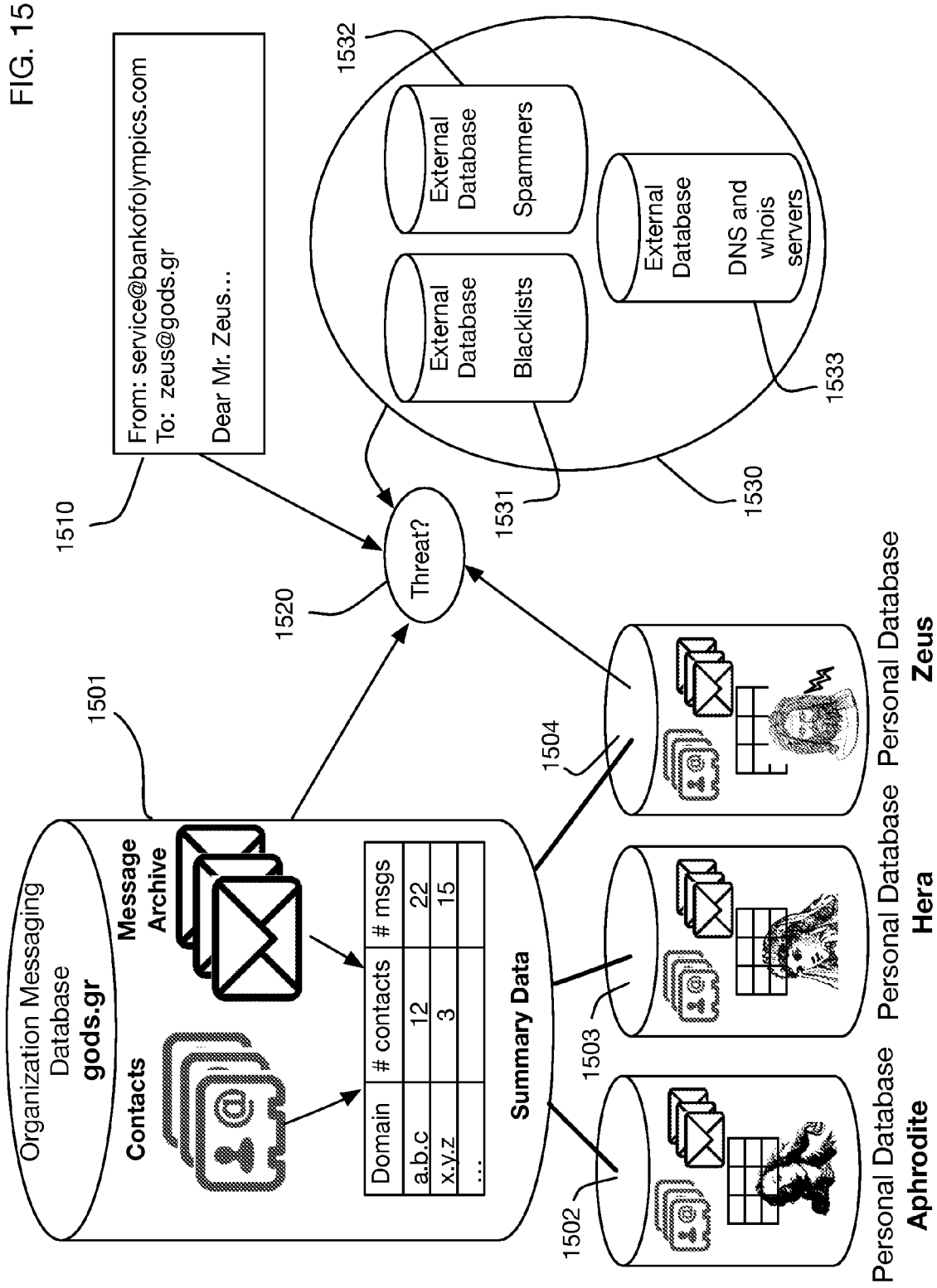
FIG. 15 illustrates an embodiment that performs threat detection using a hierarchical messaging system database that includes an organizational Contacts and Message Archive, as well as personal Contacts and Message Archives for each user within the organization.

A Messaging System Database 1401 may be associated with an individual, with a group, or with an entire organization. Message Filter 1410 may use multiple Messaging System Databases to perform threat checking and transformations. For example, in a message addressed to an individual, both the Messaging System Database of the individual and that of the individual's organization may be used for threat checking. FIG. 15 illustrates an embodiment with a hierarchically organized set of Messaging System Databases. Organizational database 1501 contains an aggregate Message Archive and Contacts for all individuals within the organization, and Summary Data derived from these aggregates. Each individual within the organization has an individual Personal Database, such as for example Personal Databases 1502, 1503, and 1504. The Personal Database for an individual may contain, for example, messages sent to or sent by that individual, and contacts entered by that individual. The Organizational Database 1501 may for example be a union of all of the Personal Databases, and it may include additional organization-wide information that is not associated with any particular individual. Threat detection 1520 for an incoming message such as 1510 may reference the Organizational Database 1501 as well as the Personal Database 1504 of the message recipient. This scheme is illustrative; one or more embodiments may use any set of Messaging System Databases in any manner to check messages for threats.

FIG. 15 also illustrates an embodiment that uses data from one or more external databases to supplement the analysis of the organization messaging database in order to perform threat detection. In the embodiment shown, external databases 1530 are accessed by threat check 1520. These databases may include for example database 1531 that may contain blacklisted senders or websites, database 1532 that may contain known or suspected spammers, and database 1533 that comprises for example DNS and whois servers that provide information on website identity and registration. These examples are illustrative; one or more embodiments may access any available external databases in addition to internal organizational messaging databases to perform threat detection.

Figure 16:
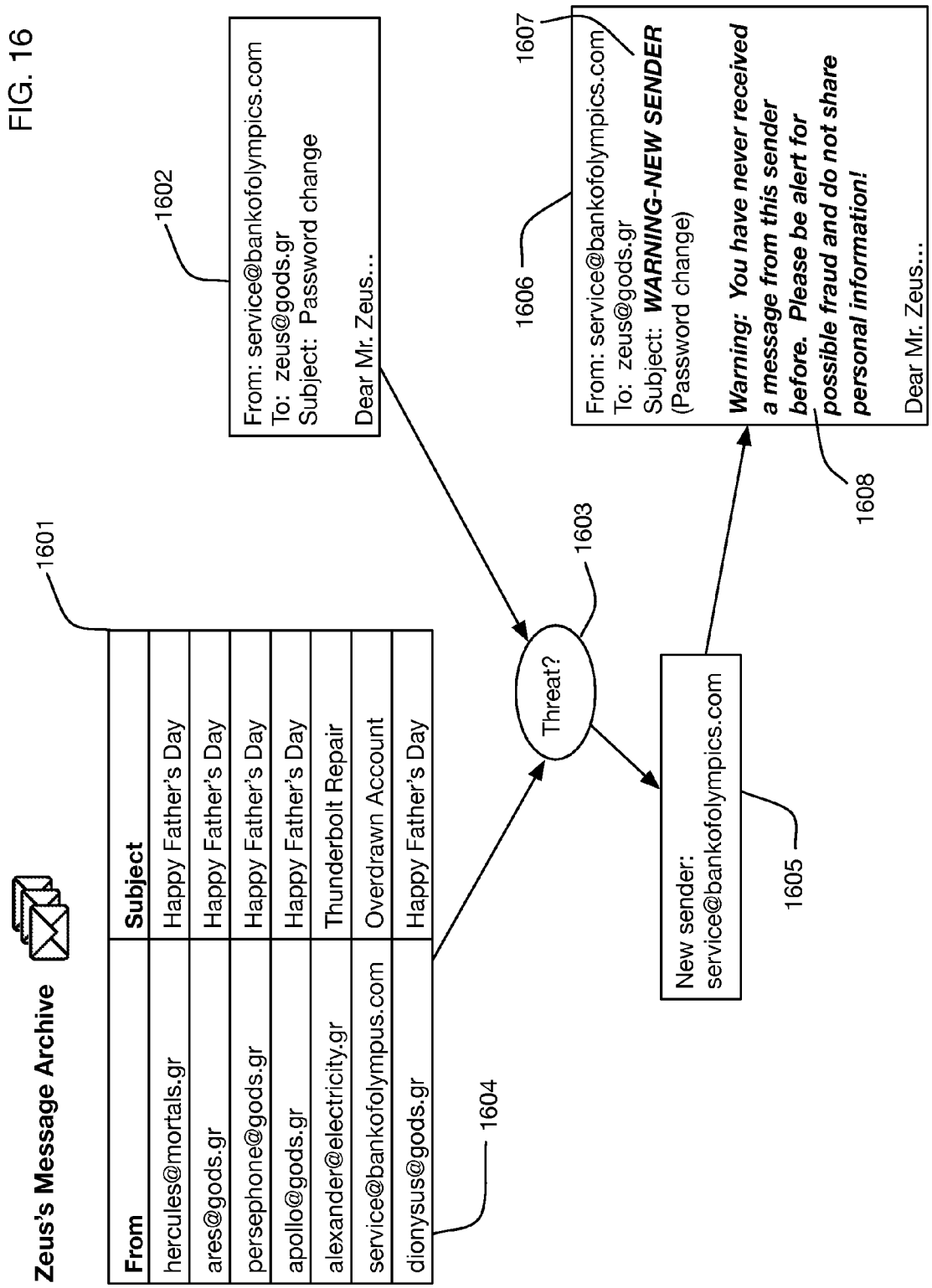
FIG. 16 illustrates an embodiment that detects a potential threat if a message is from a new sender that does not appear in the Message Archive.

One or more embodiments may use any information in a Messaging System Database to check a message for threats. We will now describe several specific examples of threat detection techniques that use the Messaging System Database information. FIG. 16 illustrates an embodiment that checks for threats by comparing the sender of a message to the senders of all previously received messages in the Message Archive; if a sender is a new sender, the message is classified as a potential threat. In the example illustrated in FIG. 16, the Personal Message Archive 1601 of the recipient is used for the threat check 1603; one or more embodiments may also use an organizational message archive (for example, to classify a message as a potential threat if the sender has never sent a message to anyone in the organization). The email address of the sender of message 1602 does not appear in the From field 1604 of any message in the Message Archive 1601; thus the threat detection process 1603 classifies the sender as a "new sender" 1605. Based on this classification, one or more embodiments may consider the message to be a threat or a potential threat. Actions taken by the system for this potential threat may include blocking the message entirely, blocking parts of the message, or warning the user about the potential threat. In the example shown in FIG. 16, the system transforms message 1602 into modified message 1606; the transformation inserts a warning that the sender is new, and that the user should therefore be cautious, particularly in sharing personal information. In this example, the system inserts a warning 1607 into the subject line, and it inserts a preamble 1608 prior to the message contents that warns that the sender is new.

Figure 17:
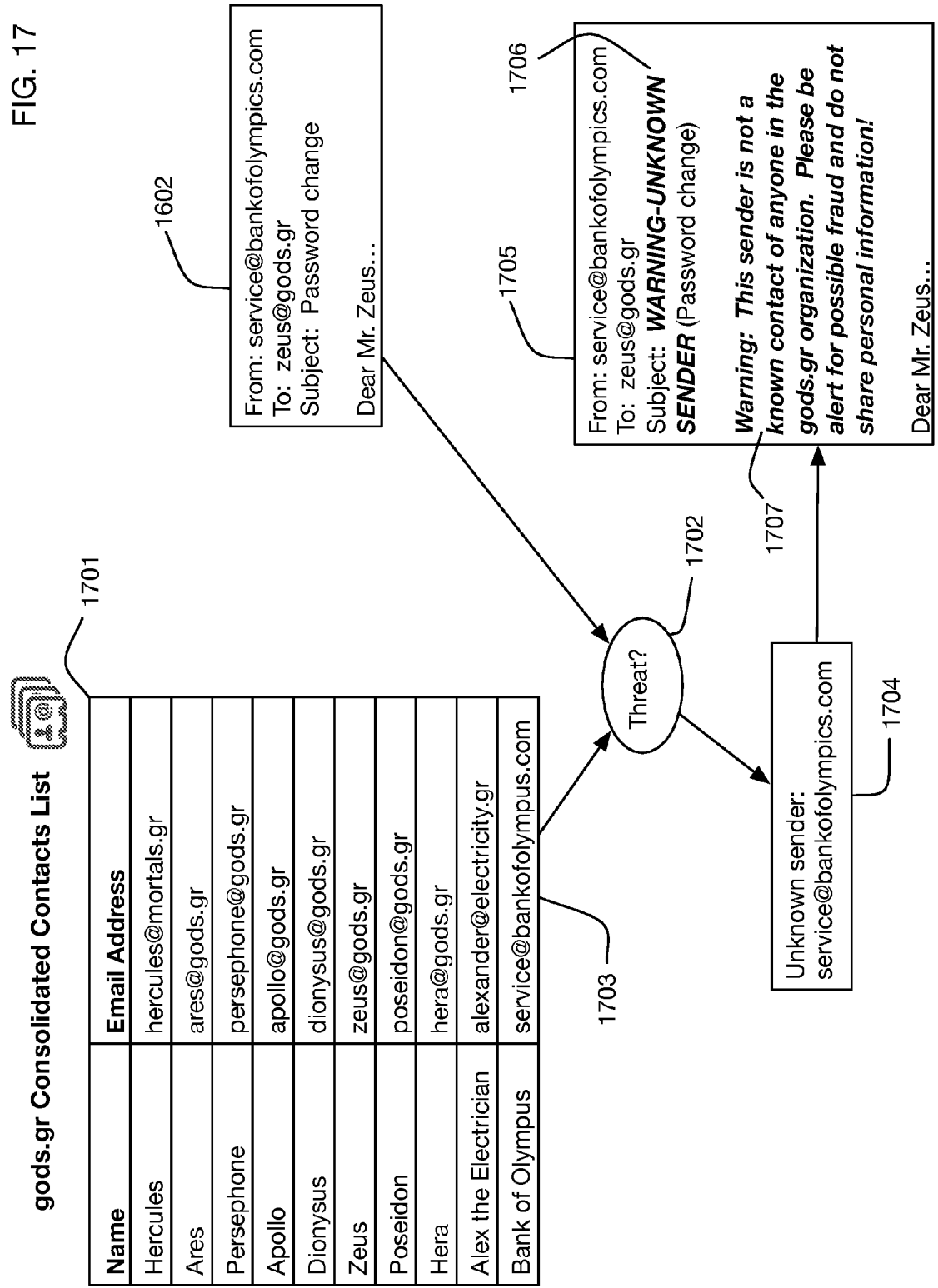
FIG. 17 illustrates an embodiment that detects a potential threat if a message is from a sender who is not in the Contacts list.

The example shown in FIG. 16 uses the Message Archive to determine if a sender is new, and hence potentially a threat. One or more embodiments may use a Contacts list for a similar purpose. For example, a sender may be considered "new" if the sender does not appear in the Contacts list. FIG. 17 illustrates an embodiment that uses a Contacts list to determine if a message sender is a known contact. For illustration, this example uses an Organizational contacts list 1701 instead of a personal contacts list. This is for illustration only; one or more embodiments may use any combination of personal contacts and organizational contacts to screen messages for potential threats. In the example of FIG. 17, message 1602 is checked 1702 for threats by comparing the sender of 1602 to the known contacts in 1701. Because the sender address does not match the email addresses 1703 of the contacts in database 1701, the message is classified as having an "unknown sender" 1704. In this example, the sender's email address is compared to the email addresses of known contacts in the Contacts list 1701. One or more embodiments may use any type of sender identity and contacts identity to determine whether a sender is a known contact, instead of or in addition to email addresses, such as for example, without limitation, names, nicknames, display names, aliases, physical addresses, phone numbers, certificates, or any other identifying information. One or more embodiments may use only parts of an email address, such as for example the domain name portion of the email address. Because message 1602 is from an unknown sender (one whose email address does not appear in Contacts 1701), the message filter of the system may block all or part of the message, or it may transform the message for example to add a warning. In the example of FIG. 17, the system transforms message 1602 to modified message 1705, with a warning 1706 inserted in the subject, and another warning 1707 inserted into the message contents. One or more embodiments may perform any desired transformation on messages that have suspected threats, including for example, without limitation, adding warnings, removing message parts, encoding links or other resources, rewriting message text, and adding levels of security or checking when users attempt to access the message or any of the message parts.

The example of FIG. 16 uses a Message Archive to determine whether senders are known; the example of FIG. 17 uses a Contacts list to determine whether senders are known. One or more embodiments may combine these techniques in any desired manner, using combinations of the Message Archive and the Contacts list to assess the threat potential from the sender of a message. For example, one or more embodiments may classify a sender as unknown if the sender appears in neither the Contacts list nor the Message Archive.

One or more embodiments may use the length of time a contact has been in a Contacts list to determine the likelihood that a message from that contact is a potential threat. This approach may assume, for example, that newer contacts may be less trustworthy since the user or the organization has less experience with them. FIG. 17A illustrates an embodiment that uses the time a contact has been known in a Contacts list to determine the threat potential of a message from that contact. Contact list 17A01 includes field 17A02 with the timestamp of when each contact was entered into the Contacts list. Message 17A10 is received from email address 17A11. This address matches the email address 17A12 of a contact in the Contact list. The sender is therefore a known contact, unlike the example illustrated in FIG. 17. The threat check 17A13 therefore checks how long the contact has been in the Contacts list. By comparing the timestamp 17A14 of when the message was received with the timestamp 17A15 of when the contact was added to the Contact list, the threat check 17A13 determines that the contact was recently added 17A16. This value is compared to threshold 17A17; since the age of the contact is below the threshold, the message is classified as a potential threat. In this example, the threat protection system modifies the message 17A10 by inserting warnings to form message 17A18; warning 17A19 is inserted in the subject line, and warning 17A20 is inserted in the message text. One or more embodiments may block the message or parts of the message instead of or in addition to inserting warnings.

Figure 17B:
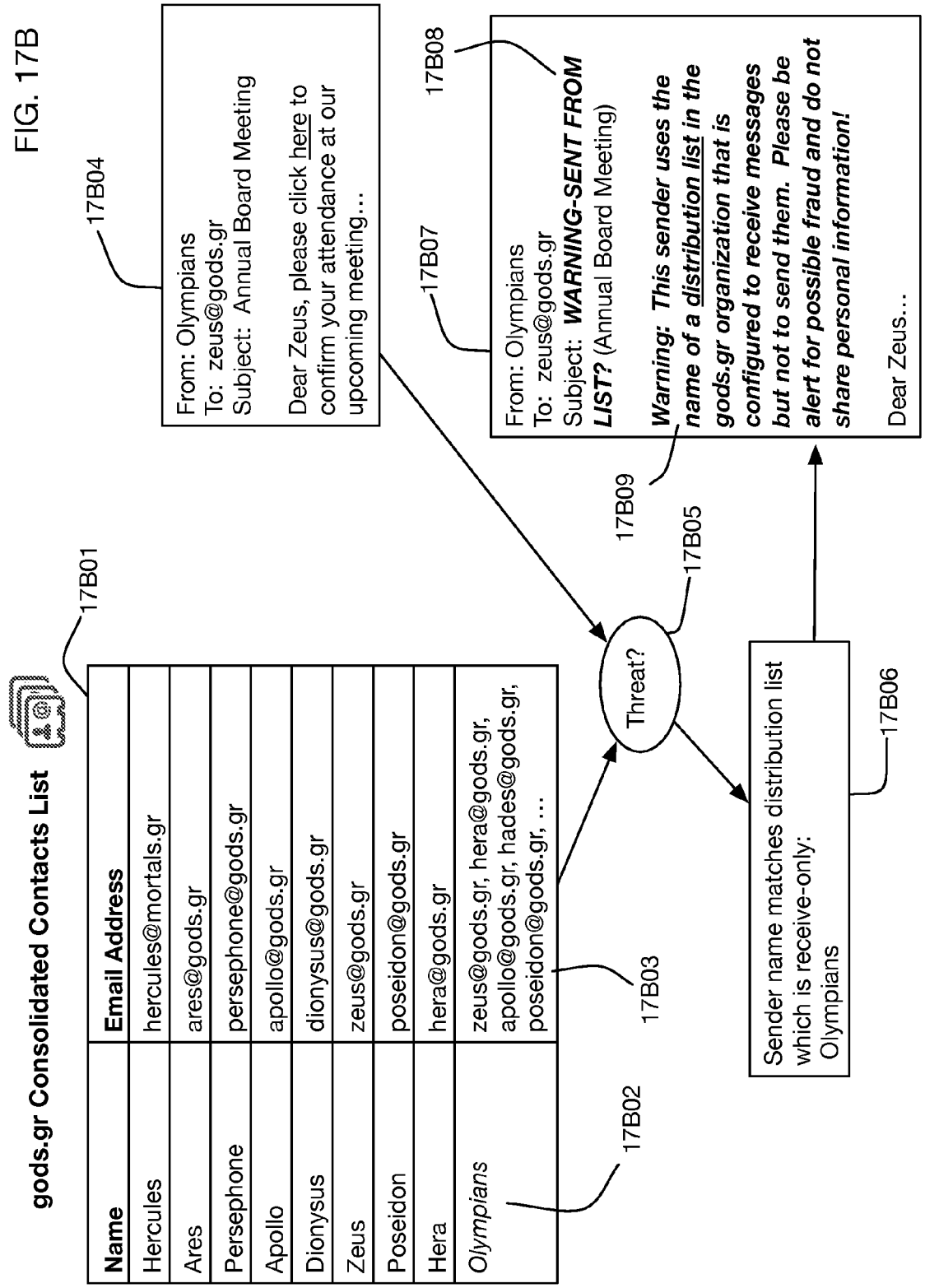
FIG. 17B illustrates an embodiment that detects a potential threat if a message sender appears to match a distribution list, which typically can only receive messages rather than send them.

Fraudulent messages such as phishing attacks are often constructed so that they appear to be sent by a known contact. In some cases, messages from senders that appear in the Contacts list may be recognized as fraudulent or potentially fraudulent if the apparent sender is not capable of sending messages. FIG. 17B illustrates an example with a message sender impersonating a distribution list in the Contact list. Contact list 17B01 contains several individual names and addresses, and a named distribution list 17B02 that contains multiple addresses 17B03. Distribution lists are typically configured as recipients of messages rather than senders of messages. Therefore, a legitimate message typically should not have a distribution list as a sender. In the example shown in FIG. 17B, message 17B04 has sender with identity matching the distribution list entry 17B02 in the Contact list 17B01. The threat check 17B05 flags the message as suspicious 17B06 because the sender's name matches the name of distribution list 17B02, which generally should only be a message receiver. Therefore, the system transforms message 17B04 to message 17B07, with warning 17B08 inserted in the message subject and warning 17B09 inserting in the message text. One or more embodiments may block a message from a distribution list instead of inserting warnings. One or more embodiments may use any desired method to detect and flag senders that appear in a Contact list but are not legitimate or typical sources of messages. For example, in addition to distribution lists, non-sending Contact list entries may include email addresses that have been configured by an organization as recipients for particular purposes (e.g., unsubscribe@gods.gr), but that are not used for sending messages.

In some cases, an impostor may use a sending address that is almost identical to that of a known contact, so that the receiver mistakes the sender for the real contact. One or more embodiments therefore may classify a message as a potential threat if the identity of the sender is similar to, but not identical to, that of a known contact in a Contacts list. Any type of identity may be used to compare a sender to a contact. For example, without limitation, an identity may comprise an email address, a partial email address, a domain name of an email address, a display name of an email address, a physical address, a last name, a full name, a nickname, an alias, a phone number, an extension, a PIN, a social security number, or an account number. One or more embodiments may use any method to define and calculate the similarity between two identities.

Figure 18:
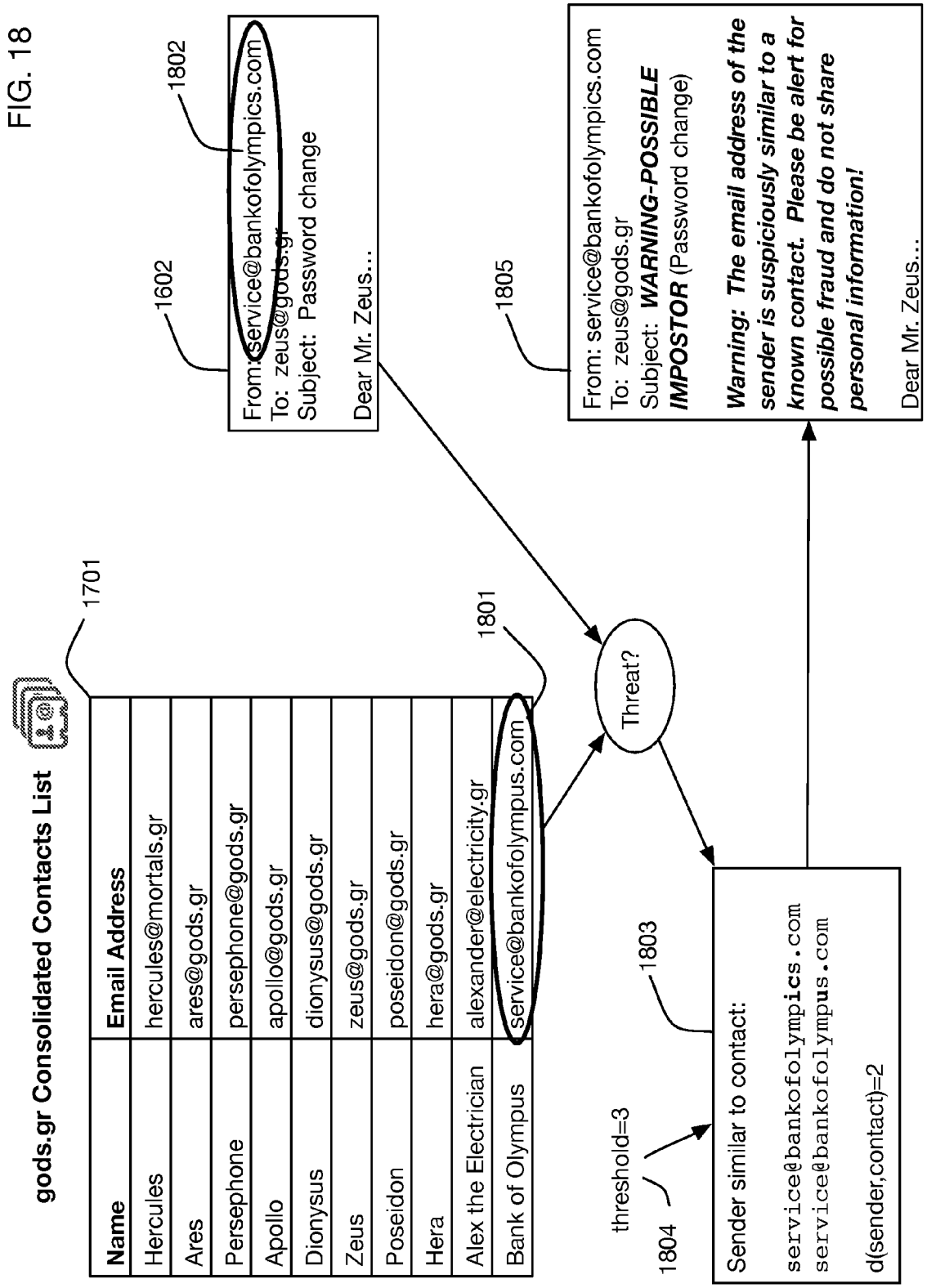
FIG. 18 illustrates an embodiment that detects a potential threat if a message is from a sender with an identity that is similar to, but not identical to, that of a known contact.

FIG. 18 illustrates an example of an embodiment that uses similarity of a sender to a known contact to determine whether a message is a potential threat. Message 1602 has sender with email address 1802. Contact list 1701 contains a similar, but not identical, email address 1801. The threat detection system compares these two identities (which in this example are email addresses) and determines that the sender's identity is similar to, but not identical to, the contact's identity. In this example the comparison uses a distance function between the two identities. One or more embodiments may use any distance function or similarity metric, or any other method to compare identities to determine the degree of similarity. One or more embodiments may compare any form of identity, including for example any portion of the email address or any other name, identifier, number, string, or value associated with a sender or a contact. In this example the email addresses are compared using a Levenshtein distance function, which counts the number of character changes needed to transform one string into another string. The result 1803 is compared to threshold 1804; because the similarity metric is positive and below the threshold 1804, the message is classified as a potential threat. The threat protection system transforms message 1602 into modified message 1805, with warnings inserted into the subject line and the message text.

Phishing attacks and other threats may use names or addresses of senders or websites that are similar to those of known, legitimate senders or websites. In addition to deliberate, minor spelling changes, such as the difference between address 1801 and address 1802 of FIG. 18, attackers may use homograph attacks that use different characters that look alike. For example, different Unicode characters may have identical or similar displays; hence names may differ in their Unicode representation even if they appear identical or very similar to a receiver. As an illustration, the Unicode character 0x0430 is a Cyrillic lower case "a"; this character may look identical to Unicode character 0x0061, which is a Latin lower case "a". Thus for example the domain name www.bankofolympus.com with the "a" in Cyrillic is a different domain from the identical looking name www.bankofolympus with the "a" in Latin. One or more embodiments may compare names for similarity using knowledge of homographs. For example, a distance metric may take into account the display of characters as well as their internal (e.g., Unicode) representation. As an example, each Unicode character may be mapped into a canonical representation character prior to calculating a distance. Thus for example, both 0x0430 and 0x0061 might be mapped to the same representation character "a". The homograph-aware distance between the www.bankofolympus.com name with Cyrillic "a" and www.bankofolympus.com with Latin "a" would then be 0, indicating that one may be an impostor posing as the other. Comparison of names that may include internationalized domain names (or similar identifiers) may first transform these names from an encoded internationalized representation to a Unicode character set, and then to a canonical form or other representation that reflects the display of the characters. For example, the internationalized domain name www.bankofolympus.com with a Cyrillic "a" may be encoded in ASCII as www.xn--bnkofolympus-x9j.com. For name comparison, one or more embodiments may first decode an encoded internationalized ASCII string (like www.xn--bnkofolympus-x9j.com) into the corresponding Unicode characters, and then compare the Unicode string to other names using canonical representations based on display, or based on other similarity scores that take display representations into account.

One or more embodiments may also calculate distances between names taking into account letter combinations that look similar; for example, the letter combination "rn" looks very similar to "m". Thus the name www.bankofolyrnpus-.com may be easily confused with www.bankofolympus-.com. An illustrative distance metric that takes these similar appearing letter combinations into account may for example use a variation of a Levenshtein distance function that counts a substitution of one combination for a similar looking letter as a fractional letter substitution to reflect the display similarity. For instance, a substitution mapping "rn" to "m" may count as a distance of 0.5, rather than as 2 in a standard Levenshtein distance function. One or more embodiments may extend this example using a table of substitutions between characters and character combinations, with an associated distance weight associated with each such substitution. This approach may also be used for the homograph similarity described above; substitution of one letter for a homograph (identical or similar appearing letter) may for example count as a fractional distance rather than as a full character edit.

Figure 18A:
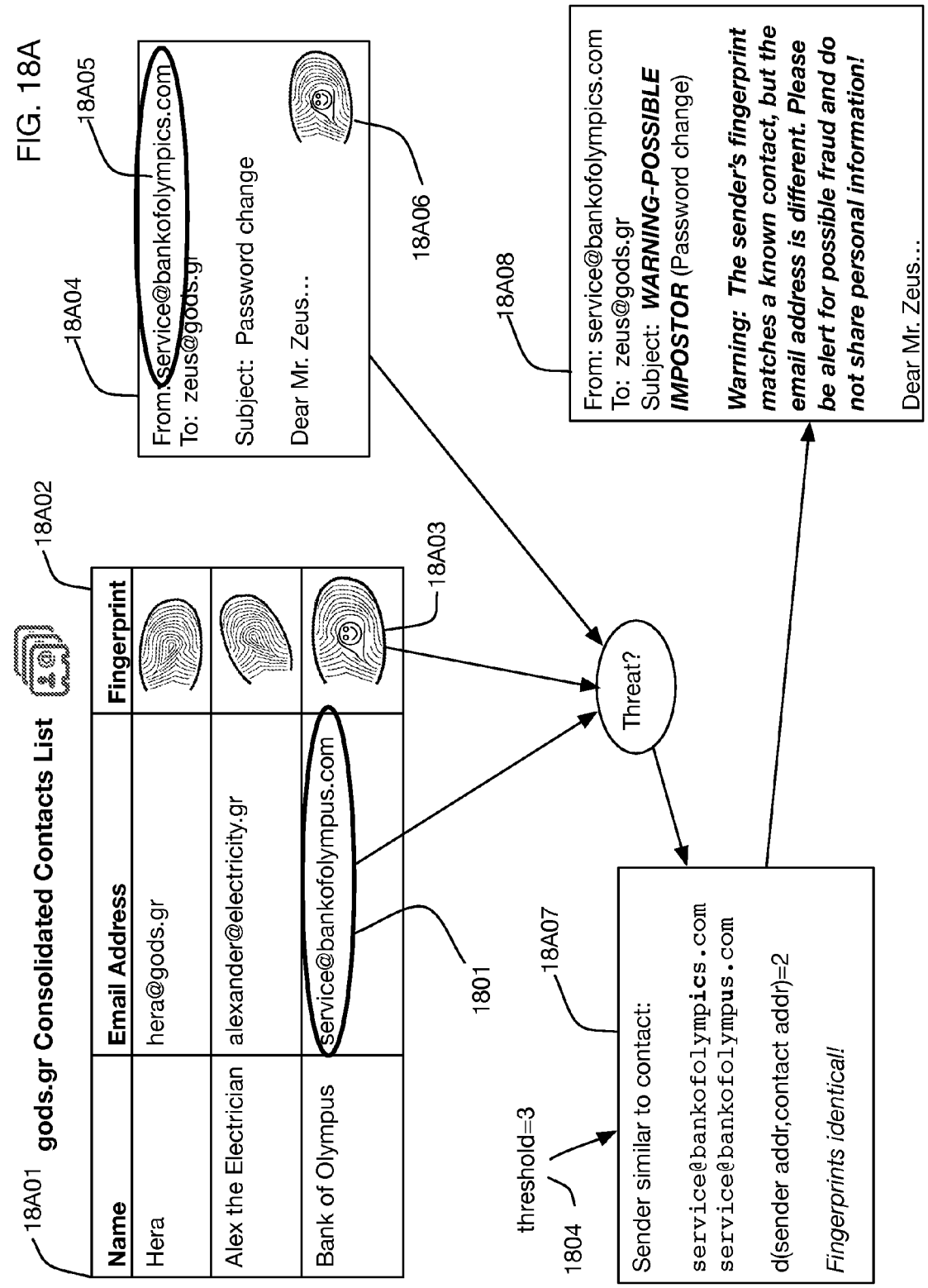
FIG. 18A illustrates a variation of the embodiment shown in FIG. 18; this variation compares biometric identifiers (fingerprints) of a sender with biometric identifiers of known contacts, in addition to comparing email addresses.

One or more embodiments may use any type of identity or identities to compare senders to known contacts or previous senders in order to flag potential threats. FIG. 18 illustrates a comparison using email addresses as identity. FIG. 18A illustrates an embodiment that further compares a sender biometric identifier embedded in a message with corresponding biometric identifiers of known contacts. One or more embodiments may use any form of biometric identifier to compare senders to contacts or to other lists of known senders, including for example, without limitation, a fingerprint, a palm print, a voice print, a facial image, or an eye scan. In FIG. 18A, contacts list 18A01 contains a column 18A02 with a fingerprint of each known contact. In this embodiment, incoming messages may include a fingerprint of the sender. Incoming message 18A04 has sender email address 18A05, and the message contains fingerprint 18A06 ostensibly from the sender. The threat detection system compares the sender email address 18A05 and the sender fingerprint 18A06 to identities of contacts in the contacts list 18A01. The fingerprint 18A06 matches fingerprint 18A03; however, the email address 18A05 differs from the corresponding contact email address 1801. Therefore, the threat detection system determines that the message may be a potential threat 180A07 since the sender's identity is similar to, but not identical to, that of a known contact, taking into account both the fingerprint and the email address. Transformed message 18A08 provides a warning that the sender may be an imposter who has, for example, stolen the fingerprint identity to appear to be the known contact, but who is using a falsified email address as part of an attack.

Figure 19:
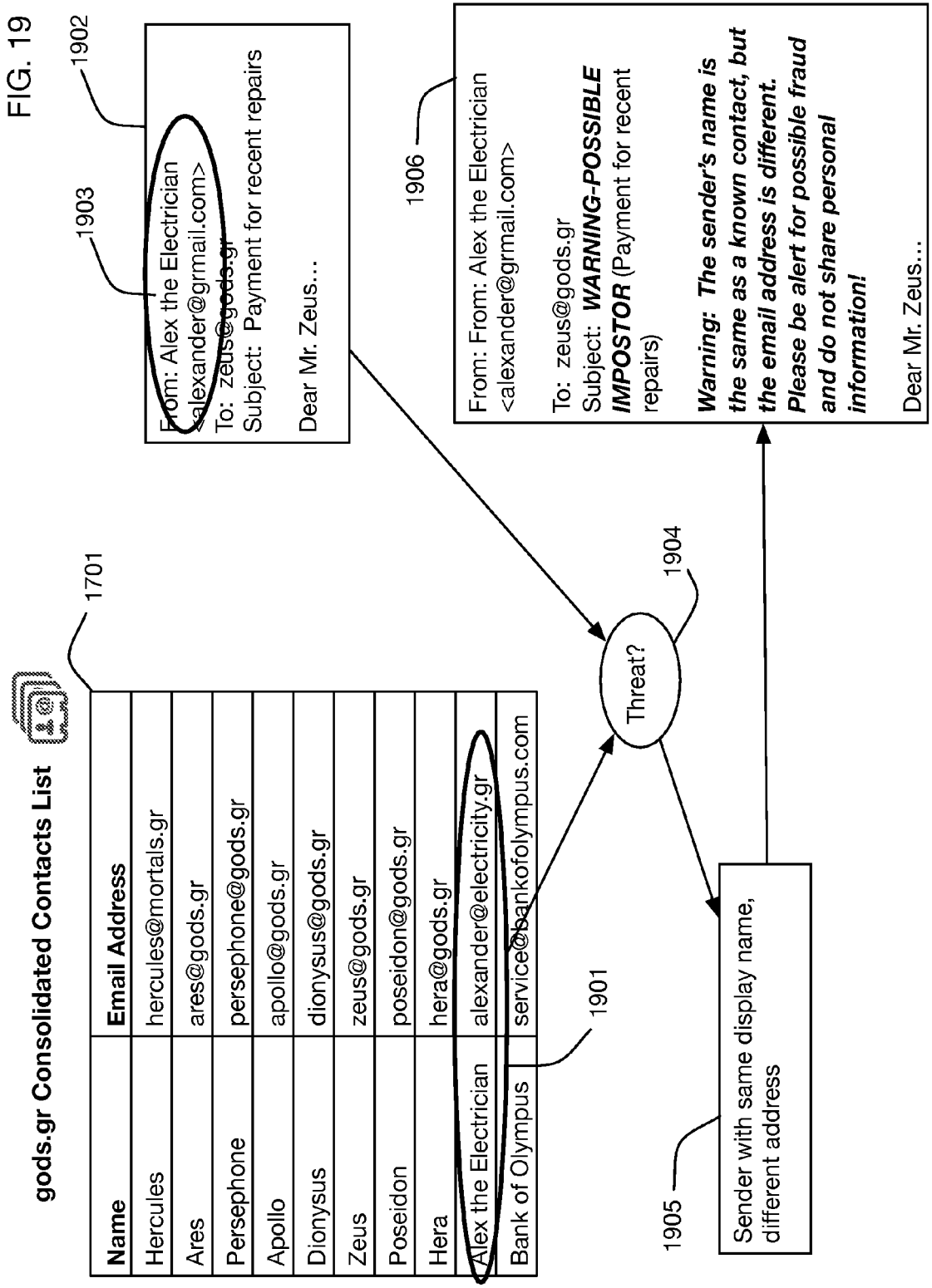
FIG. 19 shows a variation of the example of FIG. 18, where similarity of a sender to a known contact may include having the same email display name but a different email address.

FIG. 19 illustrates an example that compares both the display name and the address portions of an email address to determine if a sender is a potential impostor. Message 1902 is from sender 1903 with the same display name ("Alex the Electrician") as contact 1901. However, the sender's address (alexander@grmail.com) is different from the address of the contact 1901. Threat analysis 1904 therefore flags the sender as a potential impostor 1905, and adds warnings to transformed message 1906. As this example illustrates, one or more embodiments may compare senders to contacts using any combination of identities or partial identities to determine if a sender may be imitating a known contact.

Figure 20:
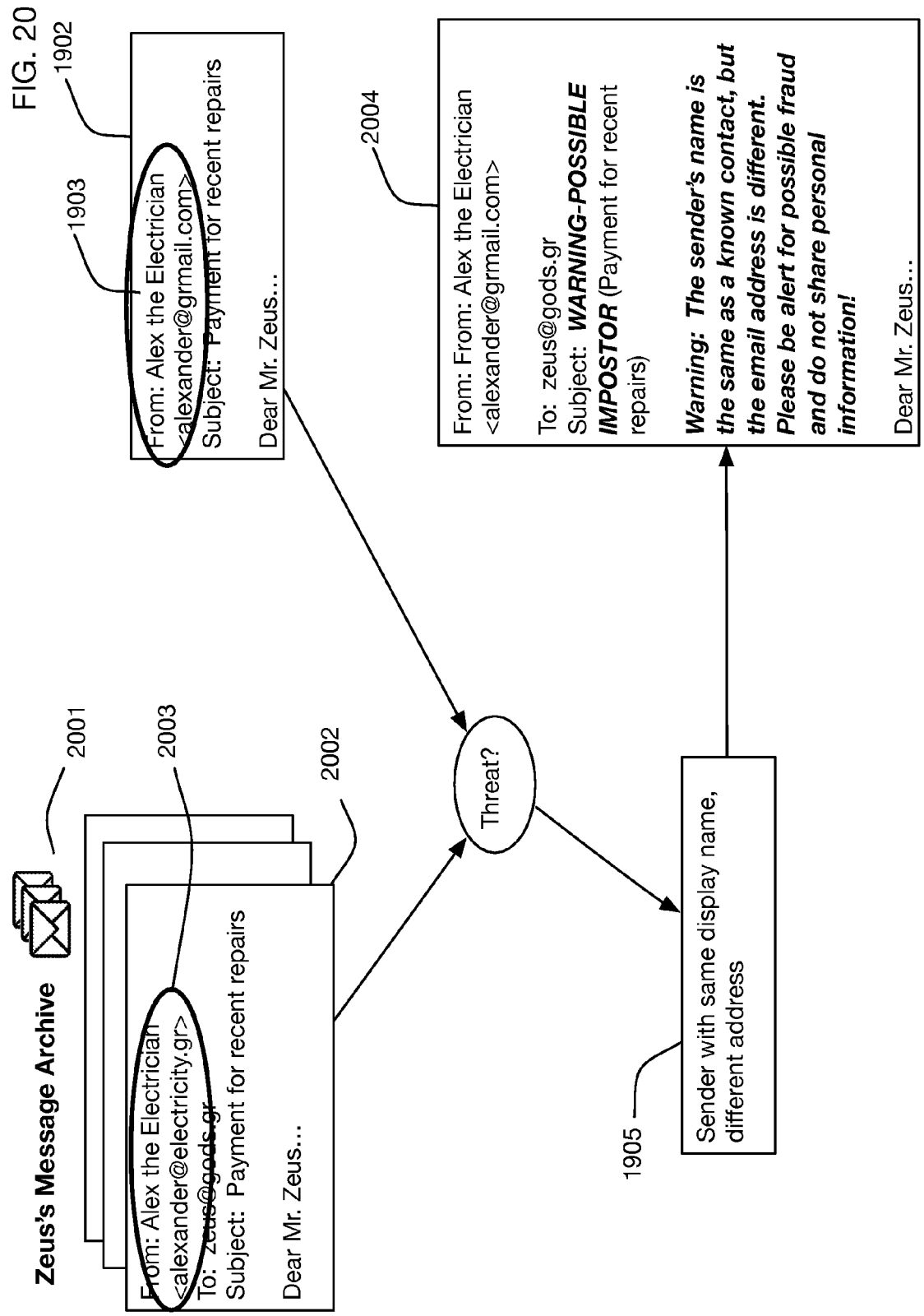
FIG. 20 shows a variation of the example of FIG. 19 that compares the sender of a message to previous senders in the Message Archive.

The examples of FIGS. 18 and 19 illustrate use of a Contact list to identify senders that have identities that are similar to, but not identical to, identities of known contacts. FIG. 20 illustrates an embodiment that checks for similarity of a sender to previous senders or receivers of messages in a Message Archive. Message 1902 is received from sender 1903. The sender identity 1903 is compared to senders that appear in Message Archive 2001. A similar sender is located in message 2002, and the identity 2003 of the sender of message 2002 is compared to the identity 1903 of the sender of the new message. As in FIG. 19, the threat detection system flags the sender as a potential impostor 1905 since the display name is the same but the address is different, and inserts warnings into transformed message 2004. One or more embodiments may use any combination of Contact lists and Message Archives to check the identities of senders and to perform threat analysis. For example, the techniques illustrated in FIGS. 19 and 20 may be combined, wherein a sender may be identified as a possible or probable impostor if the sender identity is similar to either a known contact or to a previous sender or receiver of a message in a Message Archive. One or more embodiments may calculate a similarity score for a sender identity using any combination of data from Contacts and Message Archives.

One or more embodiments may apply any of the above techniques to other message parts of a message in addition to the message sender. For example, in phishing attacks a message may include a link to a malicious website that is a close replica of a legitimate website. One or more embodiments may analyze message links by comparing them to previously received links; if the link identities are similar but not identical, the system may flag the link as a potential threat. Any form of link identity may be used for the comparison, such as for example, without limitation, a domain name, an IP address, a certificate, a hyperlink display name, or any value obtained from or derived from the website that is the target of the link. FIG. 21 illustrates an example. Message 2102 contains link 2103 to a website. Message Archive 2101 contains a previously received message 2104 with a link 2105. Using a similarity metric like the one described with respect to FIG. 18, the domain names of the links 2103 and 2015 are compared; the result 2106 is compared to threshold 2107. Because the link 2103 is similar to, but not identical to the previously received link 2105, the message is flagged as a potential threat. One or more embodiments may insert a warning into the message, as for example was illustrated previously. In the example shown in FIG. 21, the threat protection system transforms message 2102 into modified message 2108, which changes link 2103 to an encoded link 2109. Clicking on the encoded link 2109 may for example perform additional checks or present a warning to the user.

One or more embodiments may compare any portion of a link or any portion of a domain name to the corresponding portion of other links or domain names in order to determine similarity. For example, the domain name 2105 (www.bankofolympus.com) includes a top-level domain (com), a second-level domain (bankofolympus), and a host name (www). One or more embodiments may compare domain names for similarity using only the top-level and second-level domains, for example, since organizations can easily assign or change host names (or add subdomains). Thus a link with the same top-level and second-level domain, but a different host name or other subdomain likely does not represent a threat. As an illustration, if a link is received to www2.bankofolympus.com, the top and second level portions (bankofolympus.com) match the previously received top and second level portions of link www.bankofolympus.com; thus the new link may not be considered suspicious even though the full domain name differs slightly from the previous full domain name. Additional subdomains may also be ignored in one or more embodiments. For example, a link to www.homeloans.bankofolympus.com may be compared for similarity using only the top-level and second-level domain portion (bankofolympus.com), with the subdomain "homeloans" and the hostname "www" ignored for similarity comparisons. Similarity comparisons in one or more embodiments may also ignore link path names after the domain name, for example. Thus for example a link to www.bankofolympus.com/support may be considered identical to a previously received link to www.bankofolympus.com/login, if the similarity comparison compares only the domain name portion of the link (www.bankofolympus.com), or only the top-level and second-level domain portion (bankofolympus.com). In general, one or more embodiments may compare names (including links, addresses, identifiers, domain names, etc.) using any desired similarity measure on either full names or any portion or portions of the names. Portions of names compared may include for example, without limitation, any subset, slice, field, extract, transformation, prefix, or suffix of a name.

Figure 22:
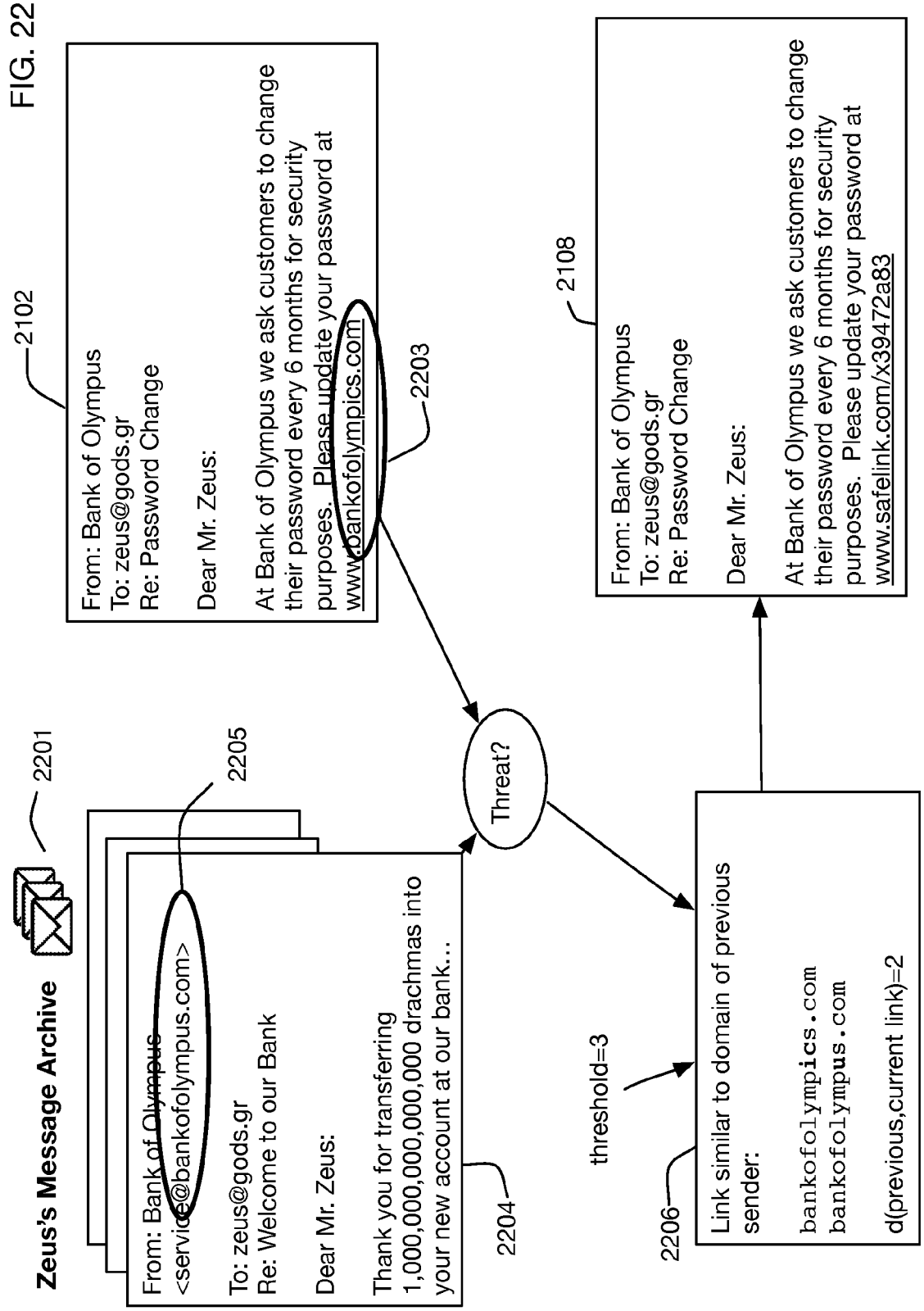
FIG. 22 shows a variation of the example of FIG. 21, where a link domain is compared to the domain of a sender of a previous message in the Message Archive.

One or more embodiments may compare a link in a message to any domain name referenced in any part of any message in a Message Archive. For example, the email address of the sender or receiver of a message generally contains a domain name; this domain name may be compared to a link address in an incoming message. FIG. 22 illustrates an example. Message 2102 contains a link to a website in domain 2203. Message Archive 2201 contains message 2204 from a sender from domain 2205. The system compares domain 2203 and domain 2205; the result 2206 shows that the domains are similar but not identical. The system therefore classifies message 2102 as a possible threat, and transforms it into message 2108 (as in FIG. 21) with an encoded link that provides additional protection or warnings.

Another indication that a message may be fraudulent is that it is contradictory to or inconsistent with previous messages from the same sender, from a similar sender, with the same or similar subject, or on the same or a similar topic. One or more embodiments may compare the contents of a message with the contents of previous messages in the Message Archive to identify contradictions or inconsistencies. A contradiction may be for example an explicit or implied inconsistency between messages, or it may be an explicit instruction or indication to change or disregard information provided in a previous message. Analyses for contradictions may use any methods to determine the meaning or purpose of the messages, including for example natural language processing, pattern matching, statistical analysis, or artificial intelligence. FIG. 23 illustrates an example of an embodiment that detects a contradiction by observing deposit instructions to two different account numbers. Message Archive 2301 contains a message 2302 from sender 2303 with subject 2304 that instructs the recipient to deposit funds into account number 2305. Subsequent message 2310 is apparently from the same sender and has the same subject, but it references a different account number 2315. Threat detection system 2320 analyzes message 2310 against previous messages in archive 2301 with the same or similar sender or subject, including message 2302, and determines that the account numbers are different. For example, 2320 may search for numbers in a particular format, or for numbers following selected keywords such as "account." It may also search for key phrases that suggest a contradiction, such as "please disregard," "please change," or "use . . . instead." One or more embodiments may use any analysis method to identify account numbers or similar elements within messages, or to identify inconsistencies or possible contradictions. The threat analysis result 2321 therefore flags message 2310 as a possible threat, and the system transforms message 2310 into modified message 2322 by inserting warnings into the subject line and the message contents.

FIG. 24 illustrates another example an embodiment that discovers an inconsistency that may represent a message threat. Message 2402 from sender 2403 requests the recipient to update a password, and it provides an embedded link to do so. Message archive 2401 contains several messages from the same sender. The threat detection system 2404 analyzes these previous messages and determines that the request is unusual 2405 since the sender has never used the phrase "update your password" and has never included an embedded link in a message. One or more embodiments may use any form of pattern analysis, parsing, classification, trend analysis, statistical analysis, or artificial intelligence to determine whether a message represents an unusual message that is inconsistent with previously received messages. Thus the system transforms the message 2402 into modified message 2410 with the link 2406 transformed into encoded link 2411, which provides additional checking or warnings. As described in previous examples, one or more embodiments may also add warnings to the message, or may block all or part of the message.

Figure 25:
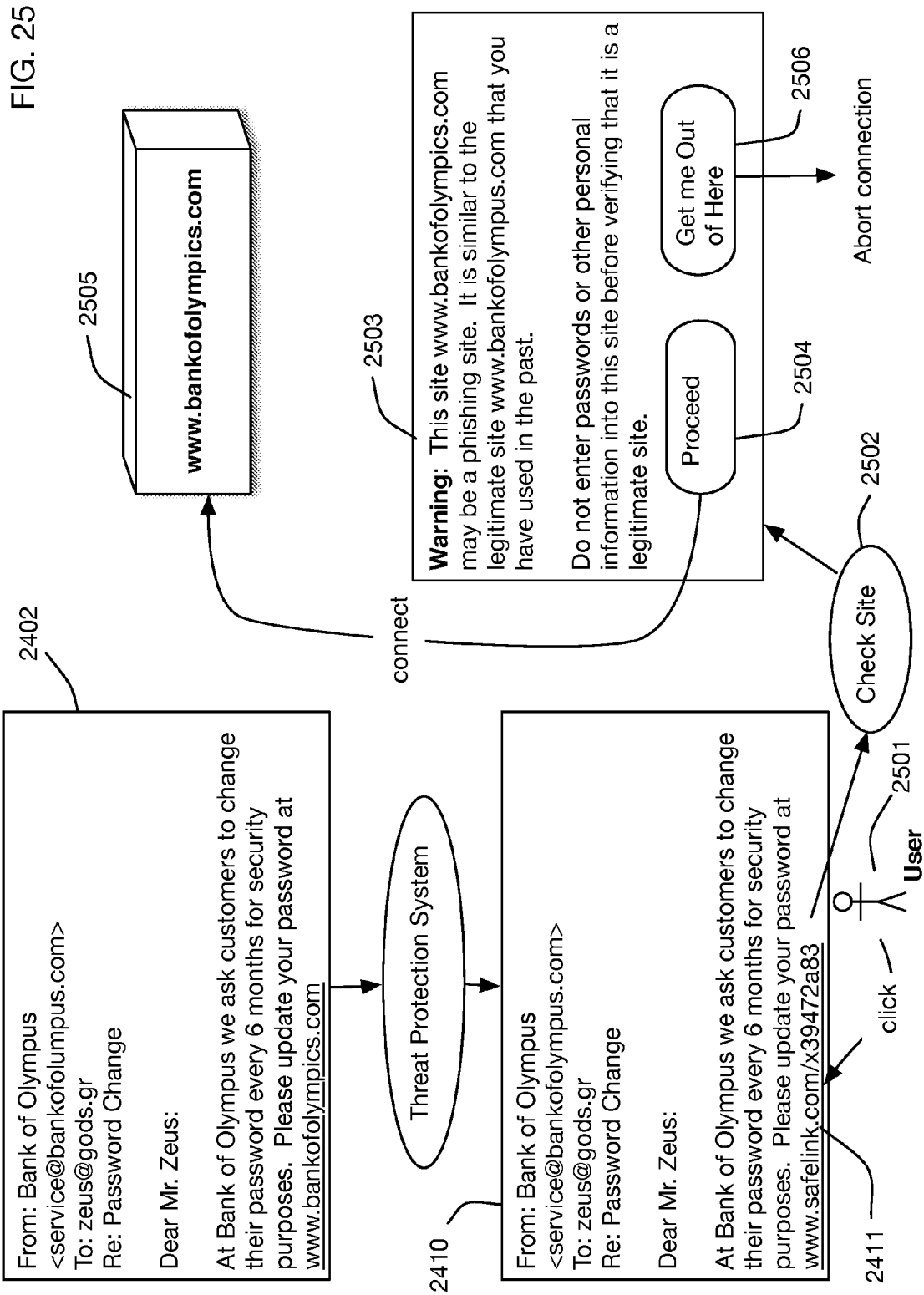
FIG. 25 illustrates an embodiment that transforms suspicious links into encoded links, where clicking on the encoded link performs additional checks and then presents a warning to the user.

FIG. 25 continues the example of FIG. 24 to show an illustrative warning embedded into an encoded website link. When user 2501 clicks encoded link 2411, the threat protection system may perform additional checks 2502 to determine whether the original link target is a potential threat. It may then display a warning message such as 2503. One or more embodiments may not perform any additional checks, but instead may directly display a warning when an encoded link is checked. One or more embodiments may block a site entirely if the check 2502 indicates that the site is a potential threat. Warning message 2503 may for example explain to the user why the link is a potential threat. It may also caution the user not to provide any personal or sensitive information to the site. The warning may provide the user with an option 2504 to proceed to the original site 2505, or an option 2506 to not connect. One or more embodiments may provide any desired information, education, warnings, caveats, or options to the user when the user clicks an encoded link or otherwise accesses a message that has been transformed by the threat protection system.

Figure 26:
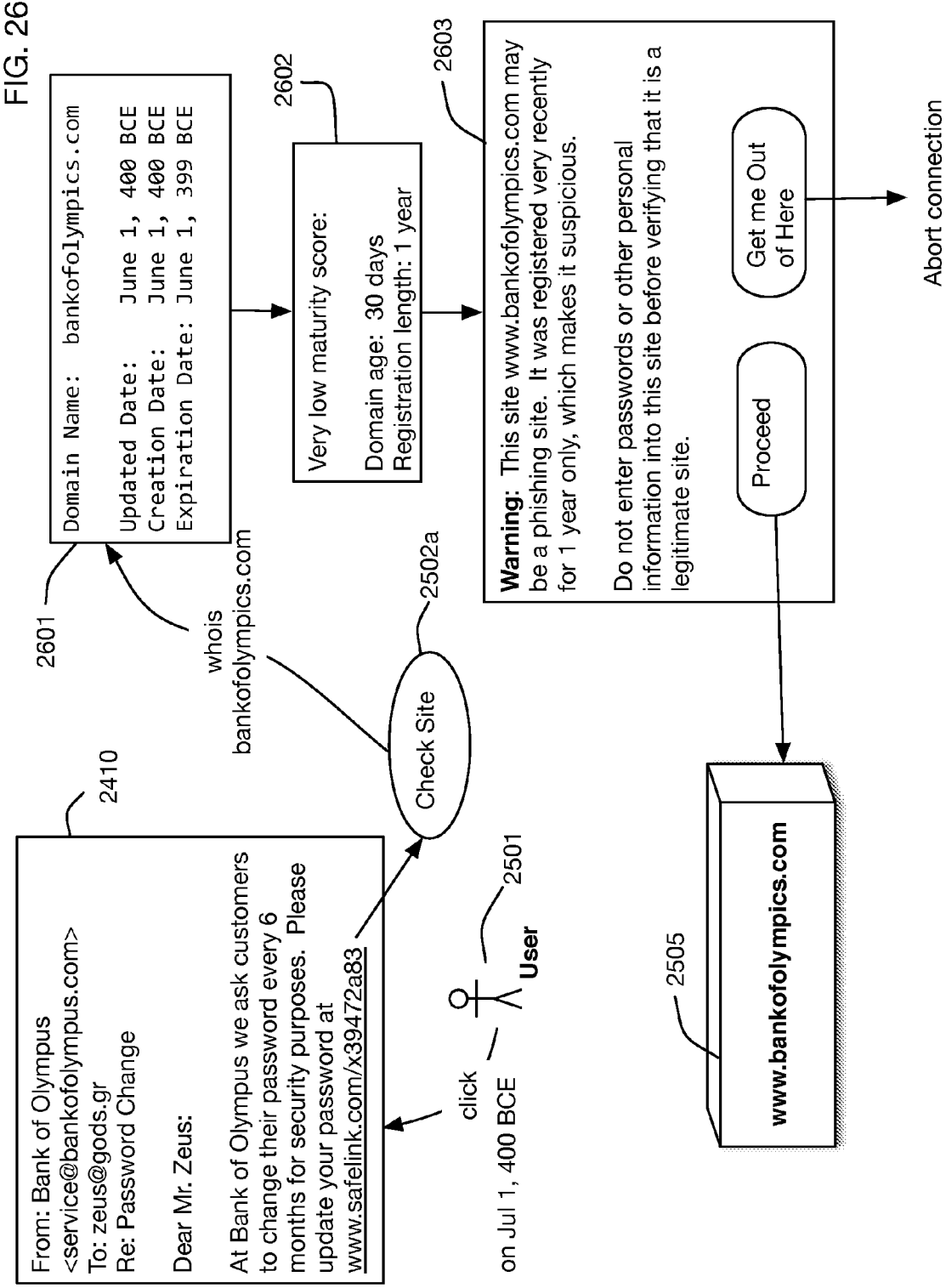
FIG. 26 illustrates an embodiment that checks the domain registration information for a website to assess whether the site presents a potential threat.

The check site process 2502 may perform any desired analysis of the site 2505 to determine if it is an actual, potential, or likely threat. FIG. 26 illustrates an embodiment that checks a site's domain registration records to determine the likelihood that the site is a threat. Check 2502a obtains registration information 2601 for the domain associated with the site. The system analyzes the elapsed time since the site was registered, and the length of time for which the site was registered, to determine how "mature" or stable the site is. The result 2602 indicates that the domain was registered recently (30 days ago) and was registered for only one year. This implies a relatively low "maturity score." Therefore, the system provides warning 2603 to the user. One or more embodiments may use any available domain registration information to determine whether a site may represent a threat. For example, one or more embodiments may calculate a maturity score for a website based on any combination of the duration of time since the domain for the site was registered and the length of time for which the domain was registered. One or more embodiments may apply a threshold value to the maturity score to determine whether the site represents a potential threat.

One or more embodiments may assess the maturity of a website, domain name, or other identity by analyzing the pattern of traffic associated with that identity over time. For example, a website may have been registered long ago, but kept "dormant" until recently, in which case it may have a history of little or no traffic until recently; this pattern of traffic may suggest a possible threat. Traffic may be measured for example by services that measure DNS queries, or by services that monitor IP addresses of packets flowing through the Internet. Traffic may also be measured as email to or from specific domains. FIG. 26A illustrates an embodiment that checks the traffic history of a website prior to allowing access to the site. As in the embodiment of FIG. 26, a link to a website received in a message is rewritten into an encoded link; when user 2501 clicks on the encoded link, check 2502b accesses traffic history 26A01 for the site. One or more embodiments may use any source of traffic history information to perform check 2502b. For example, without limitation, traffic history may comprise any measurements of incoming connections to a domain or website or IP address, outgoing connections from a domain or website or IP address, email messages sent from or to a domain or address, or DNS queries for a domain name. In the example of FIG. 26A, the website referenced in the original message was registered at time 26A10, which predates the clicking of the link by more than a year. However, traffic measure 26A11 associated with the website was very low or zero for some time after registration. This low traffic measure suggests that the website, although registered, was effectively dormant for a significant period of time after registration. At time 26A12, traffic increased dramatically and exceeded threshold value 26A13. The check 2502b therefore uses this time 26A12 as a relevant measure of the maturity of the website, since it indicates when the site stopped being dormant and became active. Since this time of significant activity was very recent, the maturity score 26A02 indicates that the maturity of the site is low. Thus message 26A03 provides a warning that the site may be a threat.

Figure 27:
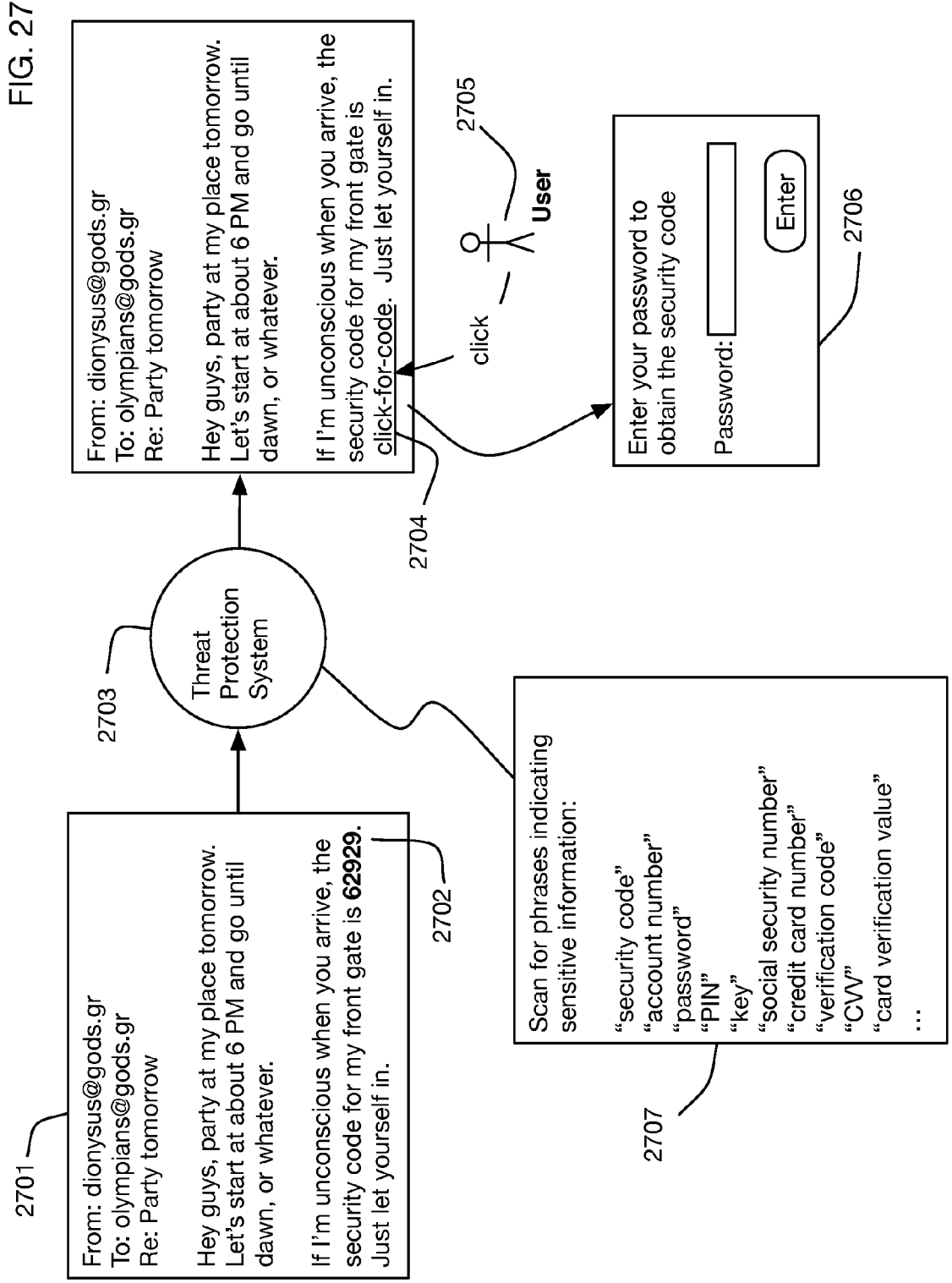
FIG. 27 illustrates an embodiment that transforms a message to encode and hide potentially sensitive information.

In addition to transforming messages to add warnings or to encode website links, one or more embodiments may further transform messages to encode personal, sensitive, or confidential information. The encoded information may for example only be decoded and presented to the user if the user presents specific credentials, or if the user's identity matches a set of authorized recipients. FIG. 27 illustrates an embodiment that transforms a message to hide a security code from unauthorized users. Message 2701 contains a security code 2702 that should only be available to authorized users. The system 2703 detects this security code in the message, and encodes it into a protected link 2704. When a user 2705 clicks the link, a password prompt 2706 is presented to the user prior to displaying the security code. In one or more embodiments the password prompt may be replaced by an automated check of the identity and credentials of the user, or by any desired authentication and authorization scheme. The threat protection system 2703 may for example locate personal, sensitive, or confidential information in messages using natural language processing, pattern matching, artificial intelligence, or any text processing scheme or algorithm. In the illustrative example of FIG. 27, the system 2703 searches messages for specific phrases 2707. For any of the located phrases, a number or string matching a specific format that is near the phrase may be considered sensitive information, for example. For example, a number of the format "ddd-dd-dddd" (where each "d" is a digit) near the phrase "social security number" or "social security" may be considered to be a social security number, and thus may be encoded by the system.

Figure 28:
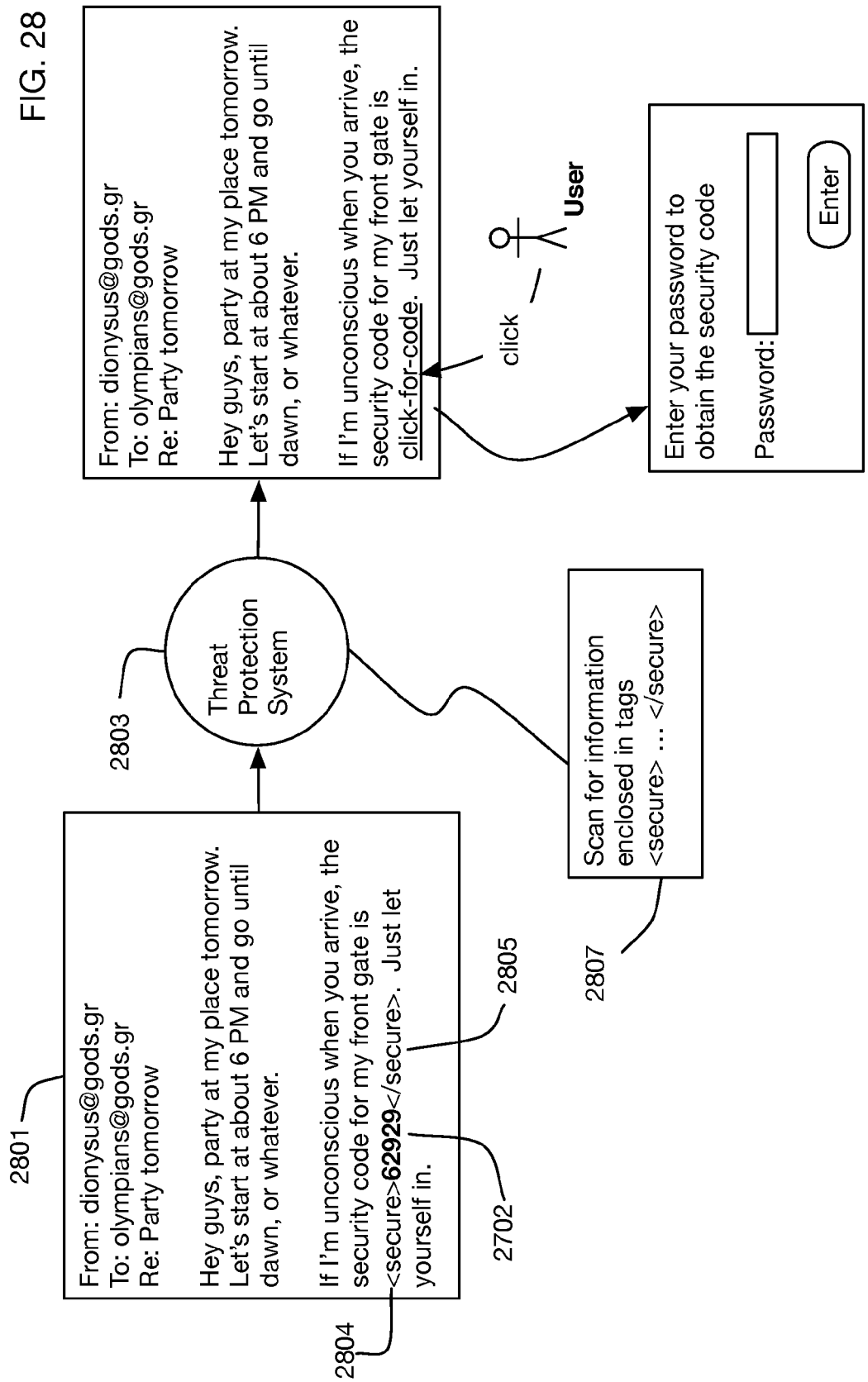
FIG. 28 illustrates a variation of the embodiment of FIG. 27, where a message sender may explicitly tag sensitive information that should be encoded by the system.

In one or more embodiments, the sender of a message may designate personal, sensitive, or confidential information explicitly. The threat protection system may then use these user designations to determine what information to encode. FIG. 28 illustrates an example where the sender of message 2801 (or an editor of the message) has inserted tags 2804 and 2805 around code 2702. The threat protection system 2803 searches for these tags 2807 and encodes information located within the tags. One or more embodiments may use any format for tags or other designations to identify information that should be encoded. In one or more embodiments the schemes illustrated in FIGS. 27 and 28 may be combined, wherein the sender may designate sensitive information and the system may in addition attempt to determine other sensitive information that has not been explicitly tagged.

One or more embodiments may transform messages containing personal, sensitive, or confidential information in various ways to protect this information. For example, transformations may delete or substitute message recipients in order to ensure that the personal, sensitive, or confidential information is only sent to authorized receivers or to authorized domains. FIG. 29 illustrates an example. The Threat Protection System 2910 is configured to ensure that confidential information is sent only to email addresses in the gods.gr domain. One or more embodiments may apply similar rules to confidential information for a company or organization, for example, to ensure that this information is only sent within the company. One or more embodiments may have a list of multiple domains that are authorized to receive messages, or may apply any other rules to determine which email addresses are authorized to receive which messages or which types of information. Key phrase list 2911 provides phrases that indicate that a message contains or may contain confidential information. One or more embodiments may also use explicit tagging of sensitive information, as illustrated for example in FIG. 28. In the embodiment illustrated in FIG. 29, Threat Protection System 2910 scans message 2901 for the phrases 2911. This scan may be performed for example when sending, forwarding, or delivering a message. It may also be performed during or after message composition, for example as part of an email client. Because the title 2905 of the message contains a sensitive phrase, the message is flagged as having confidential information. The policy in this illustrative example is that only recipients with email addresses in the gods.gr domain are authorized to receive this information. Of the original recipients 2902, 2903, and 2904 in message 2901, only recipient 2903 has an email address in the authorized domain. Therefore, in this example the system transforms the message to revised message 2920, with only recipient 2903 remaining; the other recipients are deleted by the system.

In one or more embodiments the threat protection system may also substitute a different email address when it transforms a message to remove a prohibited email address. FIG. 30 continues the example of FIG. 29 to illustrate email address substitution. As in FIG. 29, message 2901 is flagged as containing confidential information, based on the patterns defined in 2911, and email addresses 2902 and 2904 are removed from the recipients list because they are not in the authorized domain. In addition, contacts list 3012 is scanned by Threat Protection System 3010 to determine if a user whose email address is removed also has an email address in the authorized domain. In this example, user 3013 has two email addresses, one of which is the unauthorized address 2902 that is removed from the message, and the other of which is in the authorized domain. Therefore, the system 3010 may warn the user and/or make a substitution, and transform the message into message 3020 with address 3021 substituted for address 2902. The contact list 3012 has no matching authorized email address for the unauthorized address 2904; hence this address is simply removed with no substitution.

While the invention herein disclosed has been described by means of specific embodiments and applications thereof, numerous modifications and variations could be made thereto by those skilled in the art without departing from the scope of the invention set forth in the claims.

What is claimed is:

1. A malware detection system based on stored data, comprising:
   a messaging system database comprising at least one or more computing devices for storing:
      an archive of electronic messages, wherein said archive of electronic messages comprises electronic messages previously sent, received or drafted,
      a contacts list, and
      summary data derived from said archive of electronic messages and said contacts list, wherein said summary data consolidates information from said message archive of electronic messages and said contacts list; and,
   a message filter comprising a computer coupled to said messaging system database, and configured to
      receive an electronic message comprising one or more message parts, said one or more message parts comprising
         a sender information,
         one or more receivers information,
         a message contents,
         a subject line,
         one or more attachments,
         one or more links to websites, a message thread;
determine whether said electronic message represents a potential threat, based on an analysis of
said one or more message parts, and
said messaging system database;
classify said electronic message as a potential threat when a length of time said sender has been in said contacts list is below a threshold value and
classify said electronic message as a potential threat when said electronic message asks said user to perform an action; and,
no previous message in said archive of electronic messages from the same sender as said electronic message requests said user to perform said action;
wherein when said electronic message represents a potential threat, perform one or more of
block access to said electronic message or to one or more of said message parts; and,
transform said electronic message to provide a warning to a user who attempts to access said electronic message or attempts to access one or more of said one or more message parts,
wherein said transform said electronic message to provide said warning comprises one or more of
insert text or graphics warning about a potential threat into the subject line of said electronic message and into the message contents of said electronic message, and,
transform a link to a website from said electronic message to a protected link, wherein clicking said protected link
shows a website warning to said user before connecting to said website, or
calculates a website maturity score, and if said website maturity score is below a threshold, displays a warning message to said user before connecting to said website, or
shows said website warning and calculates said website maturity score.

2. The system of claim 1, wherein said determine whether said electronic message represents a potential threat is further based on an analysis of one or more external databases.

3. The system of claim 1, wherein said determine whether said electronic message represents a potential threat comprises
classify said electronic message as a potential threat if said archive of electronic messages does not contain a previous communication with said sender.

4. The system of claim 1, wherein said determine whether said electronic message represents a potential threat comprises
classify said electronic message as a potential threat if said sender does not appear in said contacts list.

5. The system of claim 1, wherein said determine whether said electronic message represents a potential threat comprises
classify said electronic message as a potential threat if
said sender has a sender identity that matches an identity of an entity in said contacts list; and
said entity in said contacts list is not associated with a known source of messages.

6. The system of claim 5, wherein said entity in said contacts list is a distribution list.

7. The system of claim 1, wherein said determine whether said electronic message represents a potential threat comprises
classify said electronic message as a potential threat if said sender has a sender identity that is similar to, but not identical to, an identity of a person or organization in said contacts list.

8. The system of claim 7, wherein said sender identity is considered to be similar to, but not identical to, an identity of a person or organization in said contacts list if a distance metric between said sender identity and said identity of said person or organization in said contacts list is below a threshold value and greater than zero.

9. The system of claim 7, wherein said sender identity comprises one or more of
a sender email address;
a domain name of said sender email address;
a portion of said domain name of said sender email address;
a display name of said sender email address; and,
a biometric identifier of said sender.

10. The system of claim 9, wherein said biometric identifier comprises one or more of
a fingerprint,
a palm print,
a voice print,
a facial image, and
an eye scan.

11. The system of claim 1, wherein said determine whether said electronic message represents a potential threat comprises
classify said electronic message as a potential threat if said sender has an identity that is similar to, but not identical to, an identity of a person or organization that was a sender or a receiver of a message in said archive of electronic messages.

12. The system of claim 1, wherein said determine whether said electronic message represents a potential threat comprises
said electronic message contains a link to a website, wherein said website has a website identity that is similar to, but not identical to, a website identity referenced in a message in said archive of electronic messages.

13. The system of claim 12, wherein said website identity referenced in a message in said archive of electronic messages is a domain identity associated with said sender of said message in said archive of electronic messages.

14. The system of claim 1, wherein said determine whether said electronic message represents a potential threat comprises
classify said electronic message as a potential threat if said electronic message contradicts a message in said archive of electronic messages.

15. The system of claim 14, wherein said contradicts a message in said archive of electronic messages comprises
said electronic message provides an account identity into which said user is directed to transfer funds; and
said message in said archive of electronic messages provides a different account identity into which said user is directed to transfer funds.

16. The system of claim 1, wherein said website warning comprises
a warning to said user not to provide personal information to said website.

17. The system of claim 1, wherein said website maturity score is calculated based on one or more of an elapsed time since a domain associated with said website was registered; and, a registration length of time for which said domain was registered.

18. The system of claim 1, wherein said website maturity score is calculated based on an elapsed time since measured traffic to or from said website exceeded a traffic threshold value.

19. The system of claim 1, wherein said message filter is further configured to identify personal, sensitive, or confidential information in said one or more message parts; and, transform said electronic message to protect said personal, sensitive, or confidential information if said personal, sensitive, or confidential information is present in said one or more message parts.

20. The system of claim 19, wherein said personal, sensitive, or confidential information is identified using natural language processing.

21. The system of claim 19, wherein said personal, sensitive, or confidential information is identified by tags inserted into said electronic message by said sender.

22. The system of claim 19, wherein said transform said electronic message to protect said personal, sensitive, or confidential information comprises transform said personal, sensitive, or confidential information into an encoded form.

23. The system of claim 19, wherein said transform said electronic message to protect said personal, sensitive, or confidential information comprises determine whether each of said one or more receivers is authorized to receive said personal, sensitive, or confidential information; and warn said sender or remove a receiver from said electronic message if said receiver of said one or more receivers is not authorized to receive said personal, sensitive, or confidential information, or warn said sender and remove said receiver from said electronic message.

24. The system of claim 23, wherein said remove said receiver from said electronic message further comprises identify an alternate email address for said receiver, wherein said alternate email address is authorized to receive said personal, sensitive, or confidential information; and, add said alternate email address as a new receiver of said electronic message.

25. The system of claim 1, further comprising wherein said electronic message further comprises a recipient information; and, a resource or a reference to said resource;

a message transformation subsystem that replaces said resource or said reference to said resource with a protected reference to said resource, to form a protected message;

an authorization subsystem configured to determine whether said user is an authorized user who is permitted to use said protected reference to access said resource; and, a secure resource access subsystem configured to provide said authorized user with secure access to said resource via a security mechanism that mitigates one or more potential threats from said resource;

wherein said recipient of said electronic message creates a copy of said protected reference; and, use of said protected reference or of said copy of said protected reference by said user to access said resource automatically causes said authorization subsystem to determine whether said user is said authorized user; and, when said user is said authorized user, said secure resource access subsystem to provide said authorized user with said secure access to said resource via said security mechanism; and, when said user is not said authorized user, said secure resource access subsystem to block access to said resource for said user.

* * * * *